(12) United States Patent
Mody et al.

(10) Patent No.: US 12,316,547 B2
(45) Date of Patent: May 27, 2025

(54) SYSTEM AND METHOD FOR INTERFERENCE MITIGATION AND CONGESTION CONTROL THROUGH CROSS LAYER COGNITIVE COMMUNICATIONS AND INTELLIGENT ROUTING

(71) Applicant: A10 SYSTEMS INC, Lowell, MA (US)

(72) Inventors: Apurva N. Mody, Chelmsford, MA (US); Bryan Crompton, Lowell, MA (US); Junaid Islam, San Jose, CA (US); David Simpson, Springfield, VA (US); Dap Minh Tran, Lowell, MA (US); Tommaso Melodia, Newton, MA (US)

(73) Assignee: A10 SYSTEMS INC, Lowell, MA (US)

( * ) Notice: Subject to any disclaimer, the term of this patent is extended or adjusted under 35 U.S.C. 154(b) by 253 days.

(21) Appl. No.: 17/933,452

(22) Filed: Sep. 19, 2022

(65) Prior Publication Data

US 2023/0092997 A1    Mar. 23, 2023

Related U.S. Application Data

(60) Provisional application No. 63/245,569, filed on Sep. 17, 2021.

(51) Int. Cl.
| *H04L 47/10* | (2022.01) |
| *H04L 43/08* | (2022.01) |
| *H04L 47/2425* | (2022.01) |
| *H04L 47/30* | (2022.01) |

(52) U.S. Cl.
CPC .............. *H04L 47/29* (2013.01); *H04L 43/08* (2013.01); *H04L 47/2433* (2013.01); *H04L 47/30* (2013.01)

(58) Field of Classification Search
CPC ..... H04L 47/29; H04L 43/08; H04L 47/2433; H04L 47/30; H04L 43/0847; H04L 43/0882; H04L 43/10
See application file for complete search history.

(56) References Cited

U.S. PATENT DOCUMENTS

| 10,218,623 | B2 * | 2/2019 | Avci | H04L 47/125 |
| 2007/0105548 | A1 * | 5/2007 | Mohan | H04W 88/021 |
| | | | | 455/462 |
| 2014/0098685 | A1 * | 4/2014 | Shattil | H04W 40/20 |
| | | | | 370/252 |

(Continued)

OTHER PUBLICATIONS

International Search Report and Written Opinion; Dated: Mar. 6, 2023; Application # PCT/US22/44028.

*Primary Examiner* — Benjamin M Thieu
(74) *Attorney, Agent, or Firm* — Polsinelli PC; Babak Monajemi; Ryan Murphy

(57) ABSTRACT

A method of dynamically routing packets to a destination node performed by a computing device is disclosed. The method includes: (1) detecting a status of a plurality of links to the destination node across a plurality of communications modalities; (2) determining a set of links to use for routing packets to the destination node based on the detected statuses; and (3) sending packets to the destination node via the determined set of links. A related computer program product, apparatus, and system are also disclosed.

20 Claims, 58 Drawing Sheets

(56) References Cited

U.S. PATENT DOCUMENTS

| | | | |
|---|---|---|---|
| 2015/0009909 A1* | 1/2015 | Lundgren | H04W 72/0453 |
| | | | 370/329 |
| 2016/0249223 A1 | 8/2016 | Egner et al. | |
| 2016/0255140 A1 | 9/2016 | Shattil | |
| 2017/0141906 A1* | 5/2017 | Rainish | H04B 7/1851 |
| 2018/0132190 A1 | 5/2018 | Jeon et al. | |
| 2018/0139629 A1 | 5/2018 | Chakrabarti et al. | |
| 2019/0081884 A1* | 3/2019 | Spohn | H04L 45/124 |
| 2019/0373301 A1 | 12/2019 | Gunasekara et al. | |
| 2020/0036414 A1* | 1/2020 | Shattil | H04B 1/0003 |
| 2020/0274796 A1 | 8/2020 | Garg et al. | |

\* cited by examiner

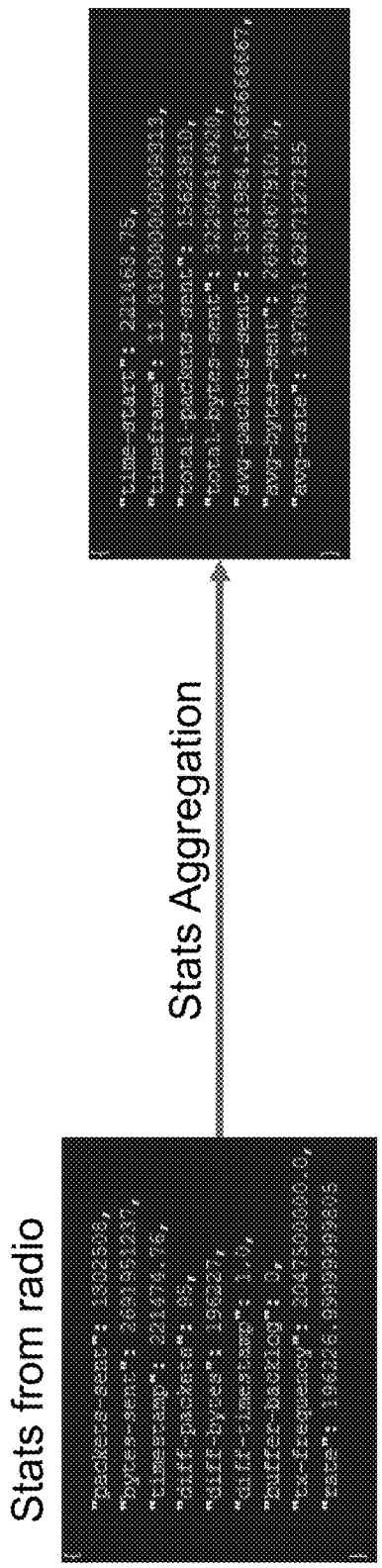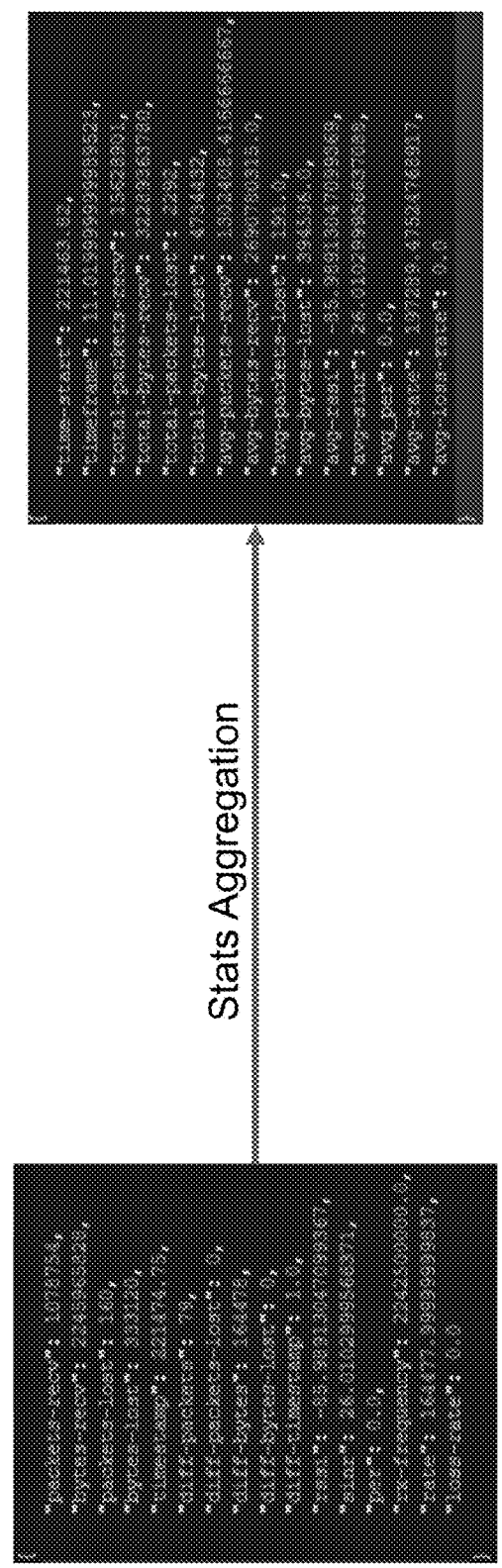
Fig. 27
Fig. 28

No Moon Base to Relay Path

One Moon Base to Relay Path

Multiple Moon Base to Relay Paths

Fig. 29D Requires Relay to Relay Routing

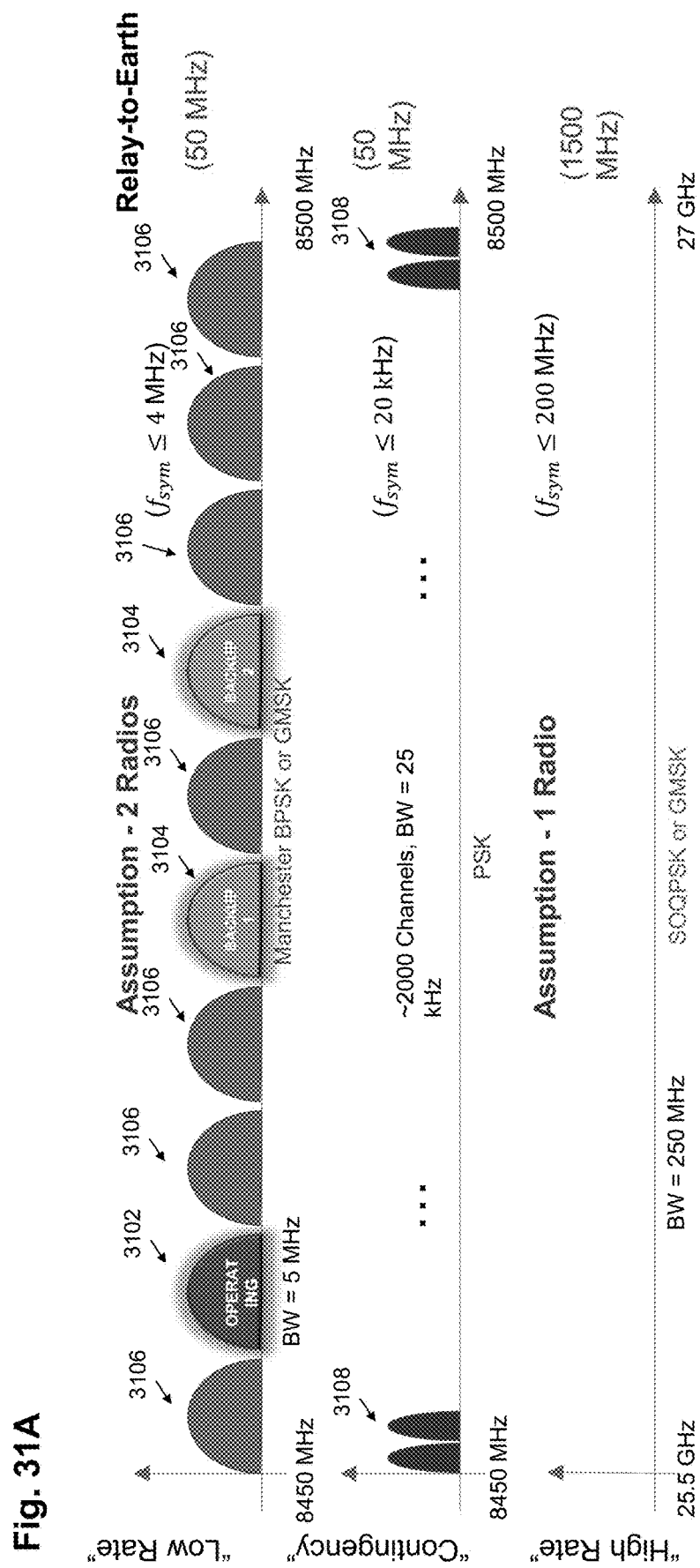

Fig. 38B  Use of Deep Neural Network

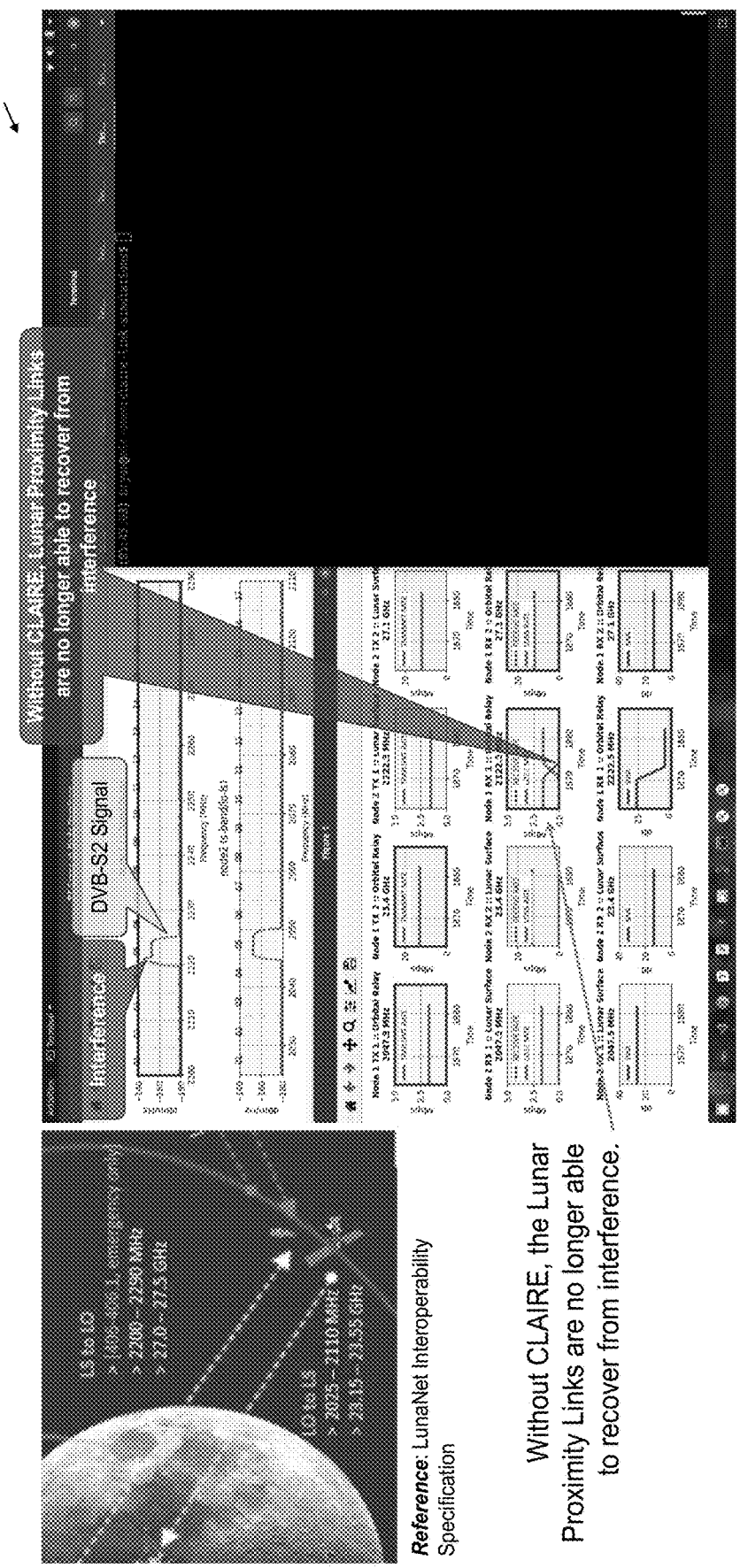

*Reference*: LunaNet Interoperability Specification

Example of the CLAIRE APP on the CLAIRE Emulation Testbed orchestrating DSA for the Lunar Proximity Links

SYSTEM AND METHOD FOR INTERFERENCE MITIGATION AND CONGESTION CONTROL THROUGH CROSS LAYER COGNITIVE COMMUNICATIONS AND INTELLIGENT ROUTING

CROSS REFERENCE TO RELATED APPLICATIONS

The present application claims priority to Provisional Patent Application No. 63/245,569, filed Sep. 17, 2021 and entitled "CROSS-LAYER COGNITIVE COMMUNICATIONS ARCHITECTURE FACILITATED BY INTELLIGENT DIRECT DIGITAL TRANSCEIVER," the disclosure of which is hereby incorporated by reference herein in its entirety for all purposes.

STATEMENT REGARDING FEDERALLY-SPONSORED RESEARCH OR DEVELOPMENT

This application was made with government support under Contracts No. 80NSSC20C0398 and 80NSSC21C0510 awarded by the National Aeronautics and Space Administration (NASA). The U.S. Government has certain rights in this invention.

BACKGROUND

NASA's Artemis Moon Mission: The upcoming manned mission to the Moon (Year 2024-2025) is likely to establish a base at its South Pole. The Earth may be visible from the Moon base for 15 days, while for the next 15 days it may not be visible. As a result, NASA plans to launch orbital relays and gateway nodes to provide connectivity on the lunar surface as well as from the Moon to the Earth. This network (LunaNet) has a Lunar Segment and an Earth Segment. The communications links will include proximity links from the Moon base to the orbital relays, relay-to-relay links between orbital relays, and direct-to-Earth (DTE) links from the orbital relays to the ground station. The communications links are likely to operate in many frequency bands. As an example, the proximity links will operate in the S-Band and the Ka-Band. The relay-to-relay links will operate in the Ka-Band, or they may be optical. Finally, the DTE links may operate in X-Band, Ka-Band and/or they may be optical. Each Band may include a plurality of channels. The LunaNet specification describes the following services:

Networked Communications (COM): The networked communication services in LunaNet will enable users to transfer data to other nodes using addressable and routable data units. The primary COM services are real-time critical data transmission, data aggregation and transmission in a store-and-forward mode, and messaging. LunaNet user applications will be networked-based, using either Delay/Disruption Tolerant Networking (DTN) Bundle Protocol (BP) or Internet Protocol (IP). The standardized messaging services are expected to be utilized by applications such as service acquisition, PNT, and alerts.

Position, Navigation, and Timing (PNT): LunaNet is likely to provide PNT services for users on the Moon as well as for the proximity links. The PNT services will enable the users to determine the position and velocity of an orbiting or the lunar surface-based asset using reference signals.

Detection and Information (DET): LunaNet detection and information services provide alerts and other critical information to users. This is used to enhance situational awareness of the users which may include astronauts, rovers, and other assets on the lunar surface. DET service will also alert the users of potentially dangerous solar activity. These alerts may be enabled using smartphones that use Wi-Fi™ and 4G networks that are planned to be deployed on the lunar surface. LunaNet detection and information services will also include a lunar search and rescue capability, or LunaSAR.

Science Services (SCI): The SCI services will enable various researchers to conduct measurements and experiments. Some other uses of the SCI service include radio astronomy enabled by the radio telescope on the lunar surface.

SUMMARY

Modem communications systems commonly suffer from interference and network congestion. These impairments affect the Quality of Service (QoS) for information delivery and Quality of Experience (QoE) for the users. In order to counter interference or congestion, it is useful to have situational awareness that detects and characterizes the problem and its location, and it is further useful to employ mitigation strategies (e. g. Dynamic Spectrum Access, Spectrum Aware Routing, Network Slicing). The present disclosure relates to a wide variety of use cases including space communications for agencies such as NASA, communications for federal agencies, communications for defense applications, as well as wide variety of homogeneous and heterogeneous communications architectures including terrestrial 4G/5G/6G, Wi-Fi, Satellite Communications (SATCOM), Optical Fiber communications and combinations thereof. For illustration purposes, we will be using NASA's upcoming Lunar Mission as an example. But we also provide some commercial applications of this technology.

The links in NASA's Lunar Mission are likely to suffer a wide variety of impairments. These include 1. Distributed sources of interference on the Earth, 2. Misconfigured radio on the Lunar surface trying to communicate on the same channel as an authorized user creating co-channel interference, 3. Solar flares creating Radio Frequency (RF) interference in many bands which NASA plans to use, 4. Unintentional or intentional interference on the lunar surface due to an un-accounted device, 5. Intentional interference from an adversary, 6. Network congestion due to traffic overload, and 7. Distributed Denial of Service (DDoS) attack causing the buffers to overflow etc.

Thus far, NASA Communications Networks were designed to optimize individual links and make them robust. While this approach worked for simple missions where peer to peer connectivity was required (e. g. deep space probes to Earth, near-side of the Moon to the Earth), this is likely to be challenging for complex missions where there is no direct Line of Sight (LoS), and hence space-based networks need to be created. This results in a complex network including Orbital Relays, Gateways, CubeSats for PNT and SCI Services and the surface activities on the Moon. The mission is further complicated by the fact that many countries are planning to participate. Each country is likely to bring its own payload, use disparate spectrum bands and their own versions of security and encryption techniques. Missions may involve organizations such as universities wanting the SCI return data or access to the sensors for some experiment. This creates tremendous security risks. Dynamic Spectrum Access, Spectrum Aware Routing, and Network Slicing are some of the strategies that may be used to mitigate impairments described above. Network Slicing is a network architecture that enables the multiplexing of virtualized and independent logical networks on the same physical network infrastructure. Each network slice is an isolated end-to-end network tailored to fulfill diverse requirements requested by a particular application.

The present disclosure presents a Cross Layer Cognitive Communications Architecture and Intelligent Routing Engine (CLAIRE) which enables automated interference and congestion awareness and mitigation. CLAIRE is an intelligent agent-based solution that can be run on a device or within the network and automates the management and provisioning of the network. It mitigates interferences & congestion and ensures that the desired QoE is maintained. CLAIRE is assisted by an Intelligent Network Slicing and Policy-based Routing Engine (INSPiRE) Module. CLAIRE and INSPiRE are hardware agnostic and apply to any radio or a network element such as a switch or a router. CLAIRE performs Spectrum Aware Packet Prioritization, whereas INSPiRE performs Policy-based Packet Prioritization. CLAIRE and INSPiRE together allocate network and spectrum resources. In some embodiments, this may be done based on the needs of various Organizations, Missions, Applications, Services to obtain the desired Performance (e.g. Quality of Service).

CLAIRE cognitive communications architecture is enabled using a Cognitive Control Plane that enables situational awareness and helps to coordinate interference mitigation and network congestion. Cognitive Control Plane is implemented using Heartbeat (HTBT) messages between nodes within the network. Some nodes may have a wideband RF Sensing Device. CLAIRE includes an RF Sensing Module, Cross Layer Sensing (CLS), a CLAIRE Decision Engine (CDE), and an intelligent Packet Forwarding Engine (PFE). The INSPiRE Module includes a Packet-type Inspection and Sorting (PTIS) Module, a Policy-based Packet Scheduler (PPS), Prioritized Packet Buffers (PPB), an INSPiRE Agent, and a Delay Tolerant Networking (DTN) cache.

The CLS receives Radio Frequency (RF), Physical Layer (PHY), Medium Access Control (MAC) Layer, and Network Layer (NET) statistics to detect and characterize the causes of network impairment (e. g. solar flare). Based on these statistics, RF sensing employs a wide variety of techniques including Cyclostationary Signal Processing (CSP), and CLS employs Machine Learning (ML) to detect and characterize the cause of network degradation. The CLAIRE Decision Engine then acts on this information to implement a mitigation strategy. The CLAIRE Cognitive Control Plane enables Dynamic Spectrum Access (DSA) to mitigate the interference and Spectrum Aware Routing to mitigate network congestion. RF Sensing enables selection of optimal backup channels, spectrum awareness, and troubleshooting; Congestion control is taken care of using Spectrum Aware Packet Forwarding/Load Balancing. Finally, a CLAIRE APP User Interface helps with troubleshooting and visualization. The CLAIRE Cognitive Control Plane is instantiated at the Application Layer (APP) so that it can ride on any transport protocol used by the network. Also, this architecture may be applied to any other future military, commercial, terrestrial, wireless, or space missions since changes may be made easily. CLAIRE provides an extensible protocol that allows passing of RF spectrum situational awareness, cross-layer sensing, delay tolerant networking, and dynamic spectrum access information that can help with network optimization. The intelligent PFE enables spectrum aware routing to mitigate network congestion. The PEE takes into account a capacity of each link and a differential buffer backlog to then select the optimal link and route that packets should take based on the desired QoS. The INSPiRE Module prioritizes the packet types based on policy that is provided by the INSPiRE Agent and helps to orchestrate a Network Slice.

ACRONYMS

One or more embodiments include a Cognitive Communications Architecture and Intelligent Routing Engine (CLAIRE) and Intelligent Network Slicing and Policy-based Routing Engine (INSPiRE). The following table describes the meanings of other acronyms as used herein, according to one or more embodiments.

TABLE 1

| Acronyms | |
|---|---|
| API | Application Programming Interface |
| APP | Application or Application Layer |
| CCC | Common Control Channel |
| CCSDS | Consultative Committee for Space Data Systems |
| CLS | Cross Layer Sensing |
| CDE | CLAIRE Decision Engine |
| Comms | Communications |
| DBB | Differential Buffer Backlog |
| DCNN | Deep Convolutional Neural Networks |
| DDTRX | Direct Digital Transceiver |
| ICD | Interface Control Document |
| JSON | JAVA Script Object Notification |
| MAC | Medium Access Control Layer |
| NET | Network Layer |
| NFV | Network Function Virtualization |
| OODA | Observe Orient Decide and Act |
| PF | Packet Forwarding |
| PHY | Physical Layer |
| SADR | Spectrum and Delay Aware Routing |
| SCaN | Space Communications and Navigation |
| SOA | Service Oriented Architecture |
| SON | Self-Organizing Network |
| UHF | Ultra-High Frequency |

BRIEF DESCRIPTION OF THE DRAWINGS

The foregoing and other objects, features, and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention. In the figures:

FIGS. 27-28 illustrate example methods and data structures for use in connection with one or more embodiments.

FIGS. 29A-E illustrate example methods and systems for use in connection with one or more embodiments.

FIGS. 31A-B illustrate example spectra and data structures for use in connection with one or more embodiments.

FIGS. 38A-C illustrate example data and data structures for use in connection with one or more embodiments.

FIGS. 41A-F illustrate example data, data structures, and graphical user interfaces for use in connection with one or more embodiments.

DETAILED DESCRIPTION

Introduction to Claire and Inspire

Figure 1:
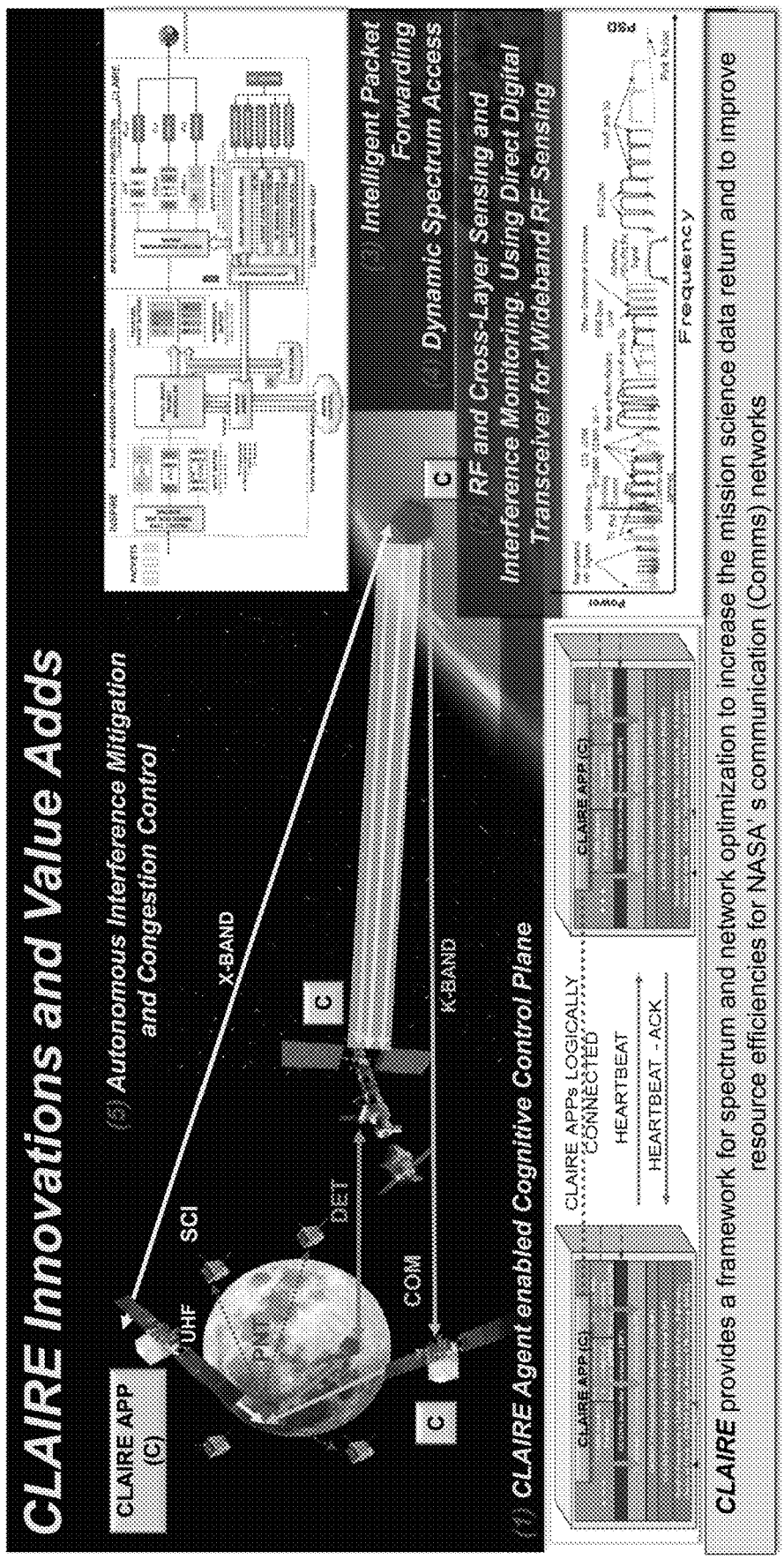
FIG. 1 illustrates an example system and apparatus for use in connection with one or more embodiments.
Figure 2:
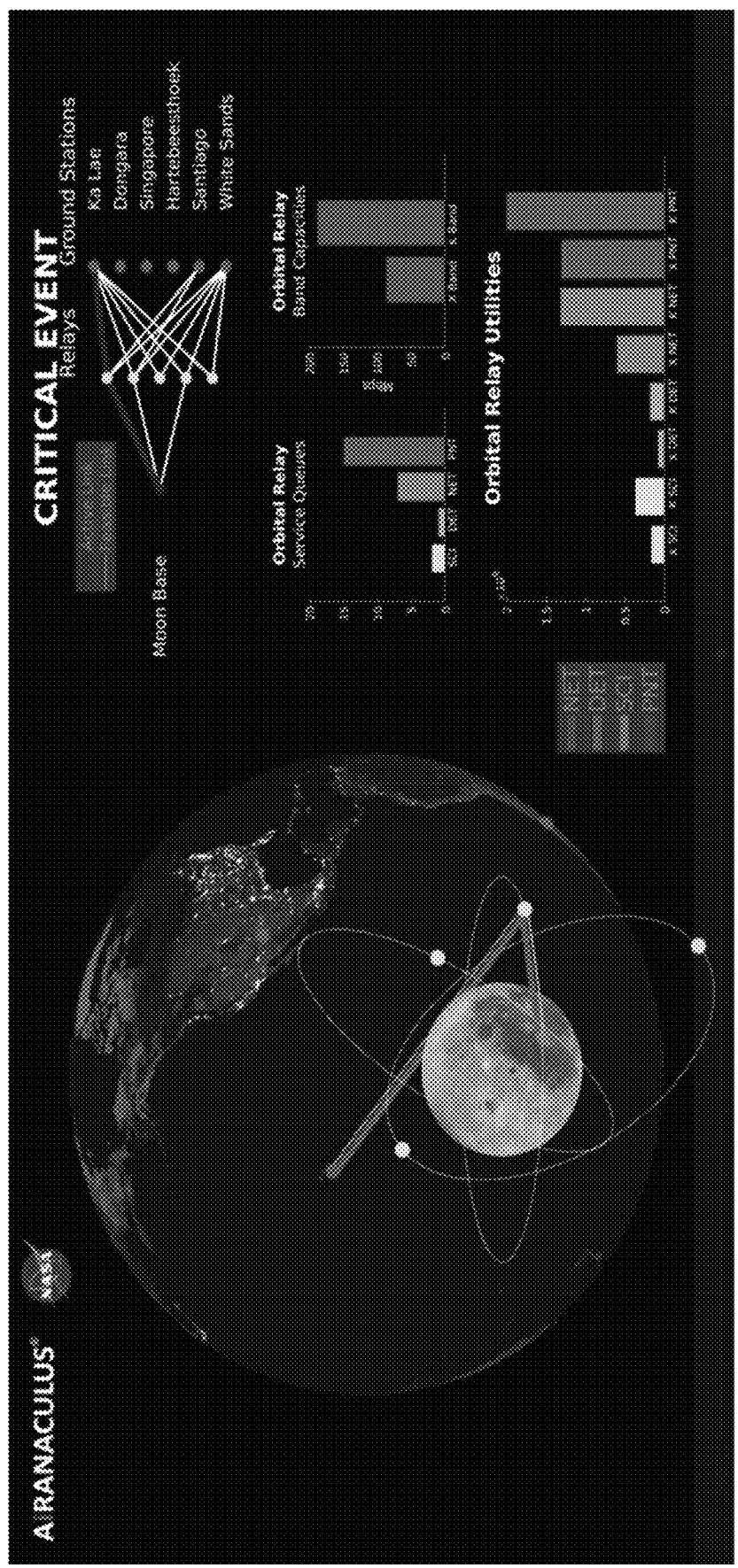
FIG. 2 illustrates an example system, apparatus, and data structures for use in connection with one or more embodiments.

This disclosure presents a Cross Layer Cognitive Communications Architecture and Intelligent Routing Engine (CLAIRE) as well as Intelligent Network Slicing and Policy-based Routing Engine (INSPiRE) which enable automated interference and congestion awareness and mitigation for the network. CLAIRE/INSPiRE are intelligent agent-based solutions that can be run on a device or within the network and automate the management and provisioning of the network. They mitigate interferences & congestion and ensure that the desired QoE is maintained. Some of the CLAIRE innovations and value adds are shown in FIGS. 1 and 2. CLAIRE performs Spectrum Aware Packet Prioritization, whereas INSPiRE performs Policy-based Packet Prioritization. CLAIRE and INSPiRE together allocate network and spectrum resources.

Some nodes may have a wide-band RF Sensing Device. CLAIRE includes an RF Sensing Module, Cross Layer Sensing (CLS), CLAIRE Decision Engine (CDE), intelligent Packet Forwarding Engine (PFE), HTBT Controller as well as various transmit and receive Radios. The INSPiRE Module includes a Packet-type Inspection and Sorting (PTIS) Module, Policy-based Packet Scheduler (PPS), Prioritized Packet Buffers (PPB), INSPiRE Agent and Delay Tolerant Networking (DTN) cache. In one embodiment, each Node having INSPiRE and CLAIRE agents may be identified on the network using its unique Internet Protocol (IP) address. Also, different transmit and receive Radios may be accessed through their respective Medium Access Control (MAC) interfaces. Within or between the Nodes, messages may be passed using ZeroMQ construct.

Figure 3:
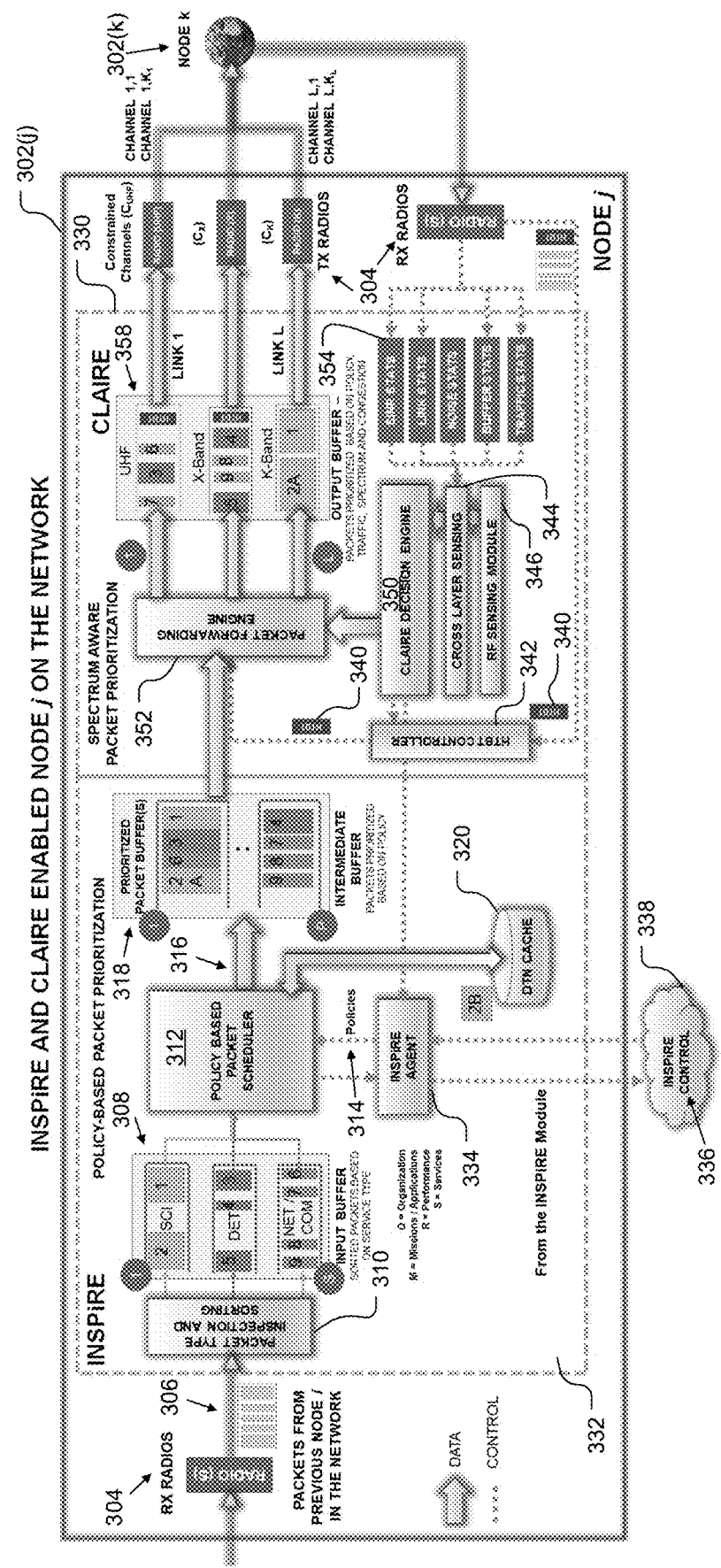
FIG. 3 illustrates an example system, apparatus, computer program products, and data structures for use in connection with one or more embodiments.
Figure 4:
FIG. 4 illustrates example features for use in connection with one or more embodiments.

CLAIRE performs local optimization whereas INSPiRE performs global optimization of the network. The INSPiRE System is an add-on to CLAIRE, as shown in FIGS. 3 and 4. CLAIRE provides spectrum and network situational awareness to enable link-layer selection and optimization to maximize the data flow based on the desired Quality of Service (QoS) requirements for various types of services such as SCI, NET/COM, DET and PNT, enhanced Mobile Broadband (eMBB), Ultra Reliable Low Latency Communications (URLLC), massive Machine Type Communications (mMTC) etc. Hence CLAIRE is an enabler for INSPiRE. While CLAIRE engages in local link level optimization, INSPiRE engages in global optimization of the network to provide the Quality of Experience (QoE) to a wide variety of users.

CLAIRE and INSPiRE are hardware agnostic and apply to any radio or a network element such as a switch or a router. CLAIRE cognitive communications architecture is enabled using a Cognitive Control Plane that enables situational awareness and helps to coordinate interference mitigation and network congestion. Cognitive Control Plane is implemented using Heartbeat (HTBT) messages between nodes within the network. In this Disclosure, we use the terms CLAIRE, CLAIRE Applique (APP), and CLAIRE Cognitive Agent interchangeably since it may be implemented in different ways. The INSPiRE Module assists the CLAIRE Module and vice-versa.

FIG. 3 shows an embodiment of an architecture 300 for CLAIRE and INSPiRE Modules on a said Node j 302(j), which may be an Orbital Relay that is required to forward a plurality of packets of data to Node k 302(k), which may be present on the Earth. While FIG. 3 shows separate Radios 304 with Transmit (Tx) functionality and Receive (Rx) Functionality, the CLAIRE and INSPiRE functions are agnostic to this. This is simply for illustration purposes since NASA's LunaNet architecture uses Frequency Division Duplex (FDD) Radios 304. However, embodiments of the present Disclosure also apply Time Division Duplex (TDD) or Full Duplex (FD) Radios 304 using Simultaneous Transmit and Receive (STAR) technology.

In this particular case, Nodej 302(j) receives data packets 306 belonging to various service types—SCI, NET/COM, DET, PNT etc. Various traffic types are first segregated into various Input Buffers 308 (depicted as input buffers 308(1)-308(S)) as shown using the Packet Type Inspection and Sorting (PTIS) Module 310.

The traffic types are then, prioritized using multi-Dimensional optimization by the Policy-based Packet Scheduler (PPS) 312 based on the network policies 314. The policies 314 may be defined based on Organization, Mission, Application, and Performance, as shown in FIG. 4. One example of a policy 314 could be to prioritize SCI packets 306 from Lunar South Pole during a Supernova event. Another example of a policy 314 could be that during docking and descent, prioritize the PNT packets 306. A third example of a policy 314 could be to prioritize the DET and Control packets 306 during Solar Flares.

The prioritized packets 316 are then forwarded to the plurality of Prioritized Packet Buffers (PPB) 318 (depicted as prioritized buffers 318(1)-318(P)). As depicted in FIG. 3, the PPS Module 312 prioritizes packets 1, 3 and 6. Furthermore, PPS 312 breaks packet 2 into 2A and 2B as shown in FIG. 3.

PPBs 318 also serve as intermediate buffers. At this point, the packets 316 are prioritized based on network policies 314. In case of link nonavailability, link degradation, interference, or network congestion, some packets 316 which are deemed to be less important are stored in the DTN cache 320 (e.g., Packet 2B), until the network capacity is restored, or congestion is mitigated. This indication is provided by CLAIRE 330 to INSPiRE 332 since CLAIRE 330 has situational awareness of the spectrum and the network.

The INSPiRE Agent 334 is responsible for providing the policies 314 to the PPS 312 from the INSPiRE Module 336 which may be present somewhere in the cloud 338. These policies 314 define how the Network Slices are to be orchestrated to provide the desired QoE to the various services.

The CLAIRE Cognitive Control Plane is orchestrated using various types of Heartbeat (HTBT) messages 340 and enables DSA to mitigate the interference and Traffic Spectrum and Congestion aware Routing (TASCOR) to mitigate network congestion. CLAIRE Cognitive Control Plane is instantiated at the Application Layer (APP) so that it can ride on any transport protocol used by the network. Also, this architecture 300 may be applied to any other future military, commercial, terrestrial, wireless or space missions since changes may be made easily. CLAIRE 330 provides an extensible protocol that allows passing of RF spectrum situational awareness, cross-layer sensing, delay tolerant networking, and DSA information that can help with network optimization. CLAIRE Module 330 continuously receives the spectrum and network situational awareness via HTBTs 340 that are generated and received by the HTBT Controller 342. As an example, there may be three or more different types of HTBTs 340-HTBT-REGISTRATION, HTBT-NORMAL, and HTBT-CRITICAL. HTBTs 340 contain Radio Frequency (RF), Physical Layer (PHY), MAC Layer, and NET Layer features which are provided to the Cross Layer Sensing (CLS) Module 344. The cross-layer features may include Noise Floor (NF), Signal to Interference plus Noise Ratio (SINR), Receiver Signal Strength Indicator (RSSI), Reference Signal Received Power (RSRP), Packet Error Rate (PER), Bit Error Rate (BER), Interference Detected notification from the RF Sensing Module 346, etc.

CLAIRE RF sensing may employ Energy Detection and Cyclostationary Signal Processing (CSP). CLS combines the RF Sensing and cross layer features from the radios 304 and uses Machine Learning (ML) to detect and characterize the causes of network impairment (e.g., a solar flare). CLAIRE Decision Engine 350 then acts on this information to implement the mitigation strategy. RF Sensing enables selection of optimal backup channels, spectrum awareness, forensics, and troubleshooting. In one embodiment, RF Sensing may be enabled using Direct Digital Transceiver (DDTRX) technology.

Congestion control is taken care of using TASCOR that is enabled using the intelligent Packet Forwarding Engine (PFE) 352. The CLS module 344 receives the SINR 354 at Node k 302(j) via the HTBT messages 340. Based on this information and the Channel Bandwidth (B) in Hz, it is able to estimate the Capacity (C) of that particular link using the Shannon-Hartley formula: $C = B \log_2(1+SINR)$. The PFE 352 takes into account the estimated Capacity of each link and differential buffer backlog to create a Utility Function. The PFE 352 then selects the transmit parameters such as which-packets 316 from the PPB 318 need to be transmitted using which Radio interface 304 (i.e., by placing packets 316 into particular output buffers 358, depicted as output buffers 318(1)-318(L)), at what Transmit Power, and at what Modulation and Coding to maximize the Utility. Hence, the PFE 352 provides an optimal link and the routes that those packets 316 should take to obtain the desired QoS. Importantly, the packet buffers 318 and prioritization are dynamically changing based on real-time information from CLAIRE 330. This helps the network to perform congestion control and load balancing (e.g., a Solar Flare knocks out all the S-Band Channels; in response, route all the traffic to the K-Band Channel). In this particular example, PFE 352 decided to forward Packets 1 and 2A to the K-Band Radio (by placing them in the top output buffer 358(1)). It decided to transmit the HTBT 340, Packets 4, 8, 9, and 5 using the X-Band Link (by placing them in the middle output buffer 358(2)). Finally, it decided to forward the HTBT and Packets 6, 3, and 7 to the UHF-Band Radio (by placing them in the bottom output buffer 358(L)). Each output buffer 318(X) is associated with a respective link X (depicted as links 1-L) defined by a particular radio 304. Each link has one or more operational channels, depending on the capabilities of its respective radio. As depicted, each link X has Kx operational channels. As an example, UHF radio 304 that implements link 1 may be capable of transmitting on 2 operational channels at once, so $K_1=2$.

Another important function of CLAIRE is to orchestrate DSA when interference is present. This is once again enabled using HTBTs 340. If the Node k 302(k) on the Earth experiences interference, its SINR 354 goes below a certain threshold value. Also, its PER would increase beyond a certain threshold value, and RSSI would increase above a certain threshold. Based on these indications, it sends a series of Critical HTBTs 340 to the Node j 302(j), requesting DSA. If the Node j 302(j), receives NHTBTs 340, and M of those HTBTs 340 are critical, it decides to move the Transmit (Tx) channel of the affected Radio 304 (e. g. X-Band Radio) from its current Operating Channel to a Backup Channel. In the meantime, the Receive (Rx) Radio 304 on Earth does the same, and the link is re-established.

Hence, CLAIRE 330 and INSPiRE 332 not only ensure that the system maintains its QoS and QoE, but that it is also robust against interference and congestion.

The CLAIRE APP User Interface helps with troubleshooting and visualization.

In one embodiment, both CLAIRE 330 and INSPiRE 332 Modules may be implemented on a Graphics Processing Unit (GPU). In some other embodiment, CLAIRE 330 and INSPiRE 332 may be implemented on a Central Processing Unit (CPU). In another embodiment CLAIRE 330 and INSPiRE 332 may be implemented on a Field Programmable Gate Array (FPGA). In another embodiment CLAIRE 330 and INSPiRE 332 may be implemented on an Application Specific Integrated Circuit. It is possible that CLAIRE 330 and INSPiRE 332 are implemented on a combination of these different processor types.

Figure 5:
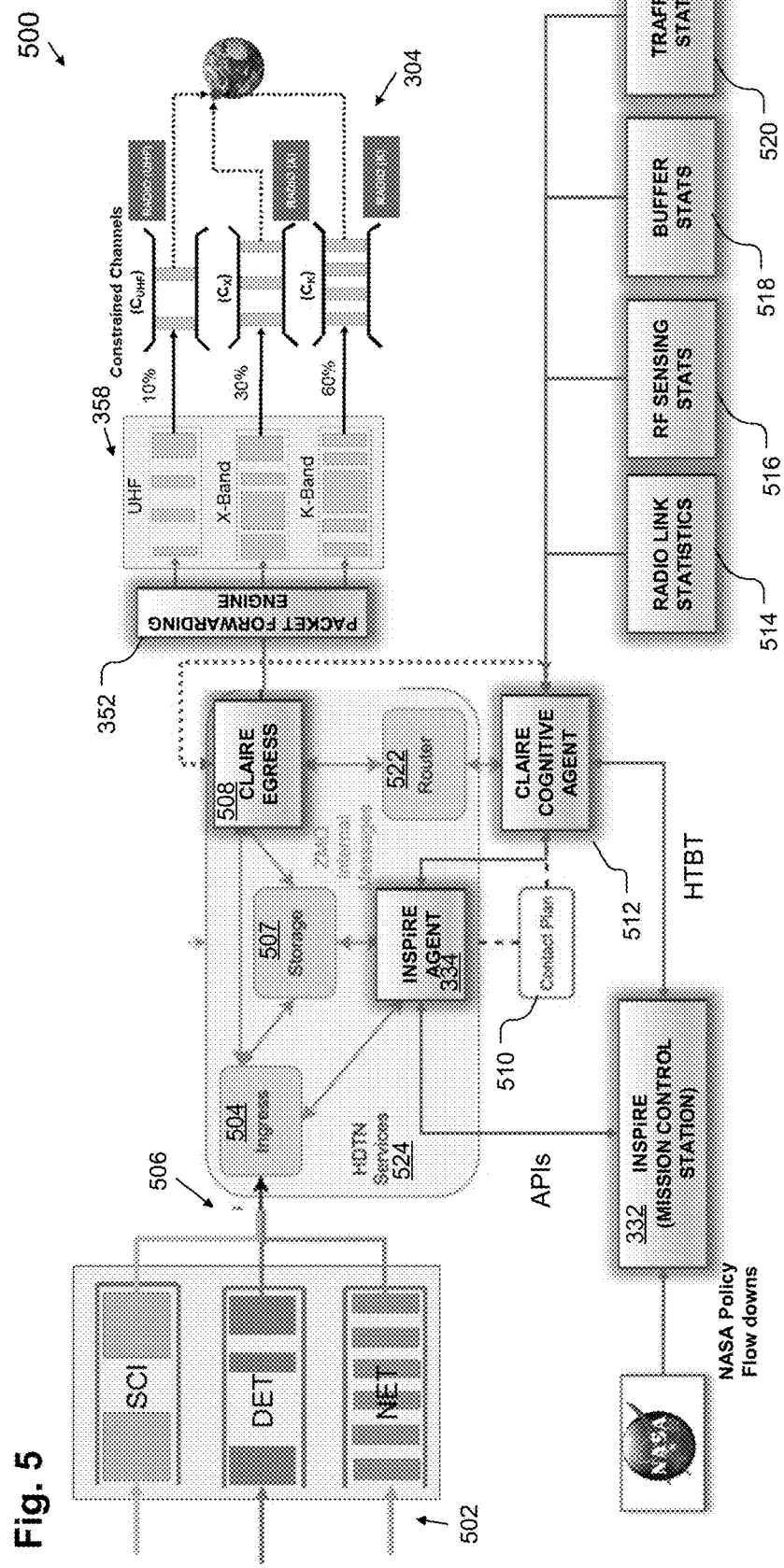
FIG. 5 illustrates an example system, apparatus, computer program products, and data structures for use in connection with one or more embodiments.
Figure 6:
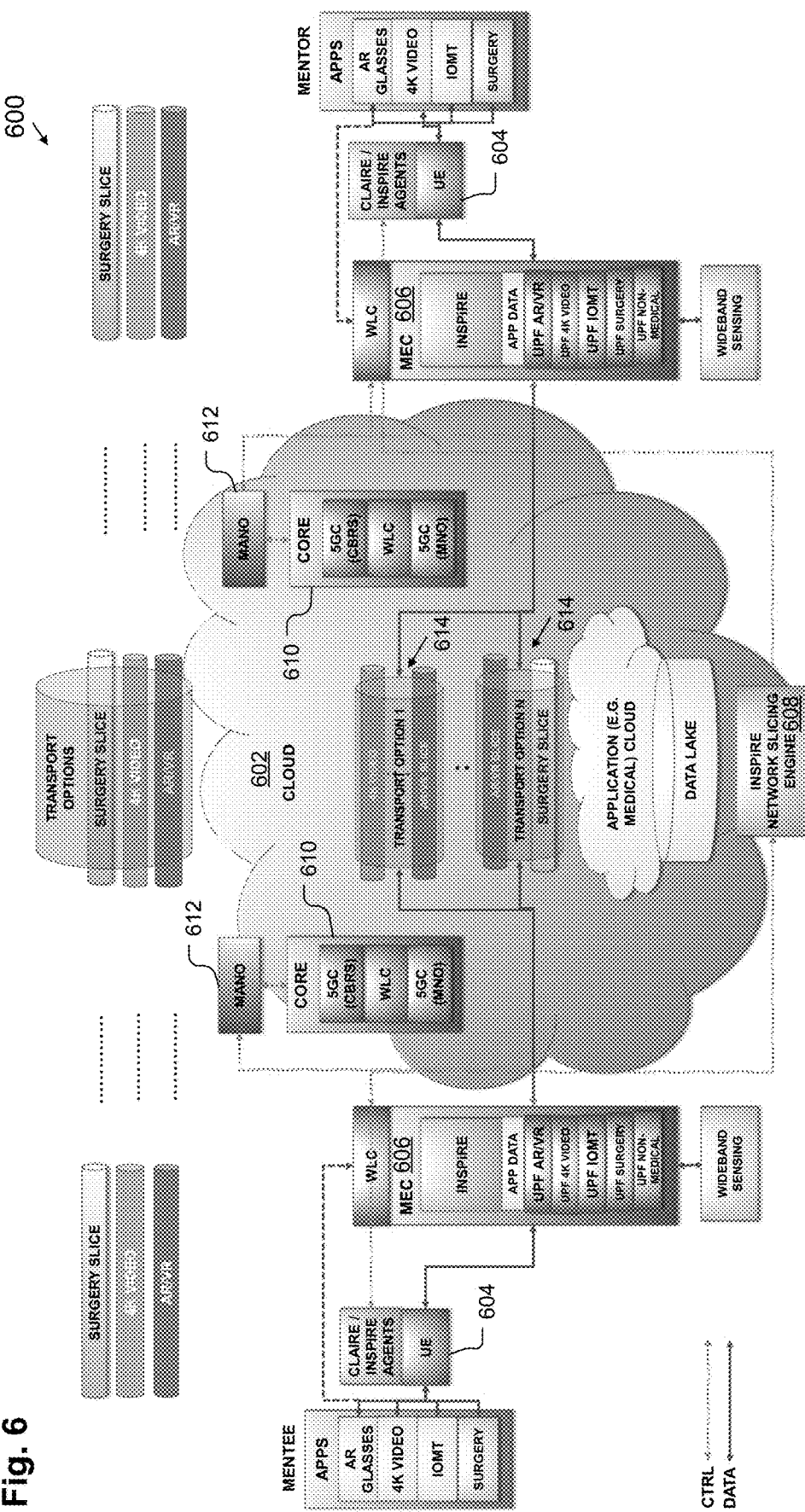
FIG. 6 illustrates an example system, apparatus, computer program products, and data structures for use in connection with one or more embodiments.
Figure 7:
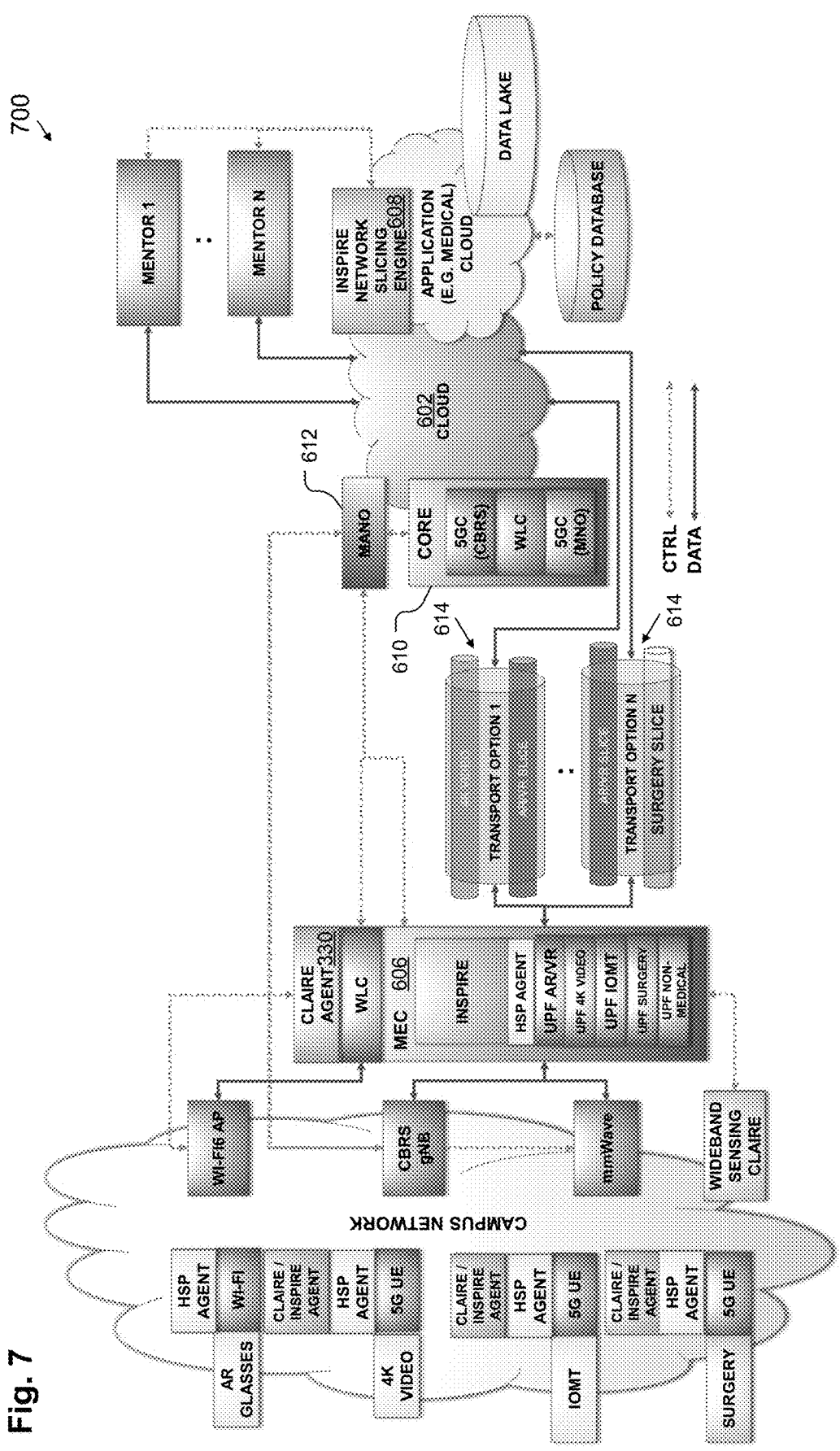
FIG. 7 illustrates an example system, apparatus, computer program products, and data structures for use in connection with one or more embodiments.

Claire and Inspire on High-Rate Delay Tolerant Network (Hdtn) Architecture:

CLAIRE 330 and INSPiRE 332 fit nicely into any communications architecture such as the High Rate Delay Tolerant Networking (HDTN) architecture 500 for NASA as shown in FIG. 5. They also fit in very nicely into a 5G communications architecture 600, 700 as shown in FIGS. 6 and 7.

High-Rate Delay Tolerant Network (HDTN): NASA Space Communications and Navigation (SCaN) is developing new communications technologies for future space missions. Communicating from Earth to any spacecraft is a complex challenge because of the extreme distances involved. When data is transmitted and received across thousands of kilometers (km) in space, the delay is significant. Delay Tolerant Networking (DTN) is NASA's solution to reliable internetworking for space missions. The HDTN project at NASA Glenn Research Center (GRC) is developing technology that can act as a high-speed path for moving data between spacecraft payloads, and across communication systems that operate on a range of different rates.

CLAIRE 330 and INSPiRE 332 extend and complement the HDTN architecture with cognitive and spectrum-aware capabilities. HDTN provides Layer 5 (Application Layer) Routing. It aims at creating overlay networks sitting on top of heterogeneous network architectures that are able to handle the long delays introduced by interplanetary connectivity. It provides capabilities to store data in absence of link connectivity and maintain end-to-end connectivity over time through buffering and reestablishment of connections. For this reason, CLAIRE/INSPiRE will sit on top of the existing HDTN architecture, and perform Layer 5 routing with decision rules that are more sophisticated than the standard HDTN rules as they will take into account explicitly the complexities of spectrum variability in the presence of RF dynamics, as well as traffic dynamics.

Consider the architecture 500 depicted in FIG. 5. Here, traffic 502 comes into the system through the three application-dependent slices managed through the INSPiRE framework, supporting traffic from SCI, NET/COM, and DET applications. Traffic 502 is then sent to the HDTN ingress block 504, in the form of HDTN bundles 506. Depending on the status of the system, application-layer DTN bundles 506 can be forwarded to the egress block 508 or stored in storage 507. The INSPiRE agent 334 provides a number of end-to-end routes that are approved given the current slicing configuration. Among the possible routes, those that are consistent with the contact plan 510 are provided to the CLAIRE cognitive agent 512.

The CLAIRE cognitive agent 512 executes the TASCOR algorithm according to information provided by the spectrum sensing module, including local information on radio link statistics 514 and RF sensing stats 516; as well as next hop information coming from peer CLAIRE agents 512 running at neighboring nodes 302, including buffer and traffic statistics 518, 520 that are necessary to calculate the differential backlogs for each possible next hop. When a bundle 506 is ready to be transmitted, the CLAIRE APP looks at information received from the neighboring nodes through HTBT messages 340. Based on that and on previous information stored in a buffer it calculates an objective function to be maximized, which includes a weighted product of link capacity and differential backlog for the three applications (NET, DET, SCI).

TASCOR is a traffic-aware joint selection of transmission interface (which radio 304 to use), which band (e. g., S band and K band), channel within the band, modulation and coding within the channel. For each combination (radio, band, channel, MCS), we calculate the link capacity based on parameters from the HTBT messages 340.

The result of the algorithm is the selection of the next hop—for each bundle 506—and of the best interface to send the traffic through. TASCOR also provides optimal Transmit Power (P) and Modulation and Coding Scheme (MCS)

The CLAIRE agent 512 interacts directly with the Router component 522 of the HDTN framework. While HDTN routing is static and only based on the contact plan, CLAIRE routing is dynamic, it can operate in real time, and it chooses routes on a bundle-by-bundle basis from options provided by INSPIRE 332 based on spectrum.

The CLAIRE TASCOR algorithm is an Application-layer Routing algorithm, that selects 1-hop routing for bundles handled by HDTN services 524. Unlike traditional routing, it operates at layer 5 on top of the traditional architecture to identify next hops based on a combination of available radio link statistics 514, RF sensing stats 516, buffer stats 518, and traffic stats 520. Once the routing decision has been taken, it overwrites the routing table in the HDTN code to modify the routing decision with respect to standard non traffic aware and not spectrum-aware routing protocol.

As an example, during a Supernova (which lasts only for about 100 seconds), NASA needs to maximize its data (High-Res imaging and video) transfer from its Lunar Telescope to the Earth. Hence, our CLAIRE Cognitive Agent 512 chooses interference free RF channels which provide a maximum throughput with a lowest latency. On the other hand, during Critical Events (e. g. Descent, Docking, Robotic Procedures in Space), CLAIRE 330 chooses the most robust RF Channels (e. g. Sub 6 GHz) to ensure that this critical data is delivered with minimum latency and maximum reliability.

Claire and Inspire on Commercial Network

CLAIRE 330 and INSPiRE 332 fit in nicely on a commercial network. FIGS. 6 and 7 shows one of the embodiments, where CLAIRE 330 and INSPiRE 332 components are applied to the commercial 5G, Wi-Fi, and Satellite Communications (SATCOM) architectures. Such a network may include an edge network having 5G and Wi-Fi. It may be supporting a wide variety of applications such as Augmented Reality (AR)/Virtual Reality (VR), Remote Surgery, Real-time Video, or Internet of Medical Things (IoMT). The users leveraging these applications desire to access data from the cloud 602, or they desire to talk to other applications. CLAIRE 33.0 and INSPiRE 332 can make the network robust and provide the necessary QoS/QoE to a wide variety of applications. CLAIRE 330 and INSPiRE 332 provide resilient communications with multiple pathways to improve security of data transmission as well as assurance that information will be delivered over a heterogeneous communications network using 5G, Wi-Fi, military communications radios, Satellite Communications, Optical Fiber communications, etc. The embodied System provides reliable and secure communication in austere, permissive, and non-permissive environments without suitable and secure network connectivity. Our CLAIRE APP or Cognitive Agent-based architecture enables resilient Communications to ensure interference mitigation via creation of High Resiliency Slices over multiple paths and transports. Such High Resiliency Slices may be formed over military trusted networks (e. g. Tactical Radios+Military Multi-Access Edge Compute (MEC) and Military Transport) or untrusted networks (e. g. Untrusted Commercial 5g, OR Commercial SATCOM) which provide mitigation against link failures and enable reliable 5G communications between devices independent of, or in concert with, established telecommunication infrastructures to provide a robust command and control (C2) policy-based routing engine. These technologies have developed a service-oriented architecture which together provide, RF, and Cross-Layer (PHY/MAC/NET) Optimization.

In one of the illustrated embodiments, CLAIRE and INSPiRE Agents as shown in FIGS. 3, 6 and 7, may reside on User Equipment (UE) 604 such as, for example, a cellular phone. The INSPiRE Engine 332 may reside at the Multi-Access Edge Computing (MEC) node 606. The INSPiRE Network Slicing Engine 608 may reside in the infrastructure cloud 602. The Network Slicing decisions are made using thousands of measurements locally and across the network which include RF/PHY/MAC and NET which form a large-scale Feature Matrices. These are then sent to the Machine Learning (ML) Engine which makes optimization decisions based on techniques such as Deep Convolutional Neural Networks (DCNN) and Deep Reinforcement Learning (DRL). In short, CLAIRE 330 provides a cross layer view of the all the environments while INSPiRE 532 scans for all available network connections between sites. In combination, both technologies will greatly improve the reliability of the system. CLAIRE 330 and INSPiRE 332 interact with the MEC node 606, 5G Core 610, and MANO functions 612 to initiate and terminate various types of Network Slices 614 which makes decisions such as which packet needs to be forwarded over which channel (e. g. 5G FR1-Sub 6 GHz, 5G FR2->6 GHz, mmWave, Wi-Fi, etc.) locally, and via which transport channel globally. It also allows the system to compartmentalize the data streams to keep it out of reach from those who do not have the need to know. In other words, CLAIRE 330 and INSPiRE 332 provide Service-Based Architecture (SBA) and Service Level Agreements (SLA) operating over 5GC Network Functions (NFs) which follow Producer-Consumer Model. The Producer-Consumer model facilitates smooth integration with over-the-top applications offering SBA services. The eMBB communication radio sessions carry multimedia services (e.g., video, AR) between the 5G network and wireless AR devices. A key aspect of reliable communications is to utilize all available links which includes non-DoD commercial satellite and even the Internet. To ensure the appropriate level of security, Zero Trust data protection may be integrated into the MEC nodes 606 at all sites. The Zero Trust model ensures that data can only be accessed by authenticated and authorized users.

Claire Design

In the following discussion, components and processes are described by way of example. Specifically, examples are provided in the context of the National Aeronautics and Space Administration (NASA) Space Communication and Navigation (SCaN) program as shown in FIGS. 8A-8D. We use the words CLAIRE, CLAIRE APP and CLAIRE Agent 330 interchangeably. These examples are provided for illustrative purposes only. Embodiments may be applied to other programs operated by NASA and/or other space agencies. Space programs (for example, the NASA SCaN program) often seek to increase mission science data return, improve resource efficiencies for missions and Communication (Comms) networks, and ensure resilience in the unpredictable space environment. Cognitive Communication in particular focuses on advances in space communication, driven by on-board data processing and modern space networking capabilities. In an embodiment, a cognitive system is configured to Sense, Detect, Adapt, and Learn or Observe, Orient, Decide, and Act (OODA) from its experiences and environment, to optimize communications capabilities for space network infrastructure.

One or more embodiments include a CLAIRE Module 330 configured to increase mission science data return, improve resource efficiencies for space missions and communication networks, and ensure resilience in the unpredictable space environment. FIG. 3 illustrates an example of a CLAIRE architecture 300 according to an embodiment.

Figure 9:
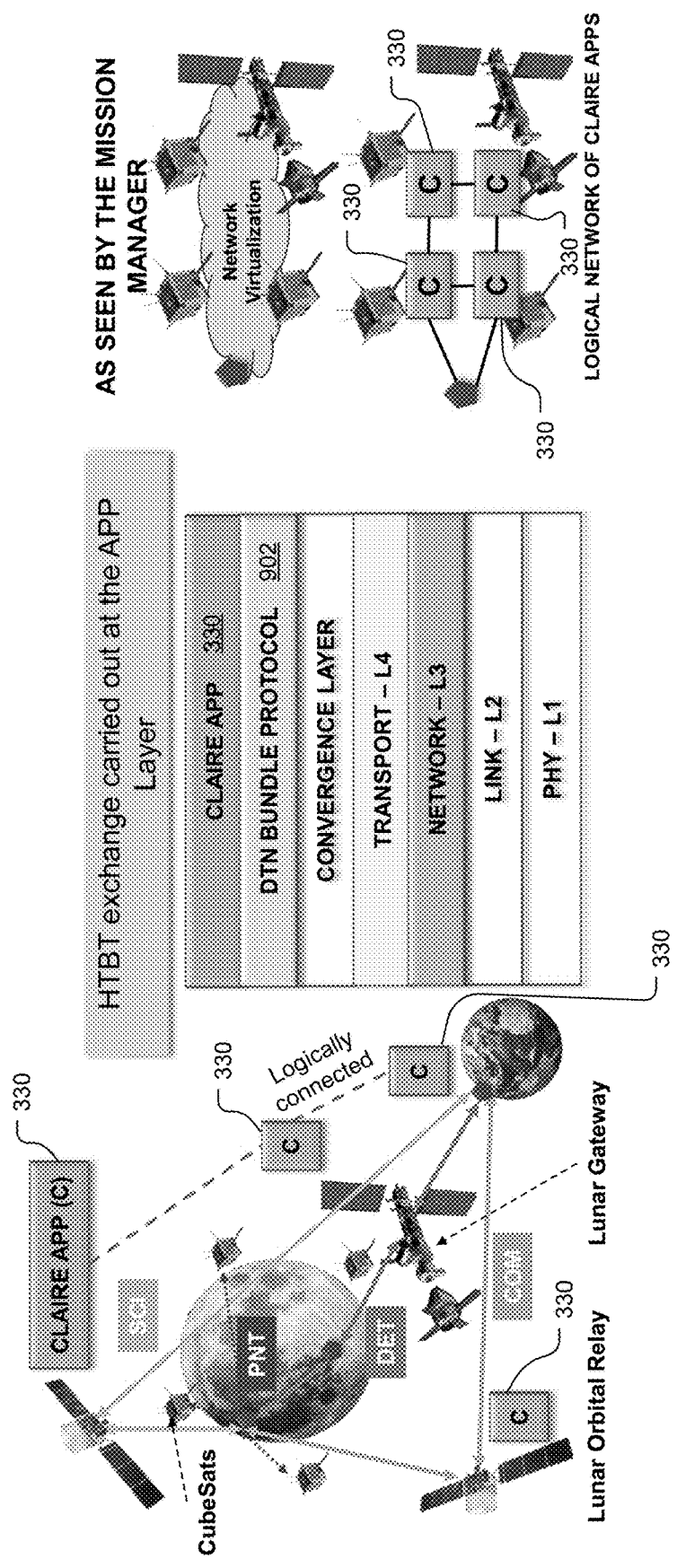
FIG. 9 illustrates an example system, apparatus, and data structures for use in connection with one or more embodiments.

In an embodiment, CLAIRE's Cognitive Control Plane is instantiated at the Application Layer (APP) as shown in FIG. 9. CLAIRE 330 is an intelligent agent-based software solution that automates network provisioning, network management, interference mitigation and congestion control. An APP based approach allows continuous addition, deletion and modification of capabilities through well defined Interface Control Document (ICD) and Application Programming Interfaces (APIs). In an embodiment, CLAIRE 330 can ride, for example, on NASA's CCSDS Bundle Protocol (CCSDS) 902 or another protocol stack that is used by the network. This architecture 300 may be applied for other future Deep Space missions or even commercial networks (e. g. 5G and Wi-Fi) because changes may be made easily. CLAIRE 330 may include an extensible protocol that allows passing of RF Spectrum Situational Awareness, Cross-Layer Sensing, Buffer Backlog, and other rendezvous information that can help with network optimization.

A Cross-Layer Sensing (CLS) module 344 and CLAIRE Decision Engine (CDE) 350 may be included on some or all of the Nodes 302, to facilitate TASCOR, intelligent Packet Forwarding, and DSA during cases of severe interference. CLAIRE Packet Forwarding may map each service packet to an appropriate Band and Channel (e.g., UHF, X-Band, Ka-Band, etc.). CLAIRE Cognitive Control Plane may be facilitated by feature-based multi-band RF Sensing that is driven by advances in Direct Digital Transceiver (DDTRX) technology. RF Sensing algorithms may include Cyclostationary Signal Processing (CSP) techniques, along with Machine Learning (ML) if needed, to detect and characterize various interference types.

CLAIRE 330 may introduce autonomy, optimization, and self-configuration to a deep space network that may suffer from large delays, interference, and service disruptions. CLAIRE 330 may help ensure that important packets are delivered to their destination(s), hence avoiding congestion due to unnecessary traffic. CLAIRE 330 may facilitate future network function virtualization and network slicing, taking the space agency from link optimization to network optimization, to create compartmentalization of requests and services. CLAIRE 330 may reduce both the mission and network operations burdens, while providing control to the Mission Manager to disengage when manual control is desired.

Figure 8A:
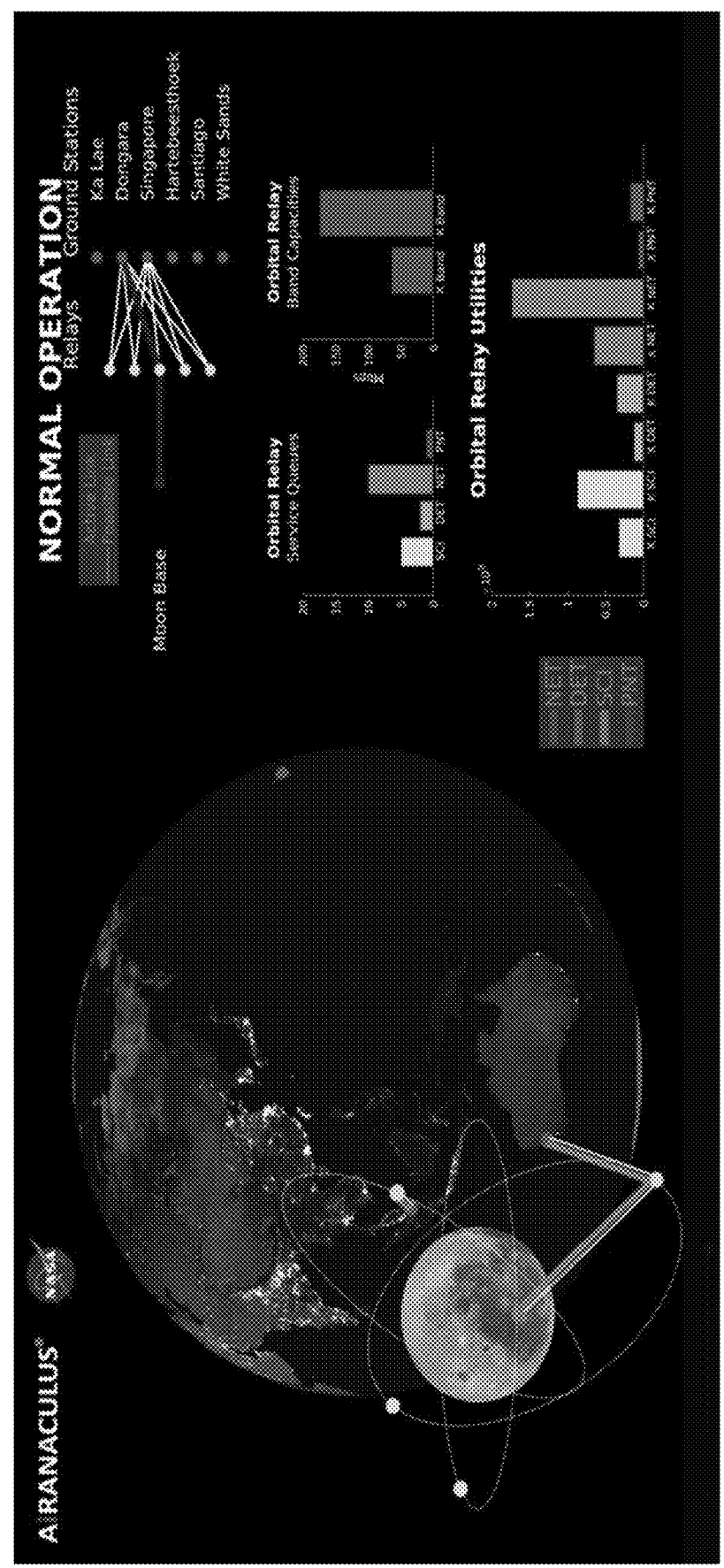
FIGS. 8A-D illustrate an example system, apparatus, and data structures for use in connection with one or more embodiments.
Figure 8B:
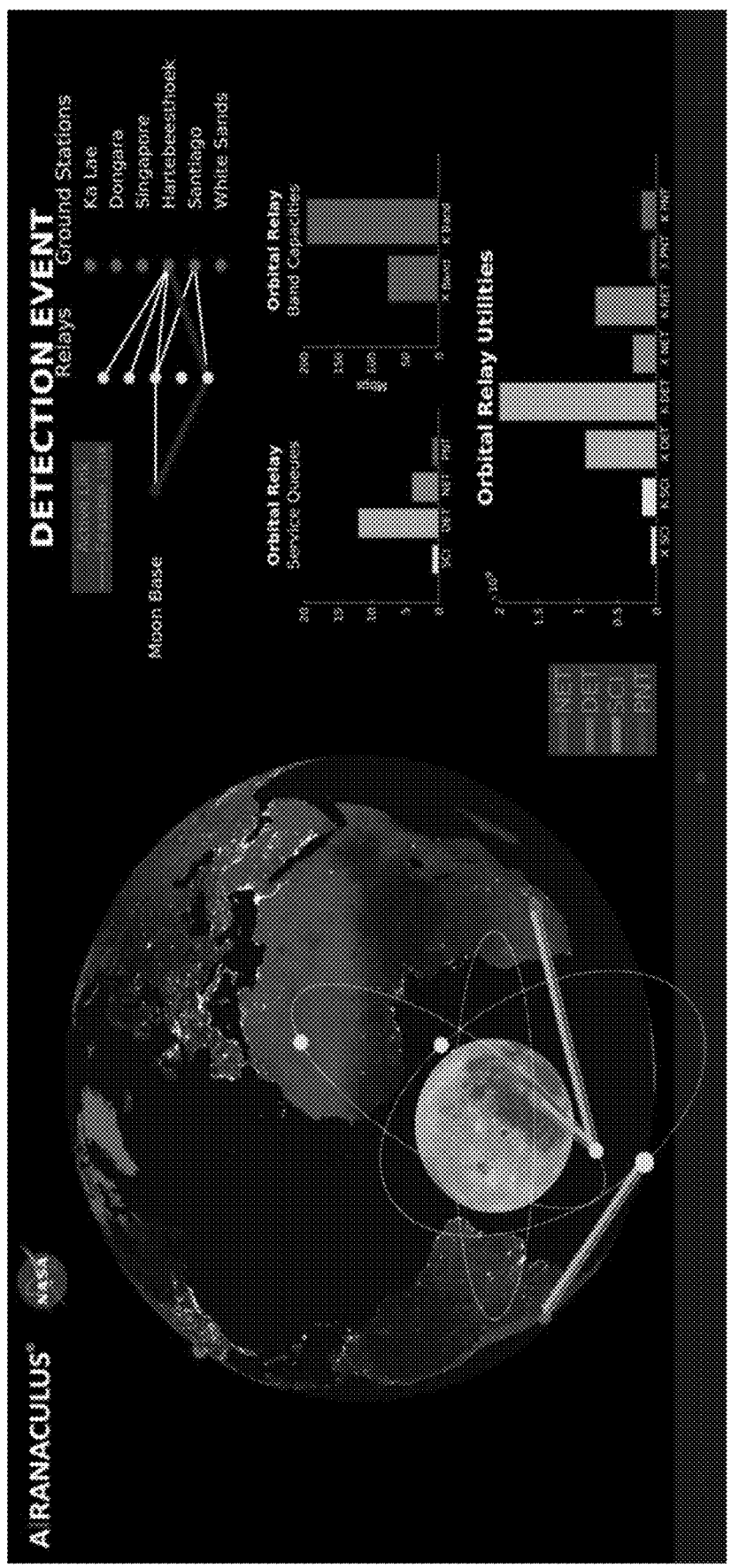
Figure 8C:
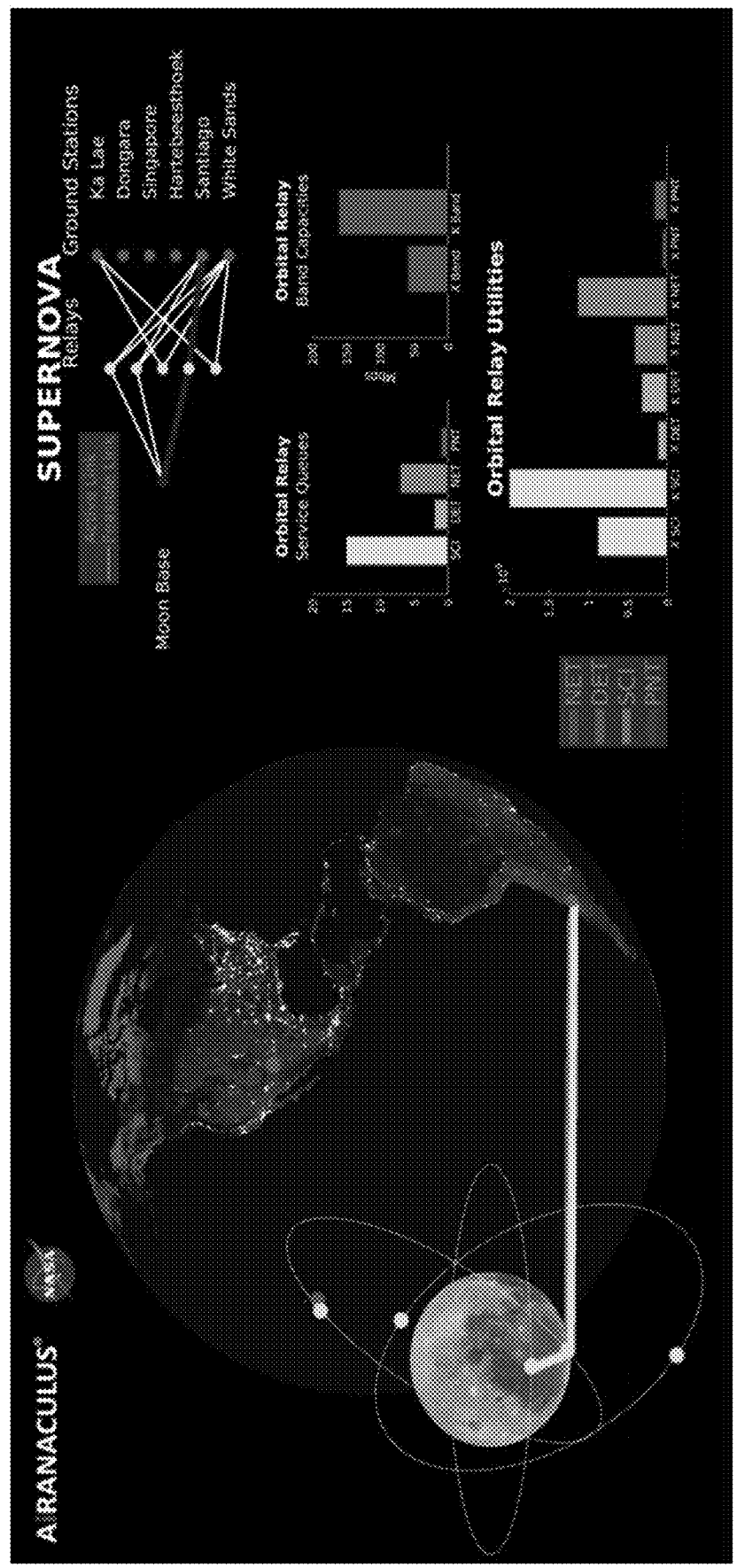
Figure 8D:
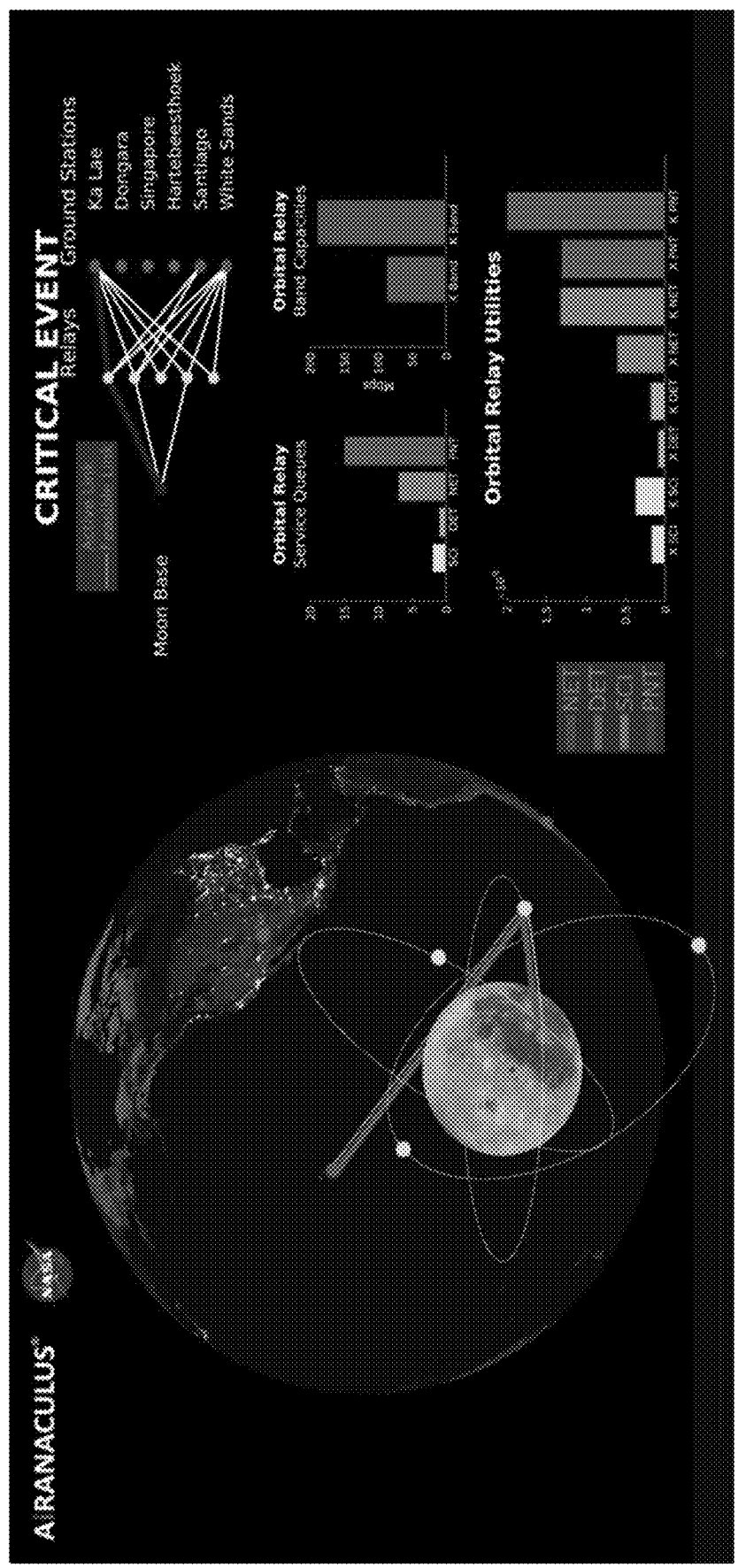

FIGS. 8A-D illustrate an example of a CLAIRE simulations according to an embodiment. FIG. 8A depicts normal operation. The testbed may be applied to various scenarios, such as solar flares, supernova (FIG. 8Q, detection events (FIG. 8B), critical events (e.g., during docking and descent) (FIG. 8D), etc., to model how the CLAIRE Cognitive Plane may help a space agency to fulfill its mission needs. In this example, an independent code base for visualization includes CLS, TASCOR, PF (described in further detail below), and feature-based RF sensing (described in further detail below). In an embodiment, these code bases may be integrated, converted to C and/or another programming language, and parallelized (e.g., using CUDA and/or another framework).

Figure 10:
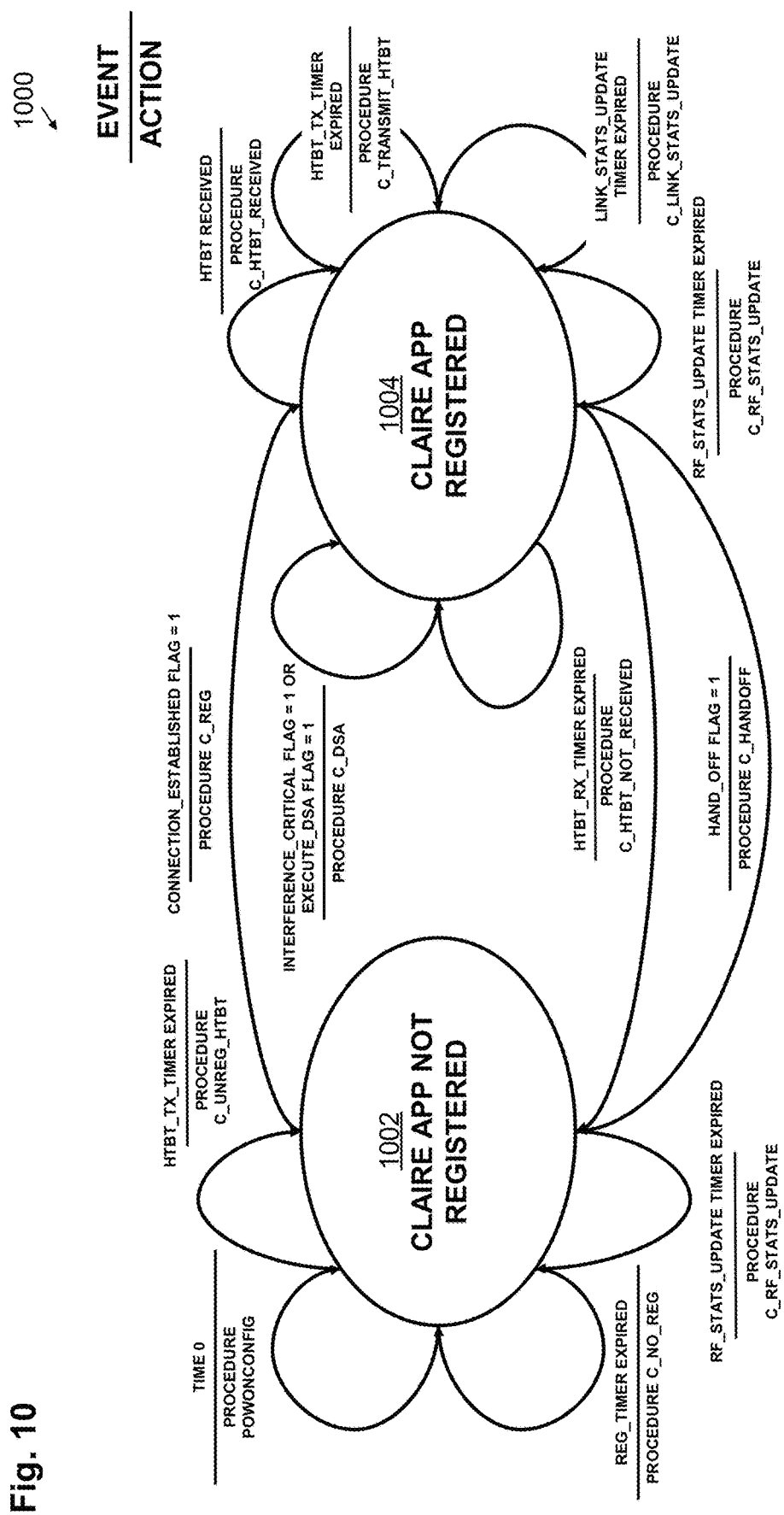
FIG. 10 illustrates an example state diagram for use in connection with one or more embodiments.

The CLAIRE Agent 330 is driven by a State Machine. FIG. 10 shows one embodiments of the CLAIRE Agent's State Machine Diagram 1000. The State Machine Diagram 1000 determines the operation of the CLAIRE APP 330.

We envision two States 1002, 1004 for the CLAIRE APP 330:

Not Registered State 1002: When the CLAIRE APP 330 has not received a HTBT Message 340 from any node 302 in the network. This means that the connection is yet to be established.

Registered State 1004: When the CLAIRE APP 330 has received a HTBT message from one of the nodes 302 in the network. This means that the connection has been established.

The diagram is composed of Events, Transitions, Procedures, Thresholds, Timers, and Flags. The Tables below show the description of the Timers, Flags, Events as well as some Procedures. The State Machine Diagram 1000 applies to a particular Node 302 and illustrates what happens on the Transmit and the Receiver side when in presence of different Events occurring.

Tables 2-4 provide some examples of Timers, Flags and Thresholds. FIGS. 12 to 22 provide examples of the various procedures which are triggered by corresponding events. Within the State Machine Diagram 1000, Events trigger the corresponding Procedures. These are represented as EVENTS/PROCEDURE. As an example, when an event is INTERF_CRITICAL_FLAG=1, this will make the CLAIRE APP execute Procedure CLAIRE DSA (C_DSA).

TABLE 2

An illustration of CLAIRE APP Timers

| # | TIMERS | DESCRIPTION | VALUE (PRGRAMMABLE) |
|---|---|---|---|
| 1 | WAIT_BEFORE_RENDEZVOUS | Wait before switching to Channels | 20 Seconds |
| 2 | LINK_STATS_UPDATE | Obtain Link Statistics from the Radios (RSSI, SINR, PER, Differential Buffer Backlogs-HTBT) | 2 Seconds |
| 3 | RF_STATS_UPDATE | Obtain RF Statistics from the Sensor (Relative Noise Floor/RSSI for each Channel, Tones, Spurs, Occupied Signal for each Channel, Interference Detected) | 2 Seconds |
| 4 | HTBT_TX_TIMER | Transmit a Heartbeat every HTBT_TIMER Seconds once a connection is established | 2 Seconds |
| 5 | HTBT_RX_TIMER | Time it takes to receive a HTBT. Not receiving HTBT for X Seconds means that the connection is lost. | 20 Seconds |
| 6 | REG_TIMER | Time to wait on a Channel to receive a Registration. If Registration is not received on a Channel for Y Seconds, then move. | 30 Seconds |

TABLE 3

An illustration of CLAIRE APP Flags

| # | FLAGS | DESCRIPTION | VALUE | INFORMATION |
|---|---|---|---|---|
| 1 | INTERFERENCE_DETECTED | RF Sensor detected interference on an Occupied Channel | Array-{1, 0} | Channels List |
| 2 | INTERFERENCE_CRITICAL | RF Interference on a Channel is Critical. Corroborated through Link Statistics-RSSI > $TH_{RSSI}$ and SINR < $TH_{SINR}$. Severe Throughput Degradation | Array-{1, 0} | Channels List |

TABLE 3-continued

An illustration of CLAIRE APP Flags

| # | FLAGS | DESCRIPTION | VALUE | INFORMATION |
|---|---|---|---|---|
| 3 | CONNECTION_ESTABLISHED | Received the HTBT Message from at least One of the Radios | 1/0 | |
| 4 | EXECUTE_DSA | Node j is about to enter into the Rendez-vous Mode for Band X. Informing Node i to be ready. | 1/0 | |
| 5 | CHANNEL_SEARCH_MODE | The Receiver goes in a round robin fashion searching for connectivity in a Band | 1/0 | |
| 6 | SOLAR_FLARES | CLAIRE Node receives information from RF Sensing or from NASA that Solar Flares are happening and which Bands are impacted | 1/0 | Impacted Channels List |
| 7 | MISCONFIGURED_RADIO | RF Sensing finds a misc-configured Radio | 1/0 | Channel List, Modulation Type |

TABLE 4

An illustration of CLAIRE APP Thresholds

| # | COUNTERS | DESCRIPTION | VALUE (PRGRAMMABLE) |
|---|---|---|---|
| 1 | M_OF_N_HTBT_INTERF_CRITICAL | M of N of Consecutive HTBTs received from the same Node i, with Interference Critical Flag = 1 before DSA is orchestrated | M of N (3 or 4) |
| 2 | RSSI_TH | RSSIavg > RSSI_TH, is one of the conditions which suggests that the interference is happening. | 10 dBm |
| 3 | SINR_TH | When SINRavg < SINR_TH, is one of the conditions which suggests that the interference is happening | 3 dB |
| 4 | PER_TH | When PERavg > PER_TH, then link is degrading. Potential cause could be interference. | 10% |
| 4 | NUM_AVG_RADIO_STATS | RSSIavg and SINRavg are computed over these many instantaneous values | 10 |
| 5 | NUM_CRITICAL_HTBTS | Number of Critical HTBTs that need to be transmitted when interference is critical and M of N threshold has been exceeded. | 20 |

Figure 11:
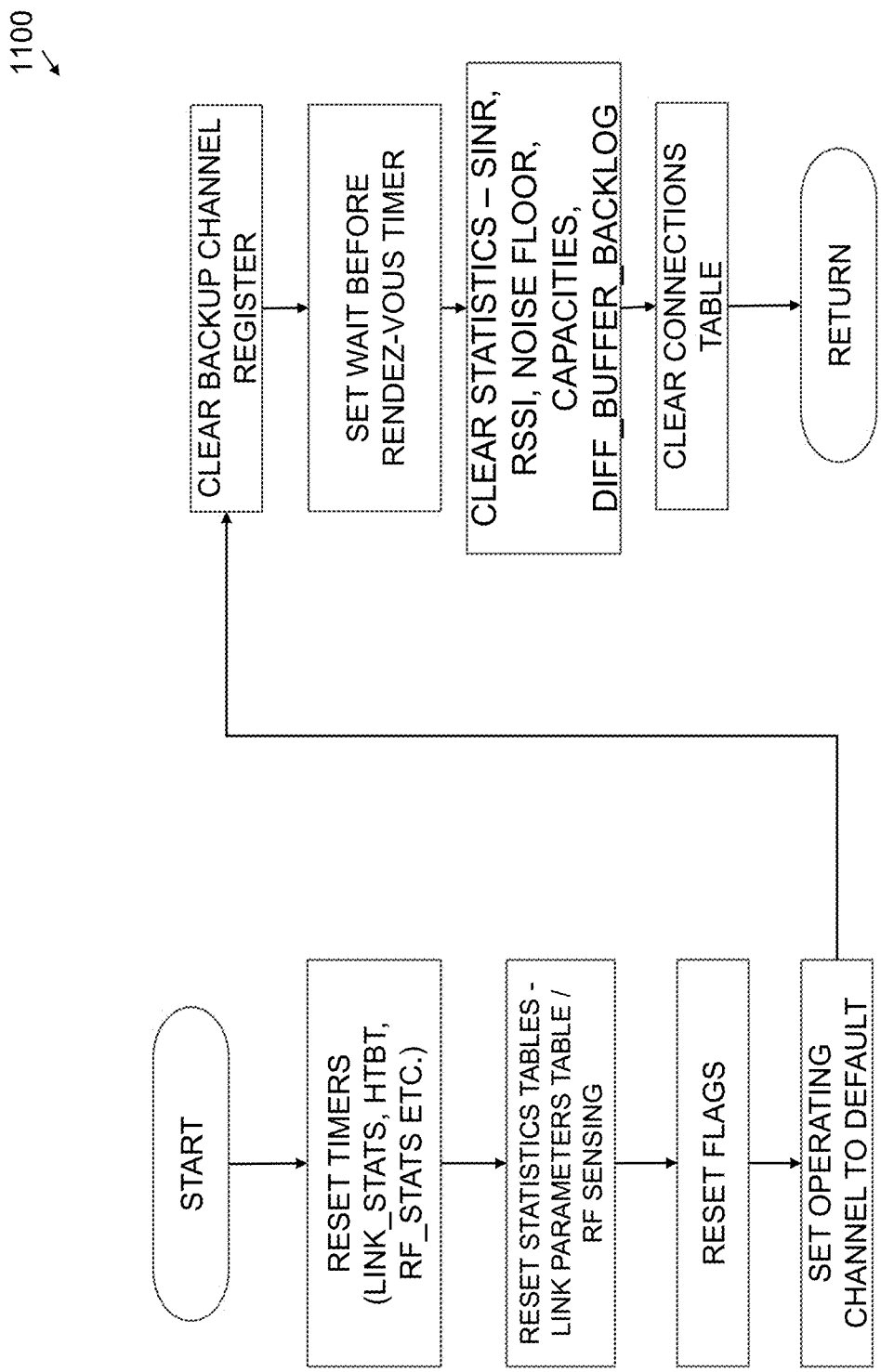
FIGS. 11-18 illustrate example methods for use in connection with one or more embodiments.

FIG. 11 depicts a POWONCONFIG procedure 1100 that may be executed when the Power is turned ON.

Figure 12:
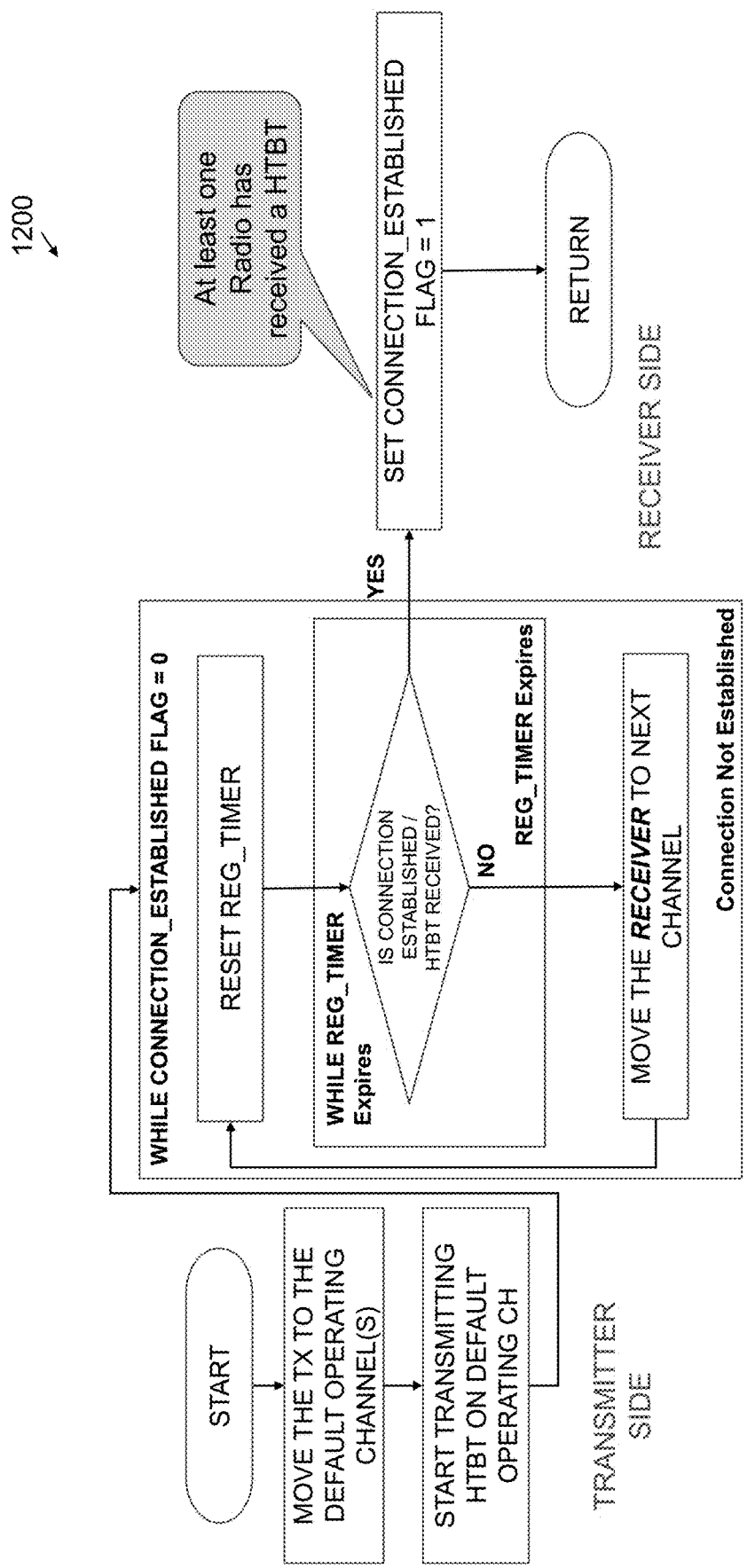

FIG. 12 depicts a C_NO_REG Procedure 1200 that may be executed when CLAIRE 330 is in the Not Registered State 1002, and, while keeping the Transmit (Tx) Node on one of the channels, it cycles through various Receive (Rx) Channels to connect to a Node 302 in the network.

Figure 13:
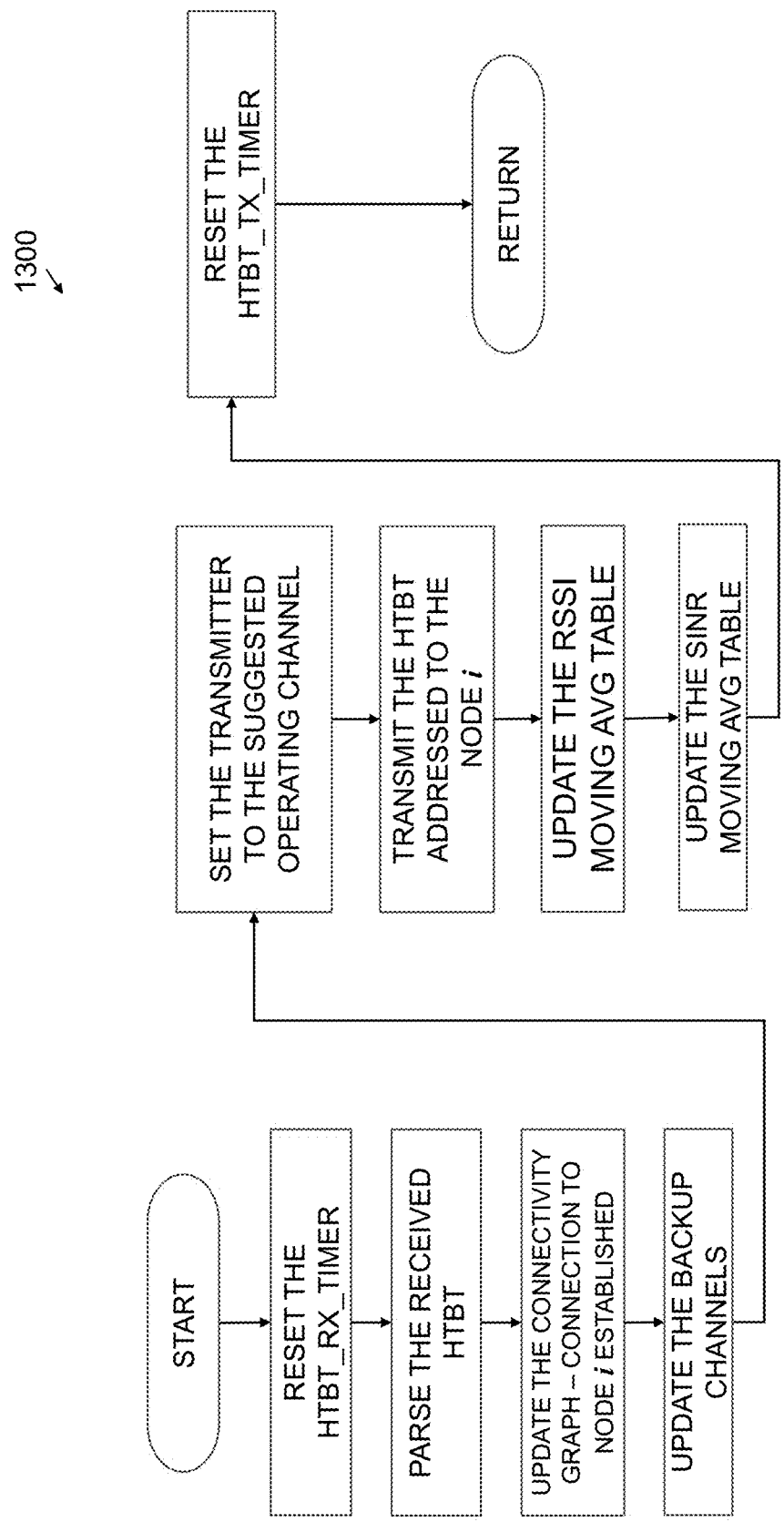

FIG. 13 depicts a C_REG Procedure 1300 that may be executed when CLAIRE 330 receives a HTBT message 340 from one of the nodes 302 in the network. This means that a connection has been established. In other words, the CONNECTION_ESTABLISHED FLAG turns to 1 from 0.

Figure 14:
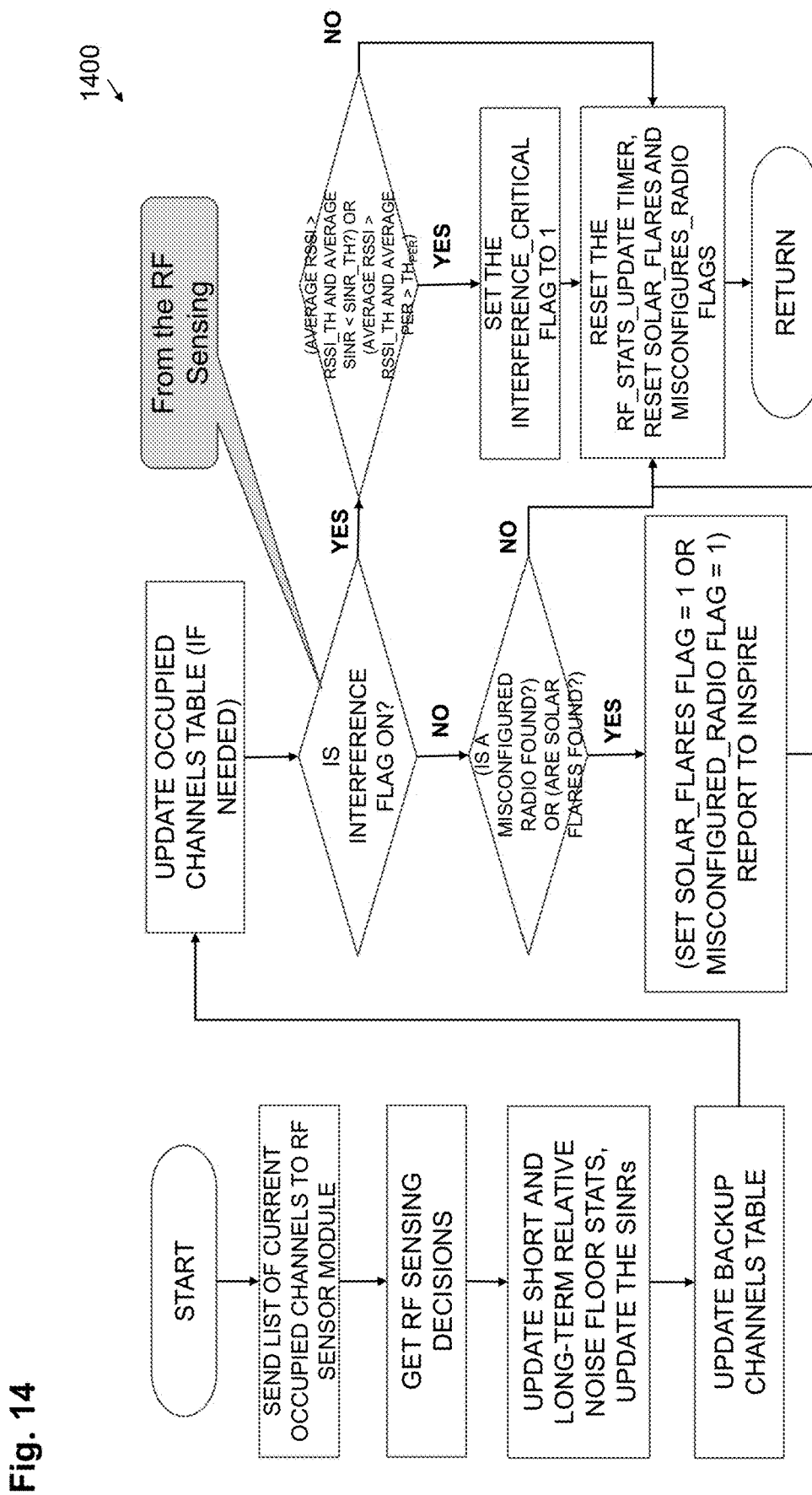

FIG. 14 depicts a RF_STATS_UPDATE Procedure 1400, which is a periodic update from the RF Sensing Module 346 which may be located on an RF Sensing Device. An event is that the RF_STATS_UPDATE Timer has expired.

Figure 15:
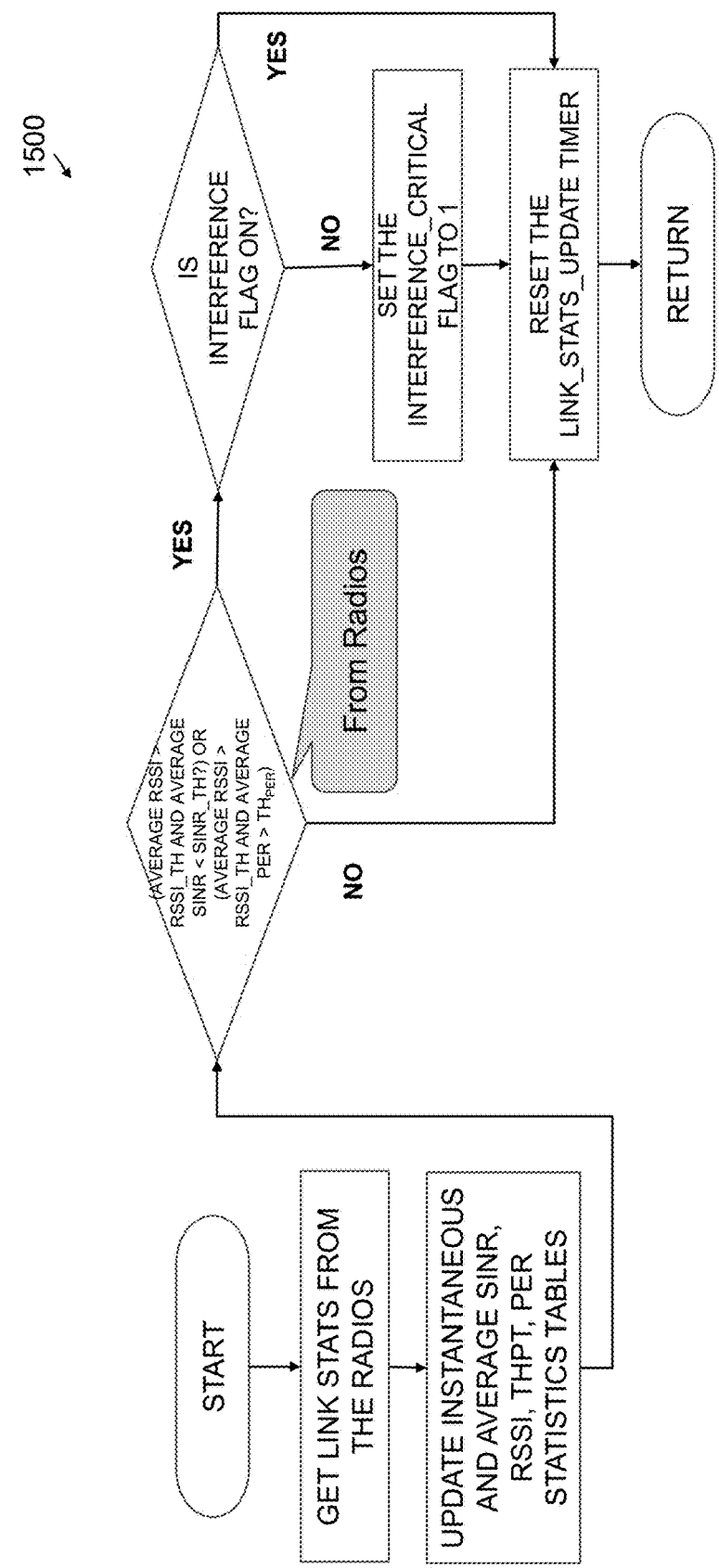

FIG. 15 depicts a C_LINK_STATS_UPDATE Procedure 1500, which fetches the Cross Layer Statistics from the Radios 304. This happens periodically when the LINK_STATS_UPDATE Timers expires.

Figure 16:
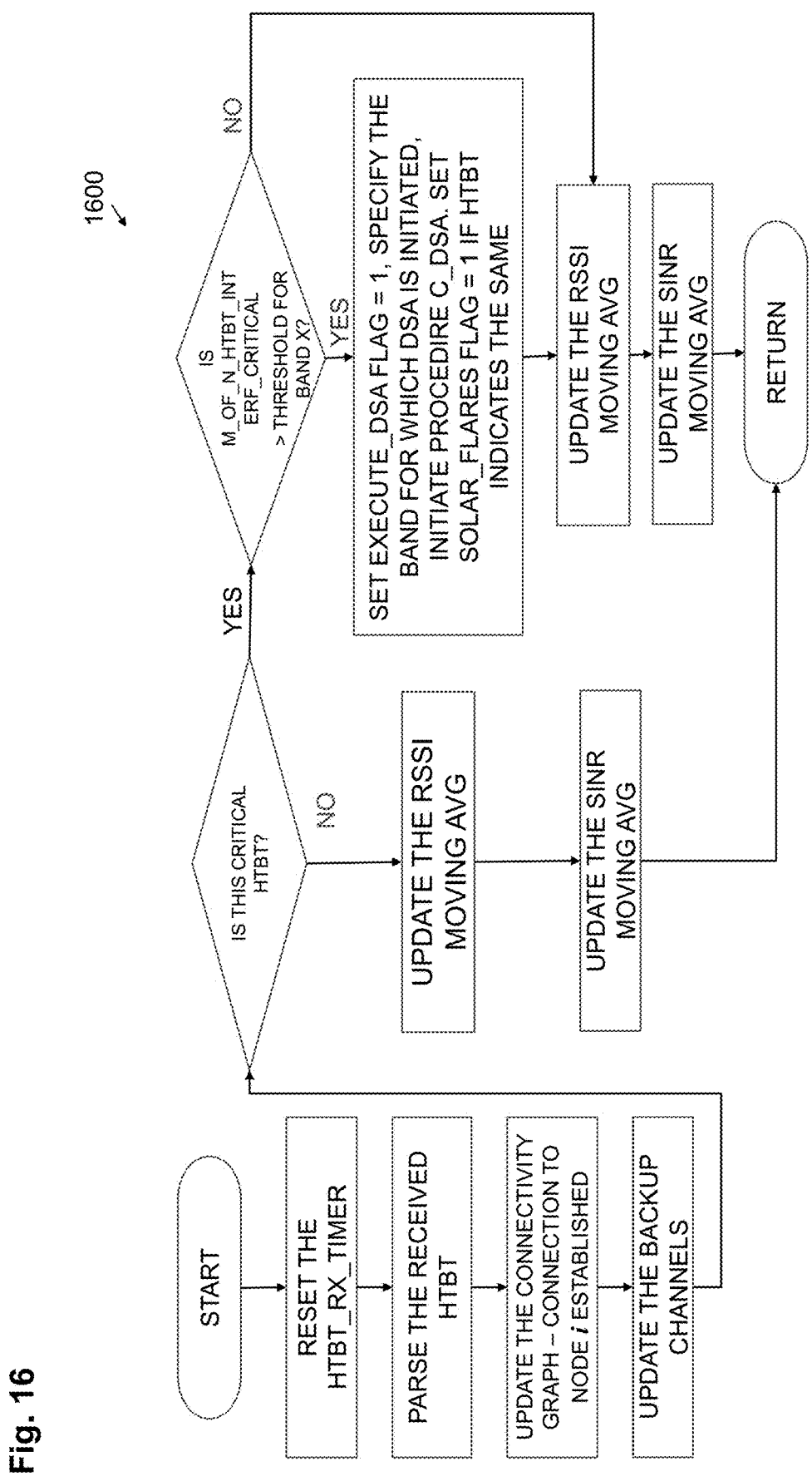

FIG. 16 depicts a C_HTBT_RECEIVED Procedure 1600, which corresponds to an Event when a HTBT 340 is received in the Registered State 1004.

Figure 17:
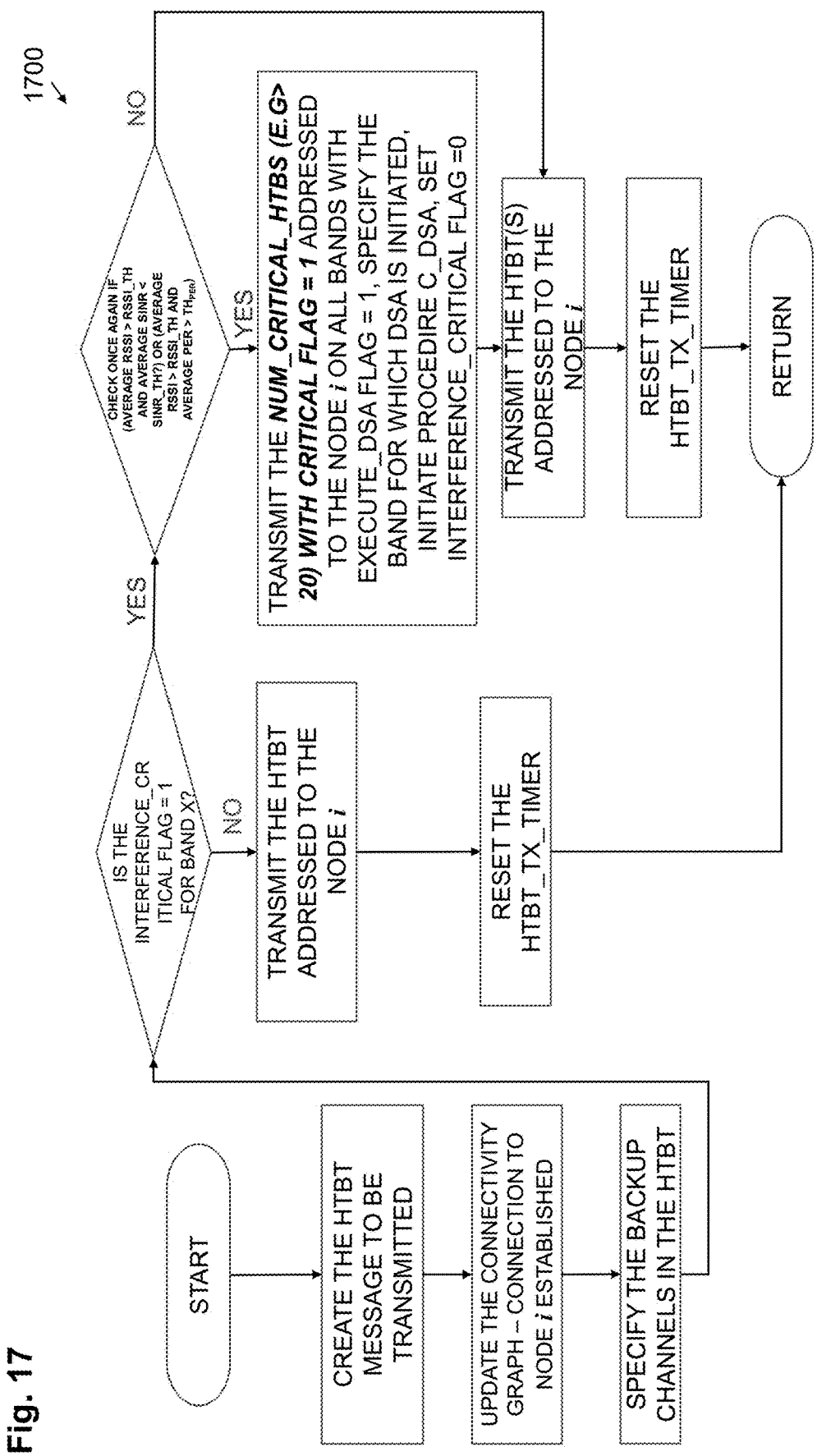

FIG. 17 depicts a C_TRANSMIT_HTBT Procedure 1700, which corresponds to an Event when the HTBT_Transmit Timer is expired.

Figure 18:
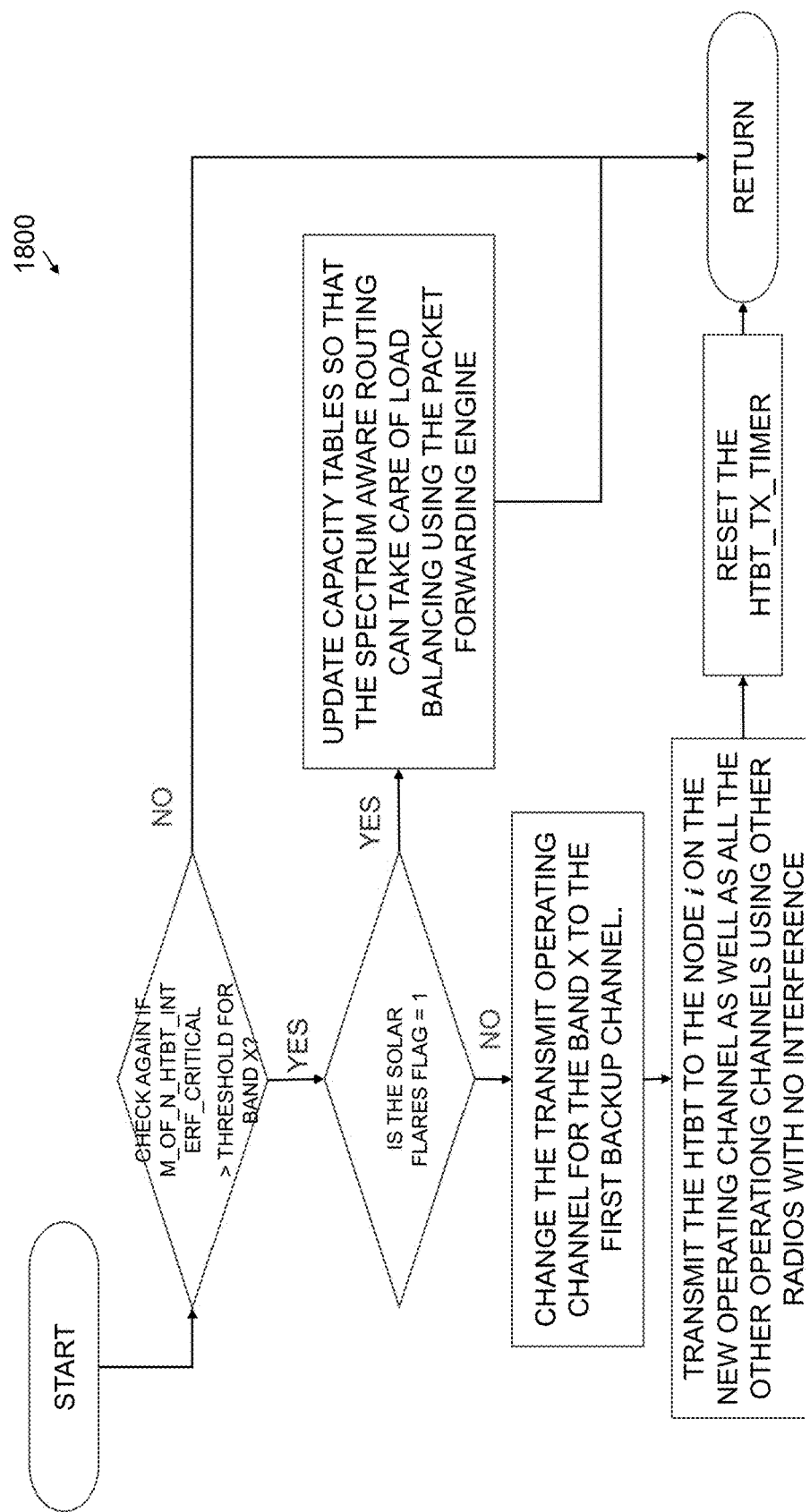

FIG. 18 depicts a C_DSA_TRANSMIT Procedure 1800, which corresponds to an Event at the transmit side when the EXECUTE_DSA Flag=1.

Figure 19A:
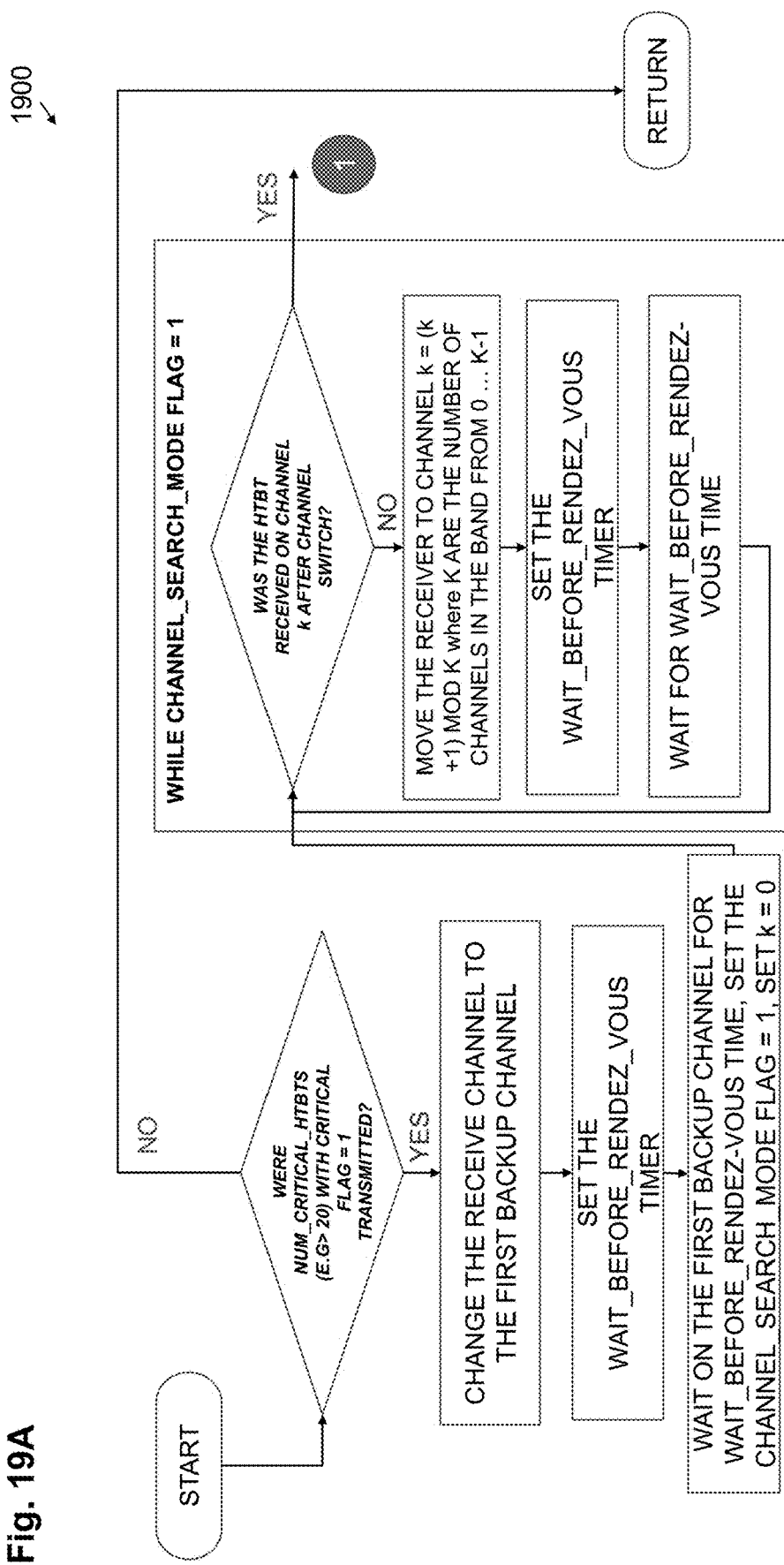
FIGS. 19A-B illustrate an example method for use in connection with one or more embodiments.
Figure 19B:
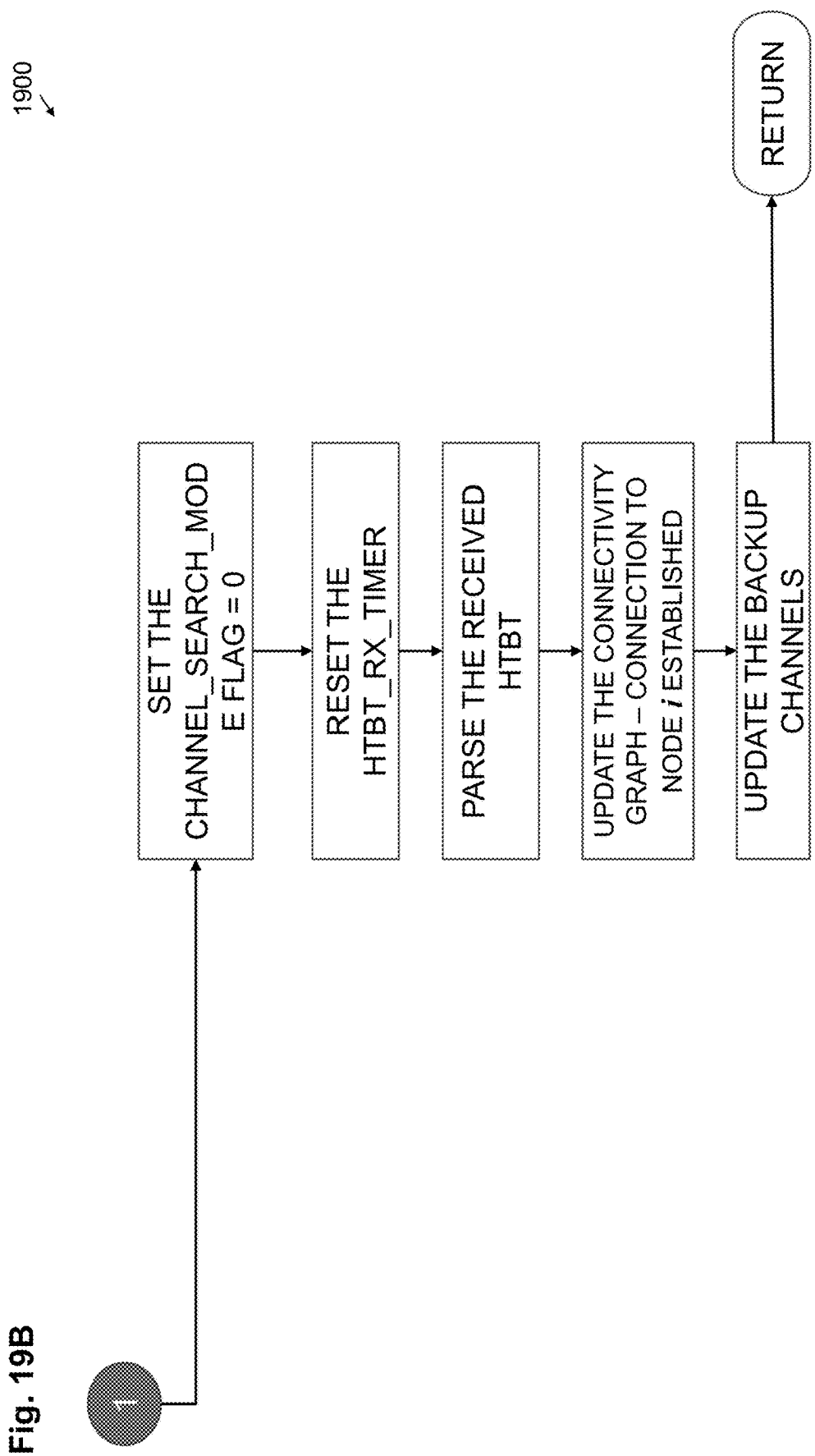

FIGS. 19A-19B depict a C_DSA_RECEIVE Procedure 1900, which corresponds to an Event at the receive side when the EXECUTE_DSA Flag=1.

Figure 20:
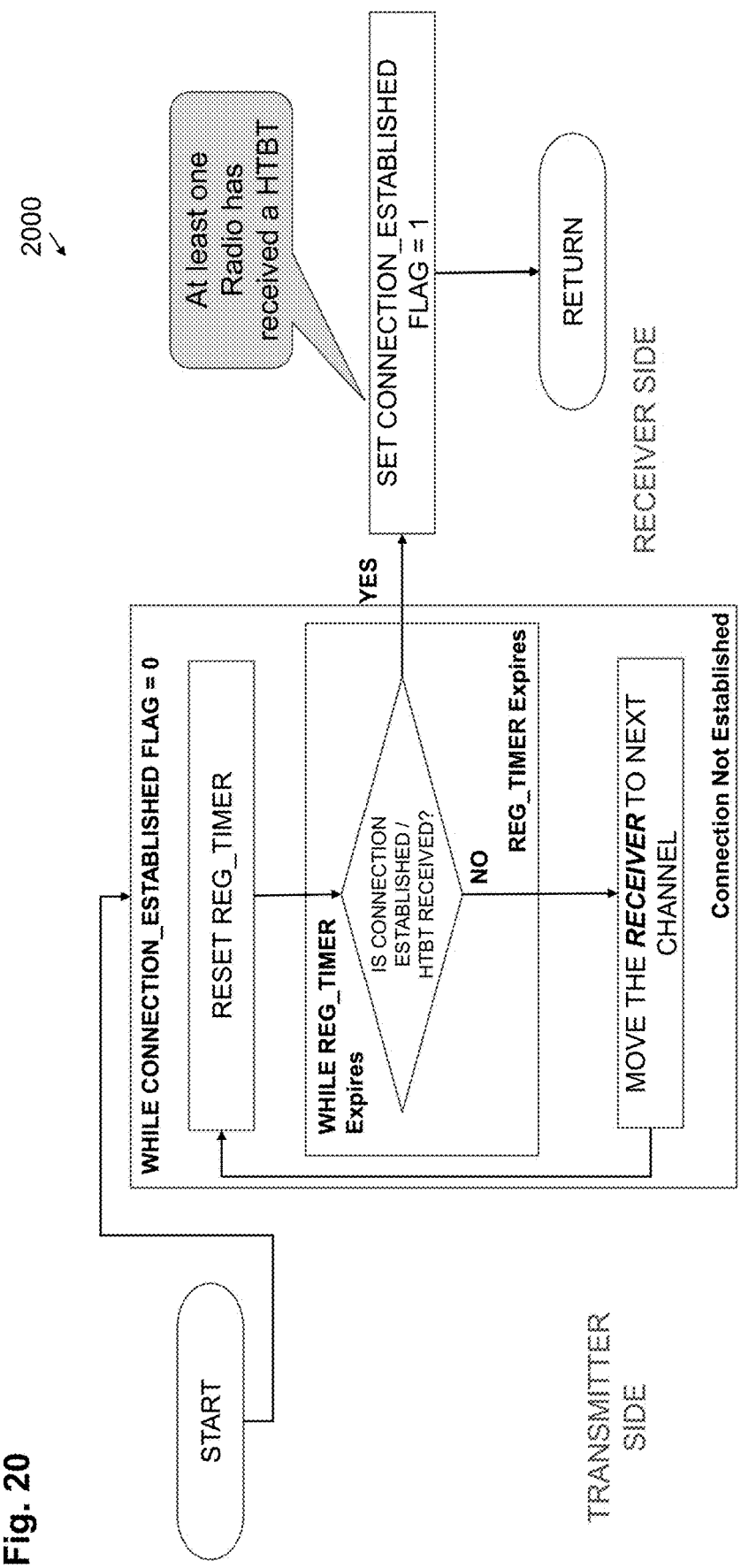
FIGS. 20-22 illustrate example methods for use in connection with one or more embodiments.

FIG. 20 depicts a C_HTBT_NOT_RECEIVED Procedure 2000, which corresponds to an Event when the HTBT_RX_TIMER is expired and no HTBTs 340 have been received.

Figure 21:
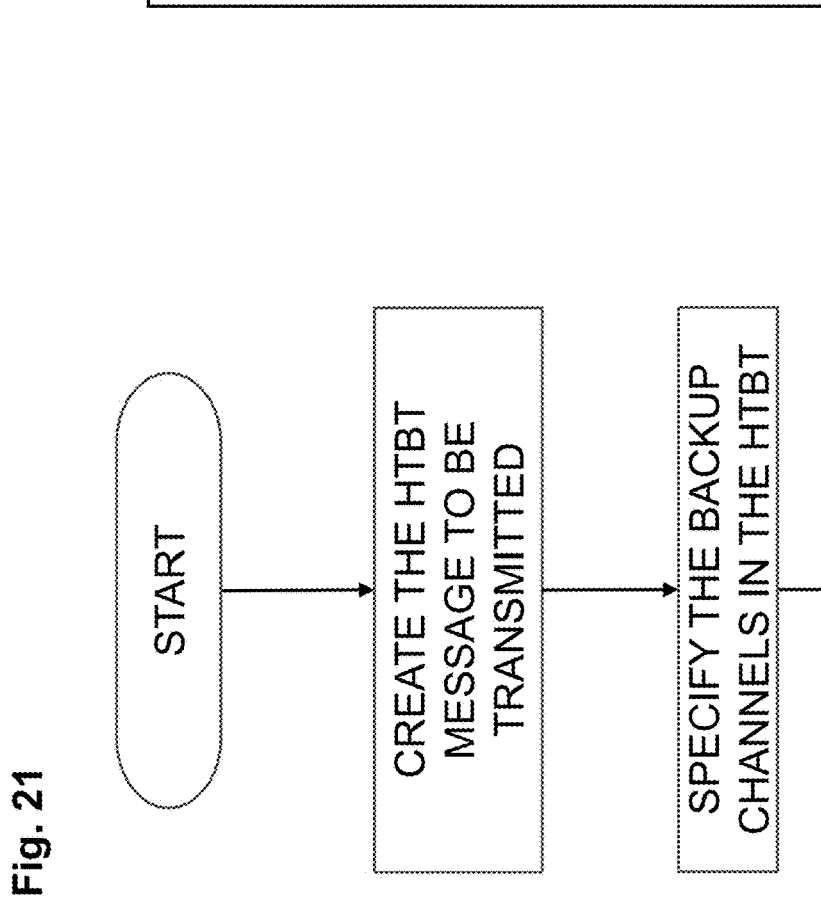

FIG. 21 depicts a C_TRANSMIT_HTBT Procedure 2100, which corresponds to an Event when the HTBT_TX_TIMER is expired and the CLAIRE APP 330 is in the Un-registered State 1002. It assumes a transmitter can still talk to a receiver.

Figure 22:
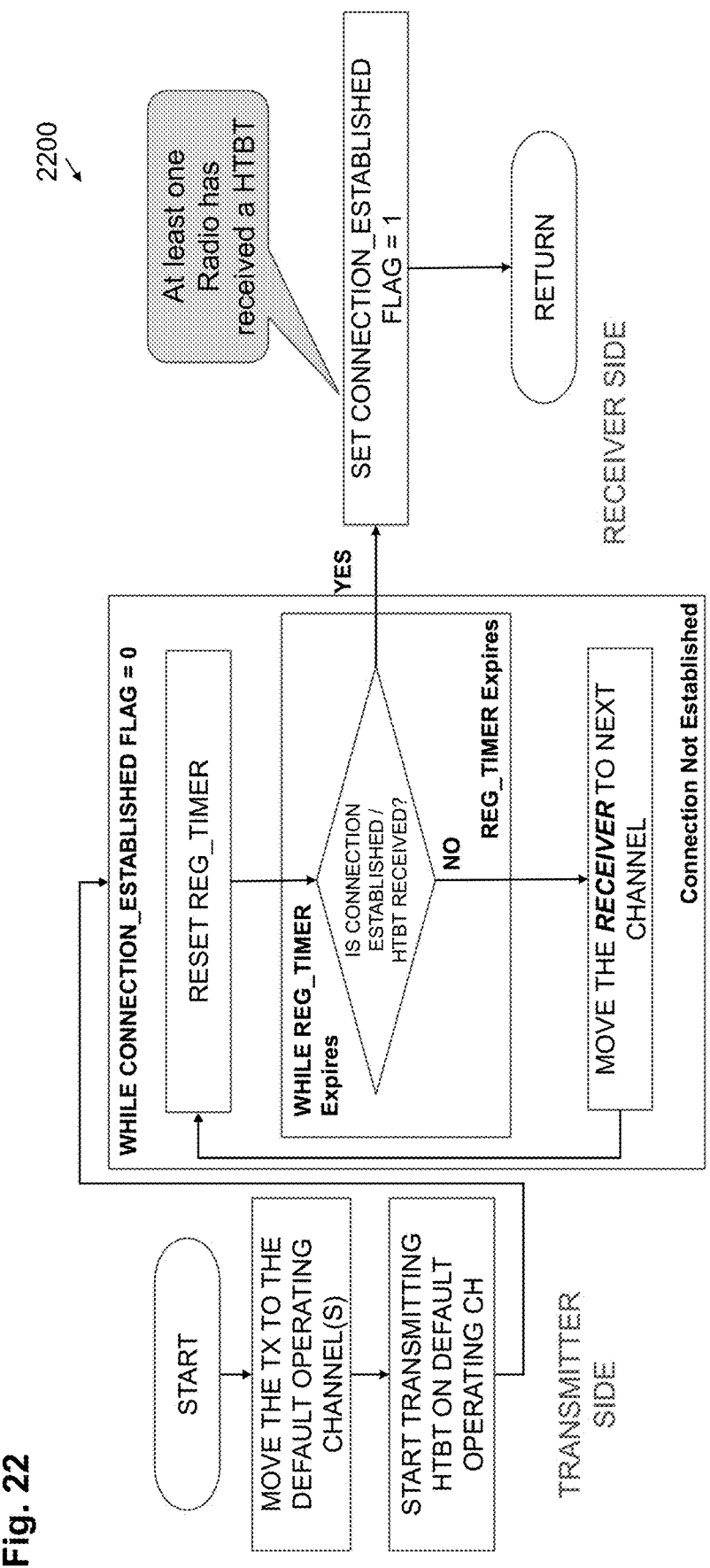

FIG. 22 depicts a C_HANDOFF Procedure 2200, which happens when Nodes 302 can no longer remain connected (e.g., an Orbital Relay moves behind the Lunar surface).

Figure 23:
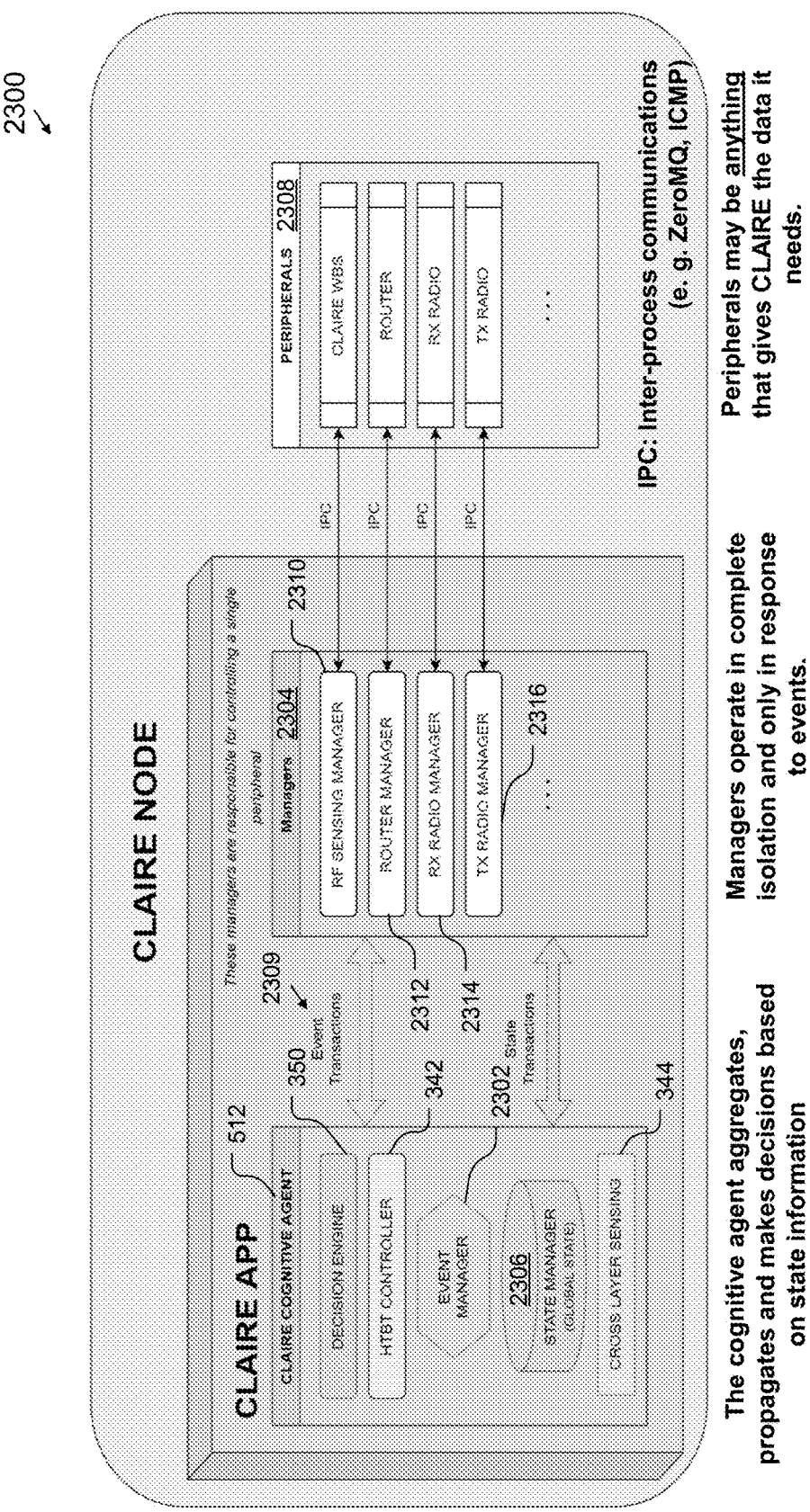
FIG. 23 illustrates an example apparatus, computer program products, and data structures for use in connection with one or more embodiments.

FIG. 23 shows the internal software architecture 2300 of CLAIRE 330. As depicted, it is separated into three distinct tiers. Each tier has a set of components with a specific level of responsibility.

The first tier, the CLAIRE Cognitive Agent 512, is the brain of CLAIRE 330 which is responsible for the decision making process. It is a set of components, which include:
  The Cross Layer Sensing module 344, which makes decisions on detection and characterization of the problem with the network.
  The Decision Engine 350, which is the where the decision-making logic is implemented.
  The HTBT Controller 342, which manages the coordination between two nodes via the HTBT protocol.
  The Event Manager 2302, which is where all the runtime activities occur.

The Event Manager 2302 essentially allows components, such as the Managers 2304 and the Decision Engine 350, to communicate with each other what they want at high level without either of them having to know the details of the other's implementation. It also allows us to translate the event driven design of CLAIRE 330 into an event driven implementation. The CLAIRE Cognitive Agent 512 also includes a state manager 2306 that deals with handling the global state of the system. It aggregates, propagates, and makes decisions based on state information. It does all this coordination through high level event messages.

Managers 2304: In the middle are several components in the manager category. Each manager 2304 is connected to a single peripheral 2308 through some form of Inter Process Communications (IPC) that enables two-way communication. In one embodiment, ZeroMQ (ZMQ) sockets for IPC may be used, but the IPC can be anything, such as Internet Control Message Protocol (ICMP), for talking to the radios 304. These manager components 2304 are single-responsibility peripheral controllers which primarily interact with the core and with each other through event transactions 2309 via the Event Manager 2302. Each Manager 2304 is tasked with subscribing to the high-level decision events emitted by the Decision Engine 350 and using the data from the global state to control its own peripheral.

The managers 2304 may include an RF sensing manager 2310, a router manager 2312, an Rx radio manager 2314, and a Tx radio manager 2316.

The key idea behind this separation is that we can apply the logic of CLAIRE's components (such as the Decision Engine 350 and CLS module 344) agnostic to peripherals 2308 attached to the CLAIRE node 302 as long as a well-defined Interface Control Document (ICD) and Applications Programming Interface (API) exists. Hence, the managers 2304 are the glue between CLAIRE 330 and the peripherals 2308 or the adapters that provide flexibly to implement interfaces for the peripherals 2308 so long as they can properly handle the events emitted by the core. Another key idea is that managers 2304 and side components operate in complete separation from each other. This ensures that one component will never have the opportunity to mess with another component's operation because they only listen to the core. This means they won't have the ability, for example, to produce unwanted side effects such as untracked state mutations.

Figure 24:
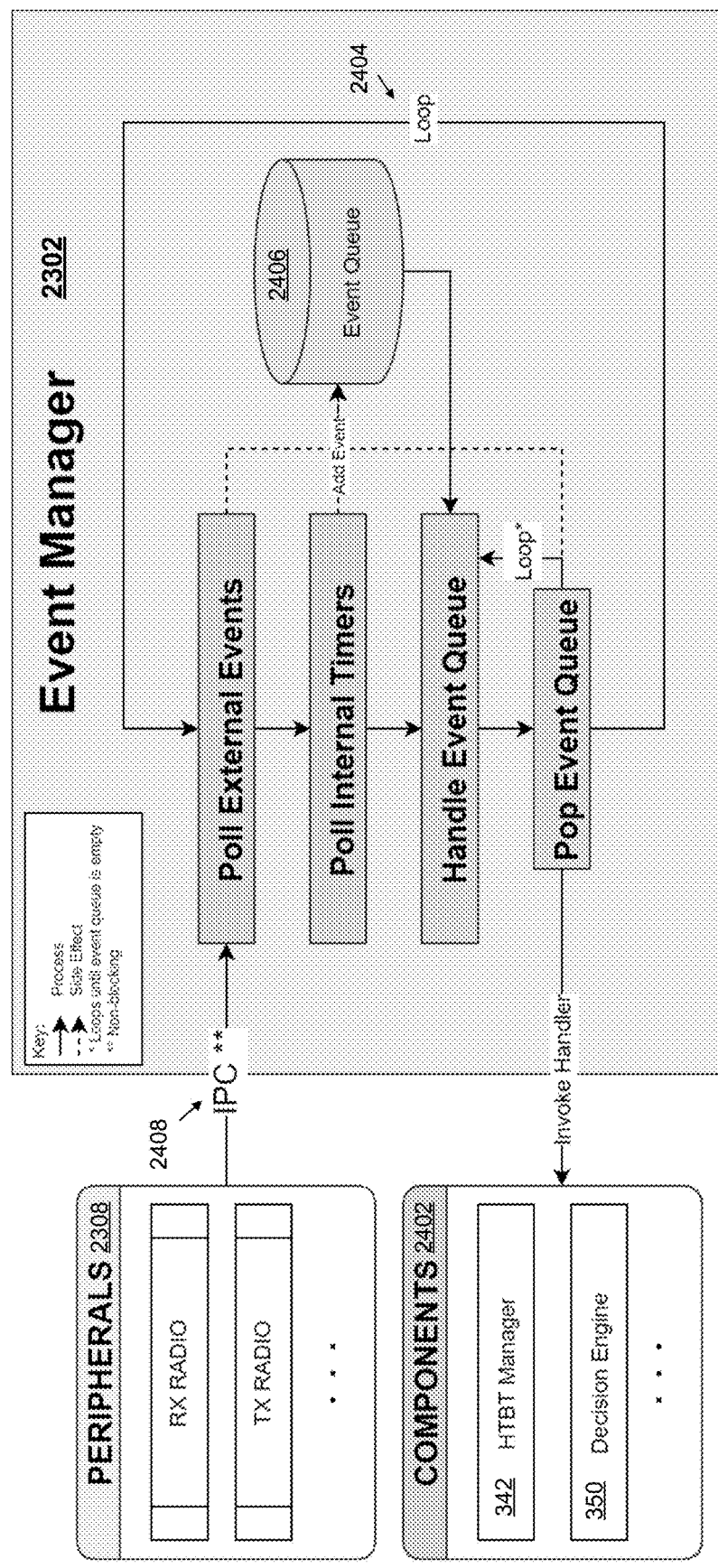
FIG. 24 illustrates an example apparatus, computer program products, and data structures for use in connection with one or more embodiments.
Figure 25:
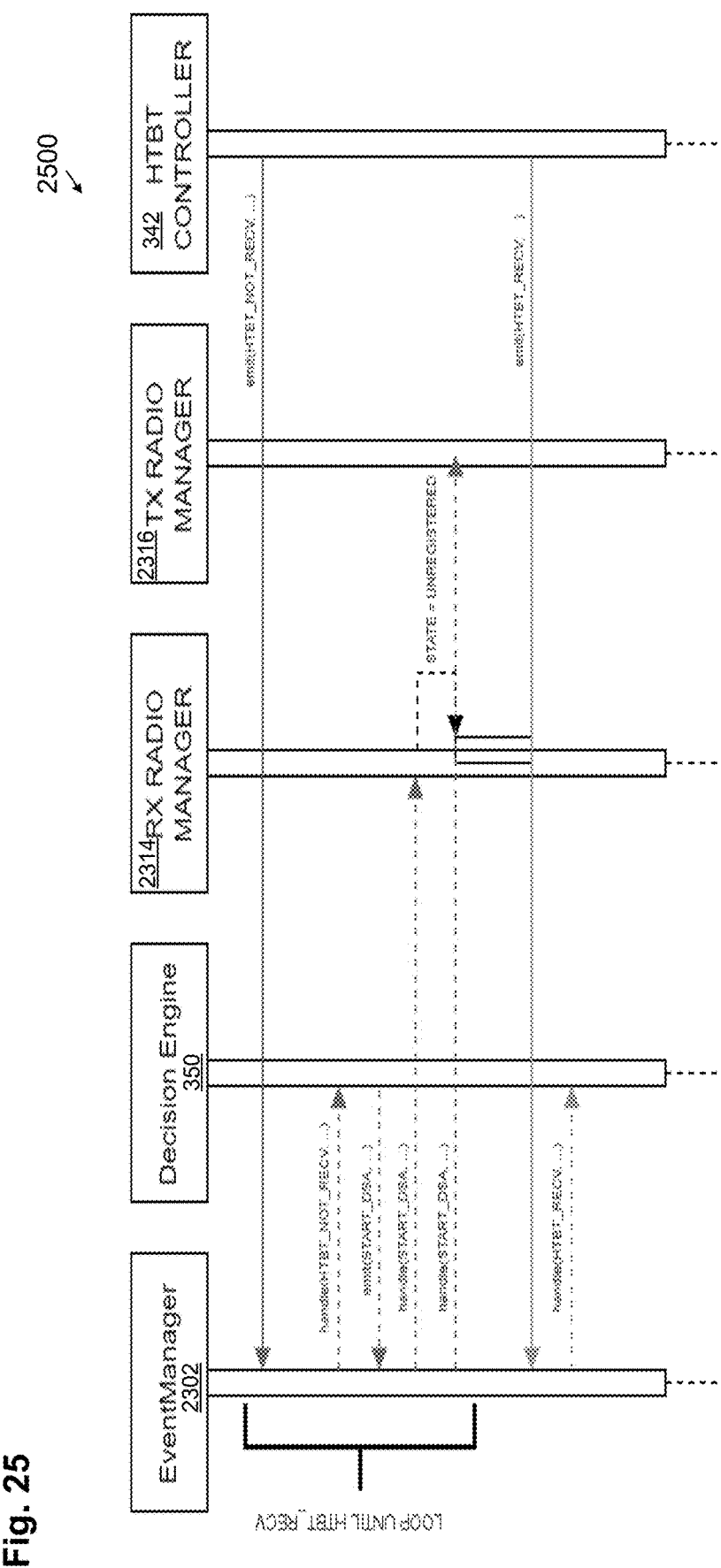
FIG. 25 illustrates an example method for use in connection with one or more embodiments.

Event Manager: FIG. 24 depicts a CLAIRE Event Manager 2302, which is the central point for all events. Event manager 2302 handles creation, processing, and scheduling. FIG. 25 shows an example of a CLAIRE Sequence diagram 2500. One event may start a chain of events. Listeners to these events decide how they will handle them. Each component therefore becomes an expert in its own scope without the fear of untracked state mutations which may produce unwanted side effects. The Event Manager 2302 runs the central non-blocking event loop 2404. It also handles the creation and processing of events as well as scheduling future events and interval timers. Components interact with the Event Manager 2302 by either setting up timers, which emit events periodically, scheduling events to be emitted at a future time, or providing event handler functions which subscribe an event type. The handler functions that each component provides tells the Event Manager 2302 two things, 1. What kind of event the component is interested in, or what it is subscribed to and 2. How that component wants to handle the event when it is fired. Components can register their event handlers before and during runtime which gives CLAIRE 330 the flexibility to adjust its behavior at runtime. The Event Manager 2302 primarily operates by pushing and popping events from its central event queue 2406. FIGS. 24 and 25 depict what the Event Manager 2302 does in a single cycle. First, it talks to a thread which has queued up many events from an external source, such as IPC 2408, and puts those into the event queue 2406. It then checks its internal timers and scheduler to see if any timers have fired. If they have, it puts more events into the event queue 2406. Finally, it dumps all the events out of the event queue 2406 and for each event type, it executes the associated handlers. It may repeat this indefinitely for the entire runtime of the CLAIRE APP 330. The non-blocking behavior of polling the external events is important because it is important that the Event Manager 2302 be cycling in order to catch the internal timers firing. The components that want to produce side effects, such as the decision engine 350 or other core components, do so through the Event Manager 2302. One benefit of this structure is that it allows us to trace events back to their origins. We can look at event logs to see what events triggered what state changes.

The sequence diagram 2500 of FIG. 25 details an example of how components work with the Event Manager 2302. The horizontal axis contains components, which are the boxes, and their interactions, which are the arrows, over time, which is the y-axis. Here we can see that, at some point in time, the HTBT controller in the right realizes that it has not received any Heartbeats 340 for a while. It then emits a HTBT_RX_TIMER EXPIRED event to the Event Manager 2302 which is then handled by the Decision Engine 350. The Decision Engine 350, realizing something is wrong, tells the Event Manager 2302 it wants to run an EXECUTE_DSA event. EXECUTE_DSA is picked up by all the individual radios 304 and they are tasked with performing DSA. This event cascade may be invoked by the gateway controller over and over again until it finally receives a HTBT 340 which tells the system everything is okay. The key takeaway here is that one event may start a chain of events. Listeners to these events decide how they will handle them. Where the decision engine 350 is the head of it all, Event Manager 2302 is the backbone of the CLAIRE APP 330.

Cognitive Control Plane Enabled by Claire App

In an embodiment, a space agency uses the CCSDS Bundle Protocol Specification (CCSDSBP) for space applications. The CCSDS Bundle Protocol describes the format of the protocol data units (called bundles) passed between entities participating in BP communications. The entities are referred to as "Bundle Nodes." Bundle nodes may use convergence layer adapters that are configured to transport data through one or more specific types of internets.

Figure 26:
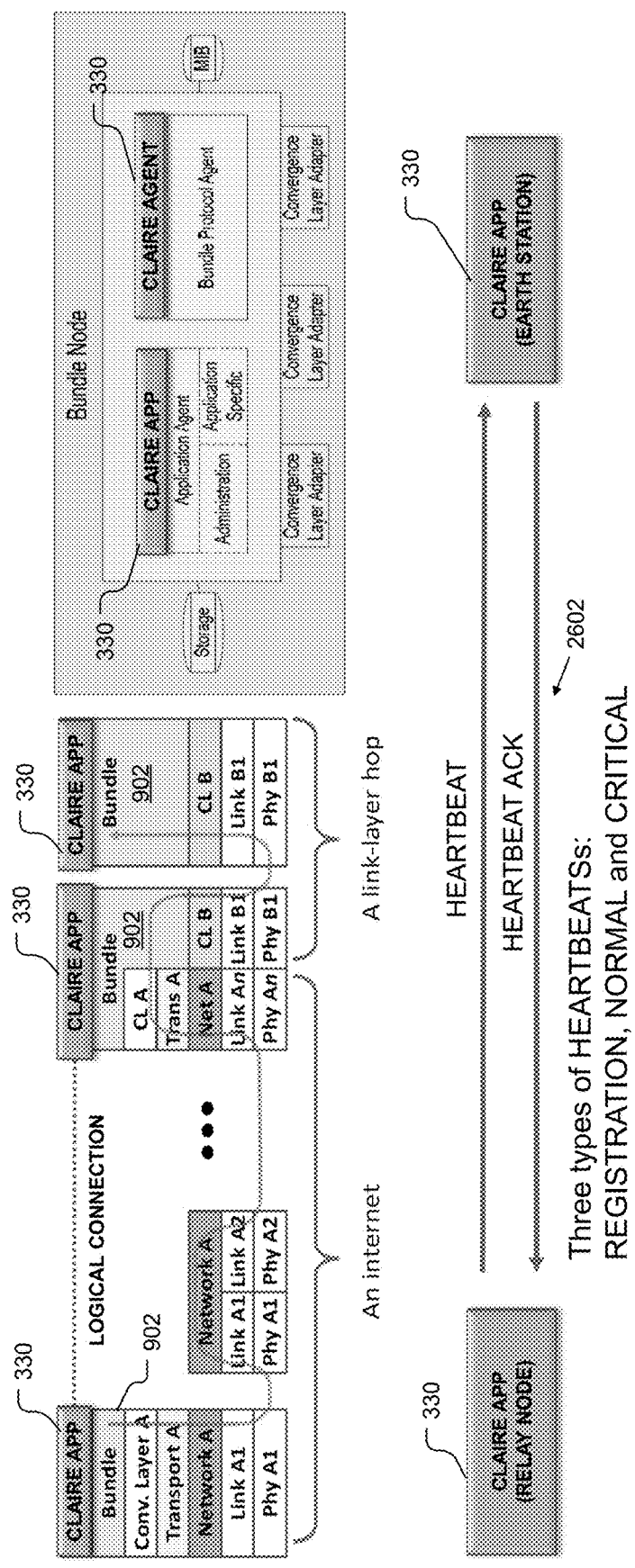
FIG. 26 illustrates an example system, apparatus, computer program products, and data structures for use in connection with one or more embodiments.
Figure 29A:
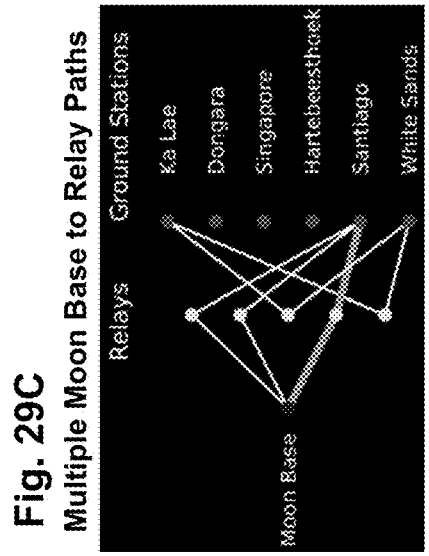
Figure 29B:
Figure 29C:
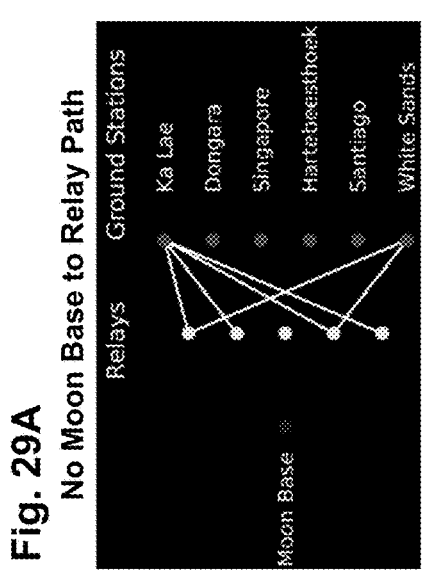
Figure 29E:
Figure 29E:
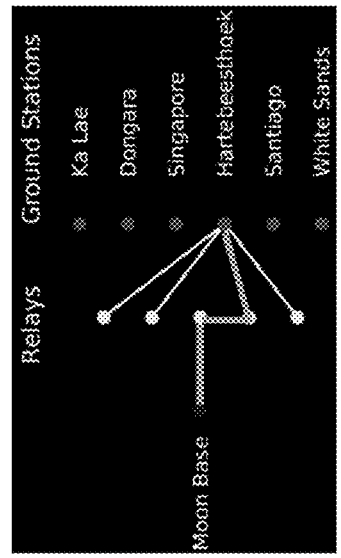

To provide a Cognitive Control Plane without making any modification to (for example) the existing NASA's SCaN architecture and protocol stack, a CLAIRE Appliqué (APP) 330 may ride on top of the CCSDS Bundle Protocol 902 as shown, for example, in FIG. 26 or any other protocol stack including Transmission Control Protocol (TCP)/Internet Protocol (IP) or even User Datagram Protocol (UDP)/IP. This approach may be used without making changes to the existing NASA SCaN protocol stack; CLAIRE 330 may ride on top of it as an Application Layer Protocol. CLAIRE 330 exchanges Heartbeat messages 340 to develop spectrum (e.g., noise and interference), cross-layer, and network (topology, differential buffer backlog, routes) situational awareness which then allows the CLAIRE Decision Engine (CDE) 350 to make intelligent routing decisions. There are three types of Heartbeats 340—Registration, Normal and Critical designated as HTBT REGISTRATION, HTBT_NORMAL, HTBT_CRITICAL.

In our previous work, we developed Application Layer messages to pass Spectrum Management information and to manage interference. It did not address network congestion and mitigation of the same. The messaging structure was more complex and did not carry any Network Layer information such as Differential Buffer Backlog. The previous work was related primarily to a Point to Multi-Point (PMP) Architecture. The architecture proposed there would not scale to any generic heterogeneous network which includes PMP, Point to Point (P2P) and Mesh (e. g. NASA LunaNet). This was because central to the entire architecture was a Spectrum Manager which was making all the decisions.

We have created a simplified messaging architecture which solely uses Heartbeats (HTBT) 340. We have defined three different types of Heartbeats 340. We have added Network Layer information within the HTBTs 340 which would be able to take care of not only interference mitigation but also congestion using TASCOR and intelligent Packet Forwarding Engine. The Cognitive Control Plane is able to scale to heterogeneous networks since the Cognitive Agents (CLAIRE and INSPiRE APPs) are distributed and are able to make localized decisions.

Our proposed APP based approach may allow continuous addition, deletion, and modification of capabilities through Convergence Layers (CLA) and Application Programming Interfaces (APIs). An APP based approach may allow future Network Function Virtualization (NFV) of the space communications architecture, which allows (for example) the NASA Mission Managers to focus on core missions and less on network configuration. An APP-layer protocol and messaging may be dynamically tailored to communications overhead, to keep the network efficiencies high. The CLAIRE protocol and messaging may be implemented using data interchange formats such as Java Script Object Notation (JSON) or VITA 49.2 or other formats. FIG. 26 illustrates an example according to an embodiment, where the CLAIRE APP 330 rides on top of the CCSDS Bundle Protocol 902. CLAIRE 330 may exchange Registration and Heartbeat messages 340 (described in further detail below) to develop spectrum and network situational awareness, which may then allow the CDE 350 to make intelligent packet forwarding and routing decisions. The CLAIRE APP 330 (including the CLS module 344 and CDE 350) may be present on every Node 302 in the network. Spectrum Awareness may include noise and interference statistics for every channel. Spectrum Awareness may include detecting and characterizing the signals to verify their spectrum assignments or detecting and characterizing the interference type. Cross-layer Awareness may include obtaining Physical (PHY) and Medium Access Control (MAC) Layer information such as a Received Signal Strength Indicator (RSSI), Signal to Interference plus Noise Ratio (SINR), Packet Error Rate (PER) and Header Checksum information. Network Layer Statistics may include Position, Topology, Buffer Backlog, and Routes.

Tables 5-12 and FIGS. 27-28 show an example structure of HTBTs 340 sent between two CLAIRE Nodes 302. Each HTBT 340 may contain at least one of: MSG Length, MSG ID, CLAIRE APP ID/IP, HTBT Type, Time Stamp, Position, Operating Ch., Backup Ch., Band, Channel Number, RSSI (From Radio), SINR (From Radio), PER (From Radio), Throughput (From Radio), Interference Detected (From Sensor—FS), Interference Type (FS), Occupied Signals (FS), Relative Noise Floor (FS), Buffer Backlog for Each Radio/Service. This structure was designed to minimize overhead while maintaining all the information necessary for node pairs to coordinate with each other. From our calculations we found that HTBTs add less than 2% overhead to the network using a node pair configuration with 4 links and 2 bands which roughly came out to around 616 bytes.

Table 5 shows an example embodiment of a HTBT message 340. It is designed to minimize overhead while maintaining all the information necessary for node pairs to coordinate. Total size for a 4 link, 2 S-Band configuration is ~616 Bytes which results in less than 2% network overhead.

TABLE 5

HTBT message

| Field Name | Type | Value | Description |
| --- | --- | --- | --- |
| Header | Hex | | Detection of MSG Boundary |
| MSG Length | Int | | Length of the Msg (Bytes) |
| MSG ID | Int | 003 | Message ID |
| CLAIRE APP ID/IP | Int | Static | Which Node |
| HTBT Type | Int | [0, 1, 2] | Registration, Normal, Critical |
| Time Stamp | Int | xx:xx:xxZ | UTC Time Stamp |
| Position | Float | | Relative Node Position |
| Operating Ch. | Int | Vector | Operating Channels for various Bands |
| Backup Ch. | Int | Vector | Backup Channels for various Bands |
| Band | Int | [1, . . . , 8] | UHF, L, C, S, X, Ku, K, Ka |
| Channel Number | List | [1, . . . , Nb] | Num. of Channels Per Band |
| RSSI (From the Radio-FR) | Float | Vector | Instantaneous and Average |
| SINR (FR) | Float | Vector | Instantaneous and Average |
| PER (FR) | Float | Vector | Instantaneous and Average |
| Throughput (FR) | Float | Vector | Instantaneous and Average |
| Interference Detected (From the RF Sensor-FS) | Int | Vector | All the Operating Channels where interference is detected |
| Occupied Signals (FS) | Float | Record | Signals Description per Channel |
| Noise Floor (FS) | Float | Vector | Noise Floor for All Channels (dB) |
| Buffer Backlog | Int | Vector | NET, SCI, DET and PNT in Bytes |

TABLE 6

HTBT Packet

| Block | Length [bits] | Description |
| --- | --- | --- |
| HTBT_HEADER | 64 bits * 3 | General information about the HTBT packet |
| RX_RADIOS | 64 bits * 4 * MAX_NUM_LINKS/2 | Table with rx radio information |
| TX_RADIOS | 64 bits * 4 * MAX_NUM_LINKS/2 | Table with tx radio information |
| BANDS | (128 bits + 96 bits * NUM_CHANNELS) * NUM_OF_BANDS | Table with band and rf sensing information |

TABLE 7

HTBT Header

| Field | Data type | Length [bits] | Description |
| --- | --- | --- | --- |
| NODE_SRC | u_int_16 (short) | 16 bits | ID of the node where the HTBT originates |
| NODE_DST | u_int_16 (short) | 16 bits | ID of the destination node for the HTBT |
| NODE_STATE | u_int_8 (char) | 8 bits | 0 = UNREGISTERED, 1 = REGISTERED, ... |
| HTBT_TYPE | u_int_8 (char) | 8 bits | 0 = REGISTRATION, 1 = NORMAL, 2 = CRITICAL |
| MAX_NUM_LINKS | u_int_8 (char) | 8 bits | Number of links the source node can have. This information can be used to derive the number of rx and tx radios (links/2) |
| NULL | u_int_8 (char) | 8 bits | 8 empty bits to pad the sub-block |
| TIMESTAMP | u_int_32 (long) | 32 bits | UNIX timestamp of the creation of this HTBT |
| HTBT_ID | u_int_32 (long) | 32 bits | A number that increments with each HTBT sent |
| HTBT_RX | u_int_64 (long long) | 64 bits | EUI of rx_radio MAC addr |

TABLE 8

RX Radio Table

| Field | Data type | Length [bits] | Description |
| --- | --- | --- | --- |
| MAC_ADDR | u_int_64 (long long) | 64 bits | EUI of rx_radio MAC addr |
| PAIRED_TX_MAC_ADDR | u_int_64 (long long) | 64 bits | EUI of paired tx_radio's MAC addr |
| FREQ | float_32 | 32 bits | Current operating frequency |
| CHANNEL | u_int_8 (char) | 8 bits | Current operating channel |
| BACKUP_CHANNEL | u_int_8 (char) | 8 bits | Current backup channel |
| INTERF_DETECTED | u_int_8 (short) | 8 bits | boolean flag, 1 when interference is detected |
| INTERF_CRIT | u_int_8 (short) | 8 bits | boolean flag, 1 when interference is critical |
| RSSI | float_32 | 32 bits | Forwarded Relative signal strength indicator (RSSI) stat collected from radio [dBm] |
| SINR | float_32 | 32 bits | Forwarded Signal to interference and noise ratio (SINR) stat collected from radio [dB] |
| THROUGHPUT | float_32 | 32 bits | Forwarded throughput stat collected from radio [b/s] |
| PER | floar_32 | 32 bits | Forwarded packet error rate collected from radio |

TABLE 9

TX Radio Table

| Field | Data Type | Length [bits] | Description |
| --- | --- | --- | --- |
| MAC_ADDR | u_int_64 (long long) | 64 bits | EUI of tx_radio MAC addr |
| PAIRED_RX_MAC_ADDR | u_int_64 | 64 bits | EUI of paired rx_radio's MAC addr |
| FREQ | float_32 | 32 bits | Current operating frequency |
| CHANNEL | u_int_8 (char) | 8 bits | Current operating channel |
| BACKUP_CHANNEL | u_int_8 (char) | 8 bits | Current backup channel |
| BUFFER_BACKLOG | u_int_32 (int) | 32 bits | Size [bits] of the buffer backlog |
| POWER | float_32 | 32 bits | Transmit power [dB] |
| THROUGHPUT | float_32 | 32 bits | Forwarded throughput stat collected from radio [b/s] |

TABLE 10

HTBT Band Table

| Field | Data Type | Length [bits] | Description |
| --- | --- | --- | --- |
| LOWER | float_32 | 32 bits | Lower bound of frequency range |
| UPPER | float_32 | 32 bits | Upper bound of frequency range |
| CHANNEL_BW | float_32 | 32 bits | Bandwidth of each channel |
| NUM_CHANNELS | u_int_32 | 32 bits | Redundant, Number of specified channels in this band |
| RSSI | float_32[NUM_CHANNELS] | 32 bits * NUM_CHANNELS | Received signal strength indicator (RSSI) statistic for each channel |
| SINR | float_32[NUM_CHANNELS] | 32 bits * NUM_CHANNELS | Signal to interference and noise ratio (SINR) statistic for each channel |
| NOISE_FLOOR | float_32[NUM_CHANNELS +1] | 32 bits * (NUM_CHANNELS +1) | Noise floor statistic for each channel edge |

TABLE 11

| Transmitted HTBT |
|---|
| [ HTBT Manager ]: Sent HTBT. Size: 485 Bytes |
| [ HTBT Manager ]: Sent HTBT |
| HTBT_PACKET: |
|   NODE_SRC: 1 |
|   NODE_DST: 2 |
|   NODE_STATE: 0 |
|   HTBT_TYPE: 0 |
|   MAX_NUM_LINKS: 4 |
|   TIMESTAMP: 6 |
|   HTBT_ID: 1 |
|   HTBT_RX_MAC_ADDR: 00:00:00:00:01:50 |
| RX_RADIO_TABLES: |
| RX_TABLE[0]: |
|   MAC_ADDR: 00:00:00:00:01:11 |
|   PAIRED_TX_MAC_ADDR: 00:00:00:00:01:11 |
|   CHANNEL: 5 |
|   FREQ: 2222500000.0 |
|   INTERF_DETECTED: 0 |
|   INTERF_CRIT: 0 |
|   RSSI: −80.8699072227704 |
|   SINR: 26.569098556267974 |
|   PER: 0.0 |
|   THROUGHPUT: 133990.09900866414 |
|   BACKUP_CHANNEL: 1 |
| RX_TABLE[1]: |
|   MAC_ADDR: 00:00:00:00:01:12 |
|   PAIRED_TX_MAC_ADDR: 00:00:00:00:01:12 |
|   CHANNEL: 9 |
|   FREQ: 2242500000.0 |
|   INTERF_DETECTED: 0 |
|   INTERF_CRIT: 0 |
|   RSSI: −78.52747961443647 |
|   SINR: 23.38364766809696 |
|   PER: 0.0 |
|   THROUGHPUT: 133990.0990241082 |
|   BACKUP_CHANNEL: 1 |
| TX_RADIO_TABLES: |
| TX_TABLE[0]: |
|   MAC_ADDR: 00:00:00:00:01:21 |
|   PAIRED_RX_MAC_ADDR: 00:00:00:00:01:21 |
|   CHANNEL: 5 |
|   FREQ: 2047500000.0 |
|   BACKUP_CHANNEL: 255 |
|   BUFFER_BACKLOG: 0 |
|   POWER: 52 |
|   THROUGHPUT: 134503.96039479802 |
| TX_TABLE[1]: |
|   MAC_ADDR: 00:00:00:00:01:22 |
|   PAIRED_RX_MAC_ADDR: 00:00:00:00:01:22 |
|   CHANNEL: 13 |
|   FREQ: 2087500000.0 |
|   BACKUP_CHANNEL: 255 |
|   BUFFER_BACKLOG: 0 |
|   POWER: 52 |
|   THROUGHPUT: 132676.47058581116 |
| BANDS: |
|   LOWER: 2200000000.0 |
|   UPPER: 2290000000.0 |
|   CHANNEL_BW: 5000000.0 |
|   NUM_CHANNELS: 18 |
|   RSSI: [ −85.88413988883687, −69.51945638627433, −81.48927801803225, −73.2685139225145, −80.8699072227704, −71.55156619857487, −74.53162423975292, −80.71742529556774, −75.37514222400154, −76.82426141274694, −82.61429915167717, −80.93924109582515, −78.52747961443647, −81.12664999905478, −74.93370405742832, −71.81954231791313, −85.67802228456242, −69.5316266976418 ] |
|   SINR: [36.377121323896155, 35.758544611024675, 45.4591143535496, 43.59453418253064, 26.569098556267974, 36.943809851805334, 32.777875346250646, 35.27513071713126, 28.597568319219, 31.908086843671796, 26.87355731844035, 30.65811871432178, 28.38364766809696, 38.551225750039634, 30.87245707100054, 29.880383489874315, 40.975194462097164, 33.82614238077974] |
|   NOISE_FLOOR: [−100.92599263951868, −102.15904288494986, −101.6810045748929, −98.01314980386434, −99.29485774292411, −99.39825595080293, −100.11798348427924, −101.46405000660624, −100.53632932980213, −99.30373927276715, −103.96786763545516, −102.44267067366762, −101.30517885126669, −103.63442342986654, −97.62000480671654, −99.90486500884086, −98.01112761796936, −97.3290994983917, −99.44415428682434] |

TABLE 12

Received HTBT

[ HTBT Manager ]: Received HTBT. Size: 485 Bytes
[ HTBT Manager ]: Received HTBT
HTBT_PACKET:
  NODE_SRC: 2
  NODE_DST: 1
  NODE_STATE: 0
  HTBT_TYPE: 0
  MAX_NUM_LINKS: 4
  TIMESTAMP: 5
  HTBT_ID: 0
  HTBT_RX_MAC_ADDR: b'00:00:00:00:02:50'
RX_RADIO_TABLES:
RX_TABLE[0]:
  MAC_ADDR: b'00:00:00:00:02:11'
  PAIRED_TX_MAC_ADDR: b'00:00:00:00:02:11'
  CHANNEL: 5
  FREQ: 2047500032.0
  INTERF_DETECTED: 0
  INTERF_CRIT: 0
  RSSI: −80.8699072227704
  SINR: 26.569098556267974
  PER: 0.0
  THROUGHPUT: 134503.953125
  BACKUP_CHANNEL: 255
RX_TABLE[1]:
  MAC_ADDR: b'00:00:00:00:02:12'
  PAIRED_TX_MAC_ADDR: b'00:00:00:00:02:12'
  CHANNEL: 13
  FREQ: 2087500032.0
  INTERF_DETECTED: 0
  INTERF_CRIT: 0
  RSSI: −78.52747961443647
  SINR: 24.38364766809696
  PER: 0.0
  THROUGHPUT: 133990.09375
  BACKUP_CHANNEL: 255
TX_RADIO_TABLES:
TX_TABLE[0]:
  MAC_ADDR: b'00:00:00:00:02:21'
  PAIRED_RX_MAC_ADDR: b'00:00:00:00:02:21'
  CHANNEL: 5
  FREQ: 2222500096.0
  BACKUP_CHANNEL: 255
  BUFFER_BACKLOG: 0
  POWER: 52.0
  THROUGHPUT: 133990.09375
TX_TABLE[1]:
  MAC_ADDR: b'00:00:00:00:02:22'
  PAIRED_RX_MAC_ADDR: b'00:00:00:00:02:22'
  CHANNEL: 9
  FREQ: 2242500096.0
  BACKUP_CHANNEL: 255
  BUFFER_BACKLOG: 0
  POWER: 52.0
  THROUGHPUT: 133990.09375
BANDS:
  LOWER: 2200000000.0
  UPPER: 2289999872.0
  CHANNEL_BW: 5000000.0
  NUM_CHANNELS: 18
  RSSI: [ −85.88413988883687, −69.51945638627433, −81.48927801803225, −73.2685139225145, −80.8699072227704, −71.55156619857487, −74.53162423975292, −80.71742529556774, −75.37514222400154, −76.82426141274694, −82.61429915167717, −80.93924109582515, −78.52747961443647, −81.12664999905478, −74.93370405742832, −71.81954231791313, −85.67802228456242, −69.5316266976418 ]
  SINR:
[36.377121323896155, 35.758544611024675, 45.4591143535496, 43.59453418253064, 26.56 9098556267974, 36.943809851805334, 32.777875346250646, 35.27513071713126, 28.59756 8319219, 31.908086843671796, 26.87355731844035, 30.65811871432178, 28.38364766809696, 38.551225750039634, 30.87245707100054, 29.880383489874315, 40.975194462097164, 33.82614238077974]
  NOISE_FLOOR: [−99.92599263951868, −101.15904288494986, −104.6810045748929, −97.01314980386434, −97.29485774292411, −98.39825595080293, −98.11798348427924, −98.46405000660624, −99.53632932980213, −100.30373927276715, −109.96786763545516, −107.44267067366762, −102.30517885126669, −109.63442342986654, −99.62000480671654, −100.90486500884086, −101.01112761796936, −102.3290994983917, −99.44415428682434]

FIGS. 27-28 show an example embodiment of HTBTs 340 being transmitted and received. These HTBTs 340 contain Transmit Radio Statistics Aggregation and Receive Radio Statistics Aggregation.

A Cognitive Control Plane may be provided in various other embodiments—for example, commercial terrestrial, airborne and space networks. As specific, non-limiting examples:

1. Use of Blockchain to facilitate a Cognitive Control Plane. A blockchain or a distributed ledger is a growing list of records, called blocks, that are linked together using cryptography. Each block includes a cryptographic hash of the previous block, a timestamp, and transaction data generally represented as a Merkle tree. The timestamp proves that the transaction data existed when the block was published in order to get into its hash. As each block includes information about the block previous to it, the blocks collectively form a chain, with each additional block reinforcing the ones before it. Therefore, blockchains are resistant to modification of their data because once recorded, the data in any given block cannot be altered retroactively without altering all subsequent blocks. Due to their distributed nature, Blockchains proliferate control information across the network. As an example, control information may pertain to the use of a certain Channel within the RF Spectrum. Hence, a cognitive control plane may also be implemented using a Blockchain.

2. Use of Dedicated RF Signals. One or more embodiments use Low Probability of Detection (LPD) and/or Low Probability of Interception (LPI) and/or Low Probability of Exploitation (LPX) signals used as a Control Channel. An LPD/LPI/LPX Signal may be broadband in nature and may be transmitted as an Underlay (well below the noise floor) so as to visibly not occupy spectrum and not be susceptible to interference and interception. Such a dedicated RF Signal may be used as a Control Channel.

3. FIG. 29A-D and FIG. 3 also illustrate an example of a function carried out by CLAIRE 330 according to an embodiment. Specifically, in this example, each Node 302 in the network is equipped with the CLAIRE APP 330, which among other things, facilitates TASCOR and an intelligent Packet Forwarding Engine (PFE) 352 (described in further detail below). This essentially enables Self Organizing Networking (SON) operation even in adverse conditions to meet service level agreements (QoS).

Each Node 302 on the Relay is receiving Packets 306 that are mapped to NASA's SCI, DET, and NET Services. These packets 306 need to be routed to the next Node 302, which in this example is the Earth. The Relay may be equipped with UHF, X, and K-Band Radios 304. Each Radio Link may have its own Capacity which is given by $C_X=B_X \log_2(1+SINR_X)$, where $C_X$ is the Capacity of the X-Band, $B_X$ is the Bandwidth of the X-Band, and $SINR_X$ is the Signal to Interference plus Noise Ratio of the X-Band. Neighboring nodes 302 may exchange Buffer Backlog information for each radio 304 using Heartbeat (HTBT) Messages 340. The CLS and CDE Functions included in the CLAIRE APP 330 may form a Utility Function which is a weighted sum of the Differential Buffer Backlogs and Capacities, to determine which Packets should be forwarded to which Band (Radio) and to which Channel.

Further prioritization may be applied to Packet Forwarding based on the urgency of the service. As an example, in case of a Supernova event, SCI Packets may be prioritized resulting in maximum data transfer from the Moon to the Earth, whereas, in case of a detection event, DET packets may be prioritized as shown by the example of FIG. 2.

In one example, a Lunar Network includes three layers: The Lunar Surface Network, the Relay Network, and the Earth Ground Station Network. Each Node's position varies in time. Earth ground stations rotate on a 24-hour period, the Relays orbit the Moon on a 12-hour period, and the Moon (along with all Lunar Surface Nodes) orbit is tidally locked to the Earth on a roughly 28-day period. The time varying nature means that the path loss of the Lunar Surface to Relay links and the path loss of the Relay to Ground Station links also vary, and hence the capacity of each link will vary in time. Because the celestial mechanics are well defined, the normal operating quality of these links is predictable. However, path loss calculations crucially must also account for line-of-sight. A direct link between a Node 302 on the Lunar Surface to a Relay is not feasible if the Relay is on the other side of the Moon (e.g., as shown in the examples of FIGS. 1 and 8A). Similarly, an Earth Ground Station is not able to establish a direct link to a Relay if it is on the other side of the Earth. Finally, Relays cannot establish direct links with a Ground Station or with one another if the Moon obscures the line-of-sight path.

Predicting the feasibility of links within the network allows for determining when near real-time communication with a Lunar Surface Node, for instance on the far side of the moon, is possible, and in the case of a Delay Tolerant Network (DTN), what the delay of transmission will be. It can also predict when multiple routing paths exist, which is valuable when fail-safe communications are necessary. These considerations are important for NASA event planning. In one example, a proof-of-concept model was configured to simulate the time varying positions of all elements in the Lunar Network and calculate the path loss & feasibility (e.g., as shown in the examples of FIG. 29A-E). The feasible links network topology establishes the routing choice space of the CLAIRE APP 330. The model also simulates a simple two hop routing decision process that selects the nearest feasible relay from the lunar surface and the nearest feasible ground station from the chosen relay, whenever these links are possible. CDE 350 rides on these constraints to make its own network optimization decisions.

Based on the specifications defined in the NASA IAG Report, two Relay orbits were modeled as elliptical orbits with eccentricity 0.6, semi-major axis of length 6100 km, and an angle of inclination of 58 degrees. An additional equatorial orbit with 0 eccentricity and diameter of 6100 km was included. The starting phase and the orbital plane's orientation are adjustable. In principle, the model may be extended to any type of orbit, any number of orbits, and any configuration. Line-of-sight was calculated by accounting for three factors: the angle above the horizon on the moon, the angle above the horizon on the earth, and the existence of points of intersection between the line connecting two nodes and the sphere of the moon. The angle above the horizon is computed with dot products and the line-sphere points of intersection are computed as solutions to a quadratic equation.

The model in this example reveals several possible network topologies as shown in the example of FIGS. 29A-E. Extreme cases, where there are No links from the Lunar Surface to the Relay network (FIG. 29A), are possible. A case of only one feasible link from the Lunar Surface to the Relay network (FIG. 29B) is also possible. Multiple links from the Lunar Surface to the Relay (FIG. 29C) is another possibility. In many or most cases, Relay to an Earth Ground Station link exists. If a link from the chosen Relay to the Ground Station does not exist (e.g., Solar Flare or Equipment Failure), then Relay-to-Relay link with DTN (FIGS.

29D-E) may be helpful. Communications can resume when line-of-sight is established with a ground station.

Such a model allows NASA to design the Lunar Network for a given number of Relay Orbiters, Moon Base locations, and Earth Ground Stations, with calculations such as average delay time, windows of near real-time communication, average link capacity, orbital mechanics, and when multiple routing paths exist. This approach may thus improve NASA planning, for example as the Relay constellation is iteratively built.

In one embodiment, TASCOR and intelligent PFE 352 predict the network topology at a given time based on location, average delay time, windows that allow real-time communication, average link capacity, orbital mechanics and multiple paths to pre-plan various routes that the packets will take to optimize the QoS and QoE. One or more embodiments include a more robust model than the model described above. A model system may include TASCOR, PFE 352, CLS 344, and DSA Orchestration. A CLAIRE Cognitive Control Plane may be built in 'C', Python or another programming language.

Table 13 includes an example of CLAIRE 330 applied to NASA's Moon Mission Policies, according to an embodiment. The policies include situations ranging from Solar Flares, Supernovae, Interference Events when Communications links are available, and when they are not. As an example, during Supernova events, CLAIRE 330 may be configured to orchestrate the Network such that the data flow from the Moon Base to the Earth is maximized while a robust NET and Control Channel are kept alive. During Interference events where Nodes 302 are not able to communicate, CLAIRE 330 may be configured to orchestrate the network to move to narrowband UHF Channels which are resilient to interference. Under these situations, an Autonomous Rendezvous protocol may be started in which the Node 302 experiencing interference moves to the First Backup Channel (See Following Section) and another Node 302 searches for the former to Register.

Dynamic Spectrum Access Enabled by the Cognitive Control Plane

As discussed above, a CLAIRE APP 330 may be configured to establish a Cognitive Control Plane that allows

TABLE 13

An example of CLAIRE applied to NASA's Moon Mission Policies, according to an embodiment.

Figure 30:
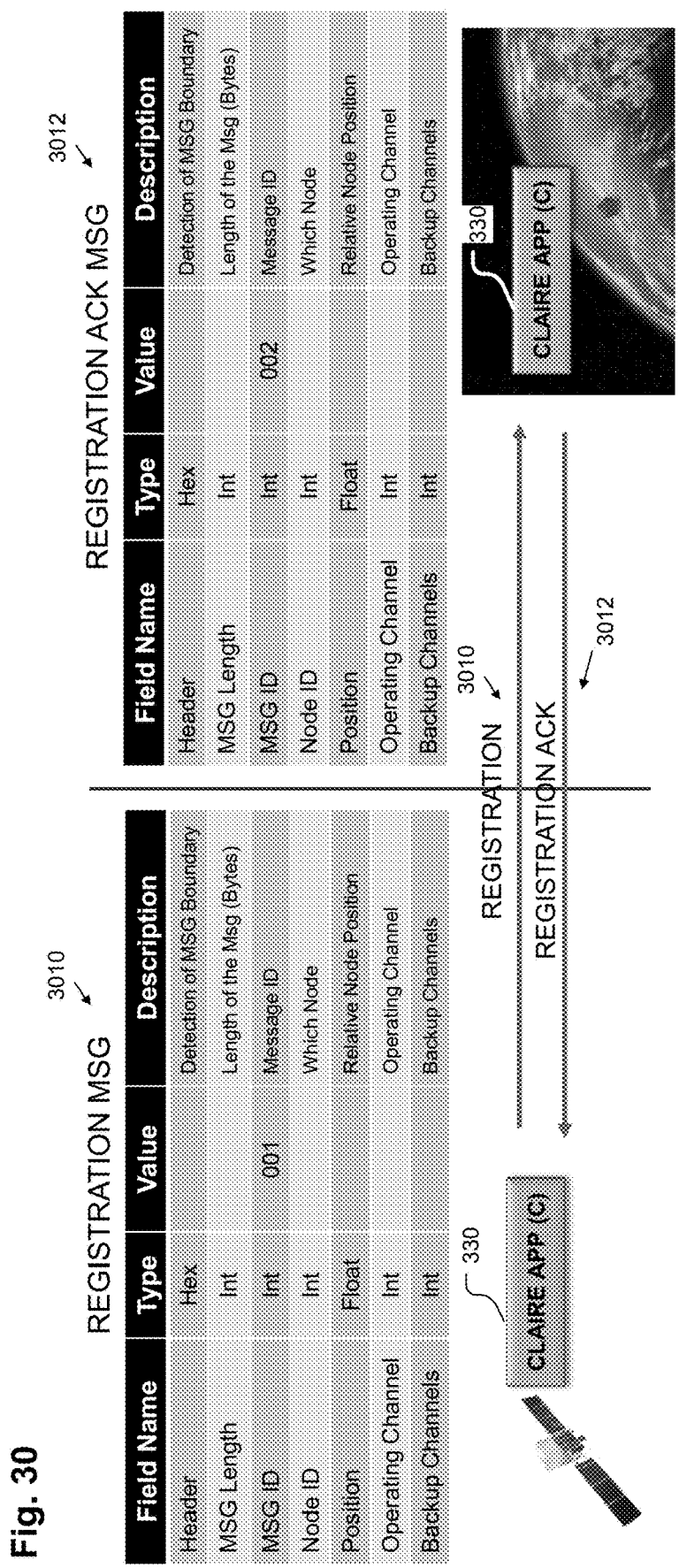
FIG. 30 illustrates an example system and data structures for use in connection with one or more embodiments.

| # | POLICY FOR | EVENT | FEATURES | CONTROLLABLES | POLICY |
|---|---|---|---|---|---|
| | | | CRUISE TO THE MOON | | |
| 1 | Manual Control | Mission Control Bypass | N/A | CLAIRE App based Control Channel to disable the APP | Disable the CLAIRE APP |
| 2 | Interference where Node can Communicate | Interference on the Node | SINR, BEN, RSSI, RF Sensing | Transmit Power, Channel. Routes | If it is able to Communicate, initiate Rendez-vous Mechanisms to a Backup Channel |
| | | | LUNAR ORBIT | | |
| 3 | Message Failure | Message Authentication Fails | CRC Check Failure | Robust Channel Coding, DSSS, Narrow-Channels | Send an Alarm to the management system and pass the logs of the failure event |
| 4 | PNT interference | Inteference on PNT | SINR, BER, RSSI, RF Sensing | Switch PNT channels | PNT Receivers sense the interference and PNT is moved a different channel. Switch to intertial navigation/dead reckoning. |
| | | | DESCENT | | |
| 5 | Excessive Delay | Too much delay | Queue and buffer inspection | Routing change | Routing on un-congested path. Clear packets of the Service that is of low-importance and/or too old. |
| 6 | PNT Spoofing | PNT Node is Spoofed | Second and Higher Order Features of PNT | PNT Signal Excision, Channel Switch | PNT is moved to a different channel. Switch to intertial navigation/dead reckoning. |
| | | | LUNAR SURFACE OPERATIONS | | |
| 7 | Supernova | Supernova Situation | Message from the Mission Control Center | Channels, Routes, Queues | Maximize the Data Flow from the Moon to the Earth while providing Robust Control Channel (e. g. 25 kHz) |
| 8 | Solar Flare | Solar Flare | SINR, BER, RSSI, RF Sensing | Channels, Routes | Move to the Channels and Frequency Bands that are not experiencing Solar Flare Interference |
| | | | LAUNCH FROM THE MOON | | |
| 9 | Routing Tables | Incorrect Routing Tables | Packet Loss, Too many Hops >10 | Manual explicit routing | Generate an Alarm. Perform explicit routing |
| 10 | Rendez-vous Failure | Network fails to synchronize on a Backup Channel | Packet Losses, No Synchronization | Manual control to move to the Best Backup Channel. | Manual control of the Radios to start operating on the best channel reported last |
| | | | CRUISE TO THE EARTH | | |
| 11 | Interference where Node cannot Communicate | Netowork fails to Synchronize | Packet Losses, No Synchronization | Manual Channel selection. Use narrow-band UHF for Voice and Command and Control | Move to narrow-band UHF Channels which are resilient to interference. Switch to Voice and Command and Control only. |
| 12 | Intentional Interference | Intentional Interference due to escalation in posture | SINR, BER, RSSI, RF Sensing, Packet Losses, No Synchronization | Dynamic Spectrum Access and Interference Cancellation | identify the Channels which are available or which have least interference. Perform Interference Cancellation on the Radios on the Earth | information exchange enabling network optimization. Examples of a protocol, messages, and primitives included these messages, according to an embodiment, are illustrated in Tables 5-12 and FIGS. 27-28 and 30. Cognitive Control Plane network synchronization may start with exchange of Registration (REG) 3010 and Registration Acknowledgement (REG-ACK) 3012 messages between two adjacent Nodes 302 as shown in FIG. 30. In one embodiment, as shown in Table 5, it is possible to implement a HTBT-Type field inside the HTBT messages 340. The HTBT-Type field specifies whether the HTBT is a Registration HTBT, a Normal HTBT or a Critical HTBT.

Once they are registered with each other, they may start exchanging periodic (e.g., on the order of every 2 seconds) Heartbeat (HTBT) 340 and Heartbeat Acknowledgement (HTBT-ACK) 2602 Messages. In one embodiment, the nodes 302 interchange only the HTBT messages 340, and the HTBT-ACK message 2602 is eliminated.

In some other embodiments, in addition to the REG 3010 and the HTBT Messages 340, Urgent Situation (US) and Urgent Situation ACK (US-ACK) may be included. This message may be used in cases of severe interference requiring a rapid channel switch, e. g. DSA, or when critical events are happening such as descent or docking which may need urgent Command and Control (C2) information to be passed to the neighboring nodes 302, or to the Mission Control Center. All these messages are extensible and based on the overhead that is tolerable or the sophistication of the network.

A design according to an embodiment may include one or more of the following primitives:
1. MSG Length, 2. MSG ID, 3. CLAIRE APP ID/IP, 4. HTBT Type, 5. Time Stamp, 6. Position, 7. Operating Ch., 8. Backup Ch., 9. Band, 10. Channel Number, 11. RSSI (From Radio), 12. SINR (From Radio), 13. PER (From Radio), 14. Throughput (From Radio), 15. Interference Detected (From Sensor—FS), 16. Interference Type 17. Occupied Signals(FS), 18. Relative Noise Floor (FS), 19. Buffer Backlog.

A Cognitive Control Plane may also be used to fulfill other Missions that NASA may have by extending these Messages. This may include some critical information such as turning the valve off. In an example of the embodiment, one may be able to extend these HTBT messages 340 to Smart Grid Applications where they are used to obtain statistics from a Relay Station, as an example, and are used to control various electrical devices and sensors.

Figure 31B:
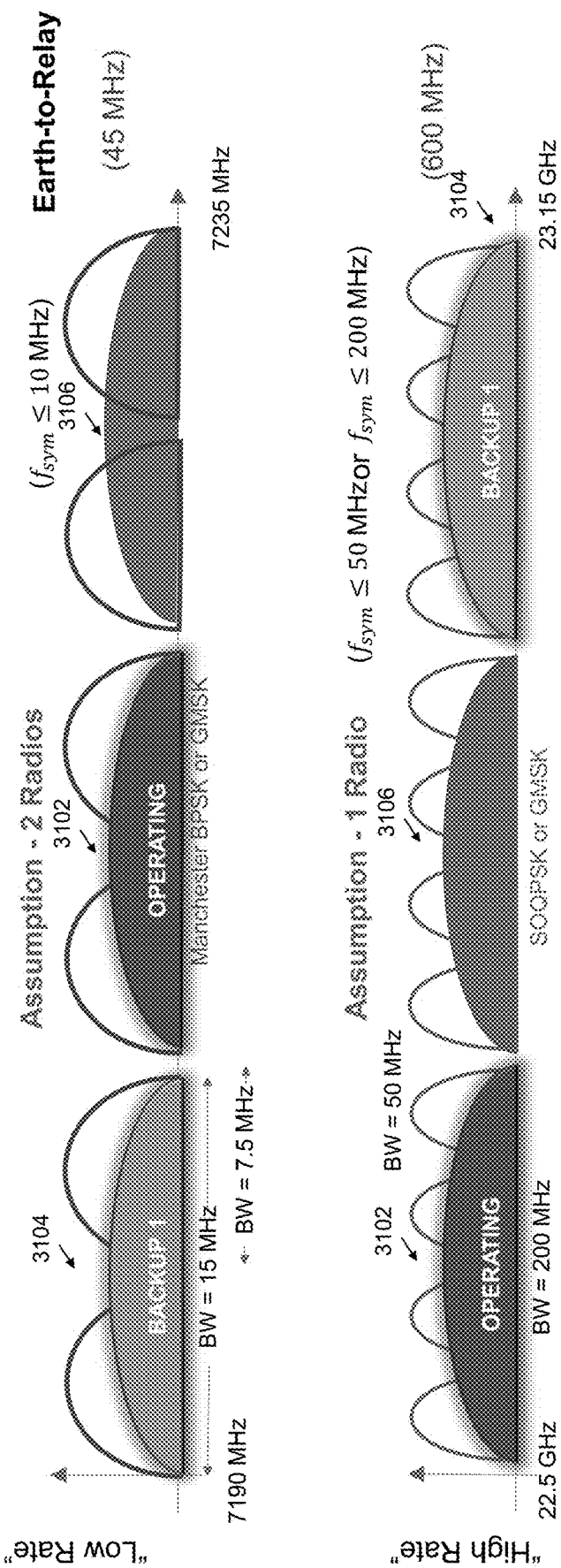

In an embodiment, Communications Links used for the Moon and space missions use Frequency Division Duplexing (FDD) in the network architecture which makes things slightly more complicated than if it was Time Division Duplexing (TDD). FIG. 31A shows the frequency channelization of the Radios 304 from Relay to Earth and FIG. 31B shows the frequency channelization of the Radios 304 from Earth to Relays as illustrated in the NASA IAG Report, according to an embodiment. FIGS. 31A-B show notional allocation of Channels as Operational and Backup. Accordingly, any link statistics or sensing information on the Ground Station has to be returned back to the Relay, on the Channels in a different Band. This loop of Downlink on one Band and Uplink on another Band makes orchestration of DSA slightly more challenging when the system encounters interference. In addition, long links from Earth to Relays cause further delays.

Figure 39:
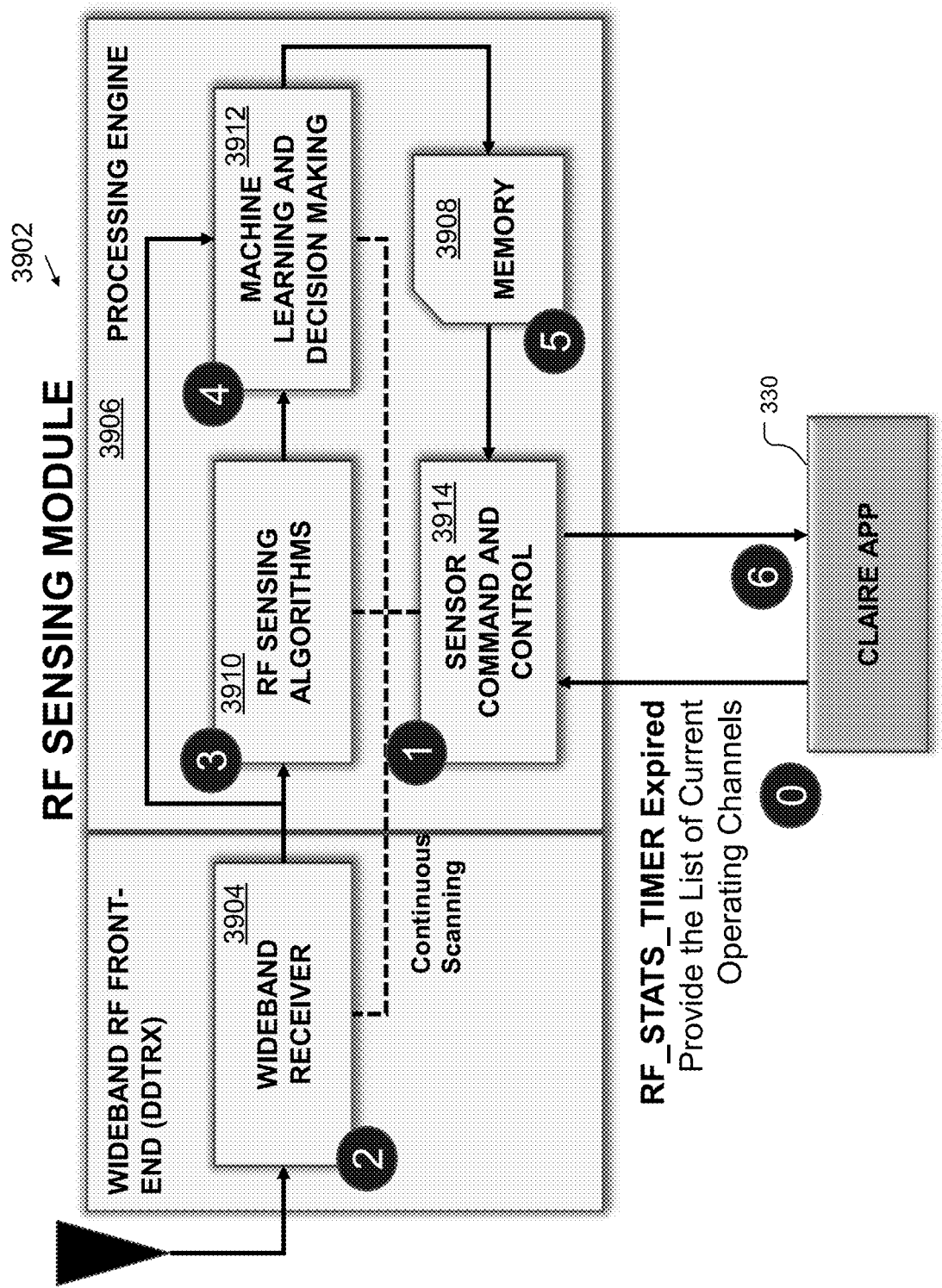
FIG. 39 illustrates an example apparatus and computer program products for use in connection with one or more embodiments.

Given the challenging nature of being able to operate across the spectrum (UHF to Ka Band) as shown in the example of FIG. 39, using Direct Digital Transceiver (DDTRX) Technology to implement Multi-band RF Sensing in a low SWAP form factor makes sense and facilitates low-SWAP implementation of multi-band spectrum situational awareness.

Figure 42:
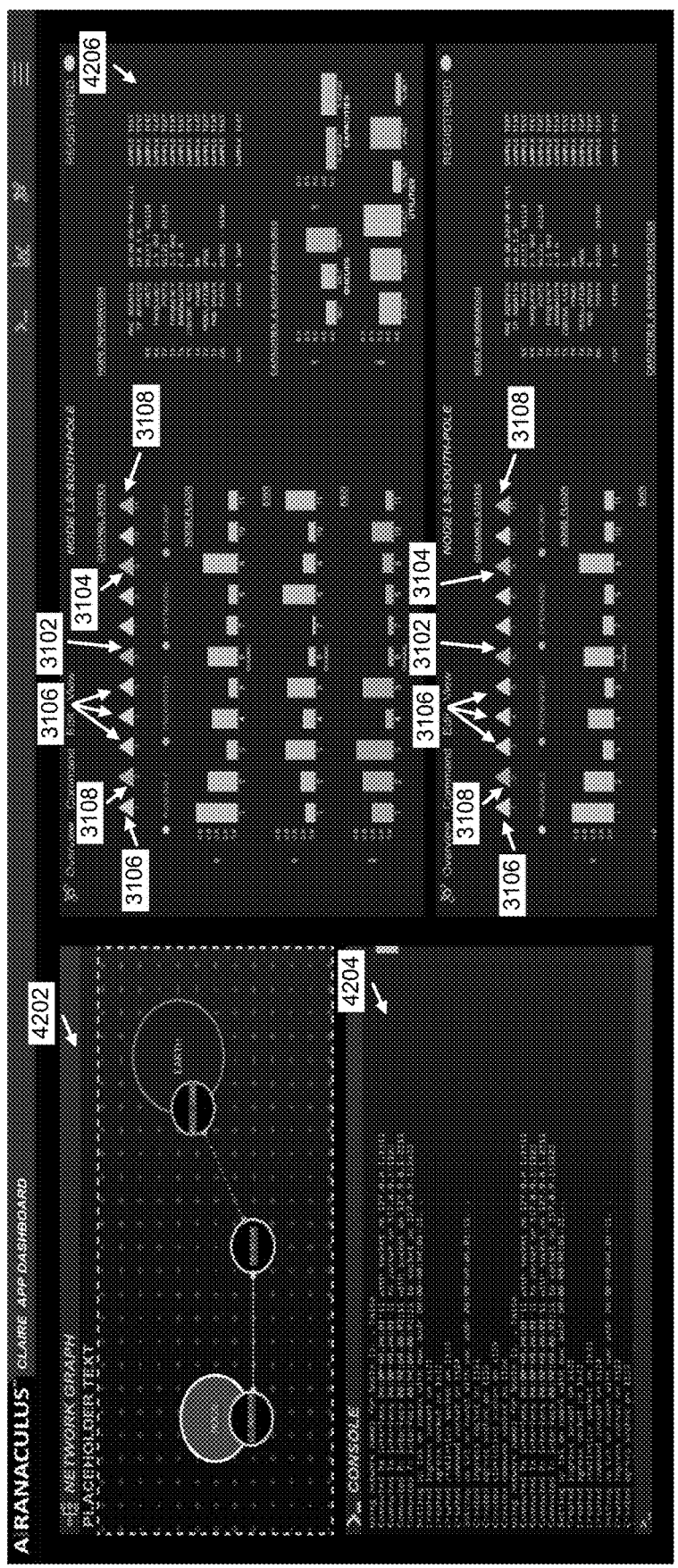
FIG. 42 illustrates an example graphical user interface for use in connection with one or more embodiments.

Occupied Channels are the Channels which are currently being used for Communications. The Unoccupied Channels which may be used in case of interference are called the Backup Channels. The candidate Backup Channels for each Band are periodically updated. In general, the Backup Channels are prioritized based on their Noise Floor. An example of the embodiment as shown in FIG. 42, the Channels with Magenta color are the Operating Channels 3102, Gold colored Channels are Backup Channels 3104, and Green and blue Colored Channels are Available Channels 3106. This may also be based on the NASA policies, in case certain channels are Prohibited from being used. If so, the prohibited channels 3108 should be eliminated from the Backup Channel pool and are represented by a Red Color. The decision logic on how to choose the Backup Channel 3104 may also depend on other factors such as presence of known Spurs or Harmonics, Antenna characteristics, and characteristics of the electronic devices which are used, which may perform better at certain frequencies.

Figure 32:
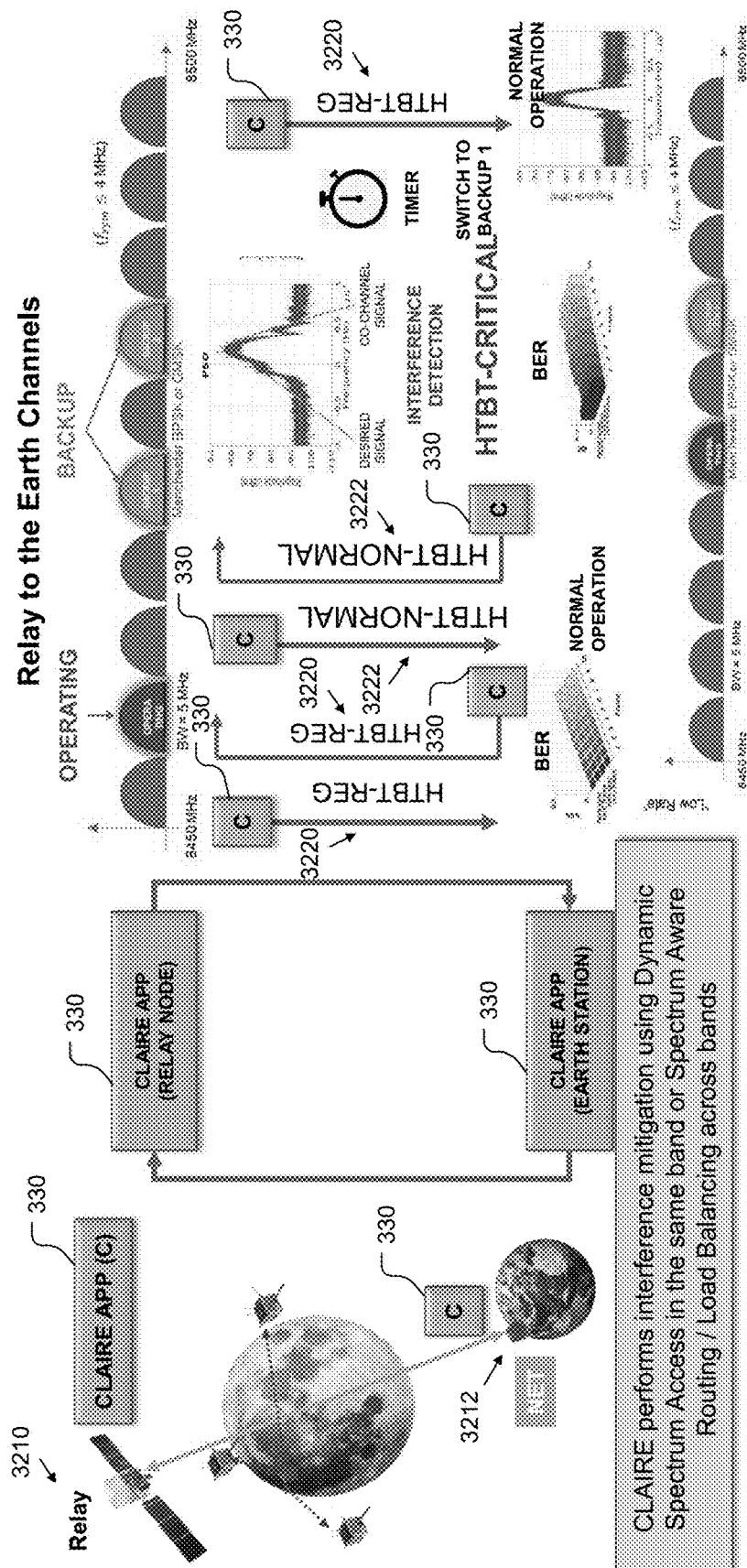
FIG. 32 illustrates an example system, spectra, method, and data structures for use in connection with one or more embodiments.

FIG. 32 demonstrates an example of orchestration of DSA according to an embodiment. It shows how the CLAIRE APPs 330 on the Relay Nodes 3210 and the Earth Ground Station 3212 Register (using HTBT-REG messages 3220) with each other to create a logical connection. This is followed by periodic HTBT-NORMAL exchanges 3222 which, among other things, include RF Sensing information, Radio statistics, optimal Backup Channel information (used when the current Operating Channel 3102 experiences interference), and Buffer Backlog statistics which are used to implement the TASCOR algorithm. CLAIRE APPs 330 monitor these statistics to check the health of the wireless links.

If the Radios 304 at the Earth Ground Station 3212 experience sustained period of interference, then this is conveyed to the CLAIRE APP 330 on the Relay 3210, in form of a HTBT-CRITICAL message. The HTBT-CRITICAL message includes information about worsening SINR statistics, Header Checksums not converging, and hence worsening BER/PERs as well as higher RSSI. The CLAIRE APP 330 on the Relay 3210 monitors the interference statistics for a certain amount of time (Wait_Before_Rendezvous Timer), before switching to the Backup Channel 1 as shown in the example of FIG. 32. The Radios 304 then send out a HTBT-REG Message 3220 on the new Operating Channel 3102 to re-establish the logical connection. The Wait_Before_Rendezvous Timer can be adjusted based on the system response that is desired.

Traffic Spectrum and Congestion Aware Routing and Packet Forwarding Engine

Figure 33:
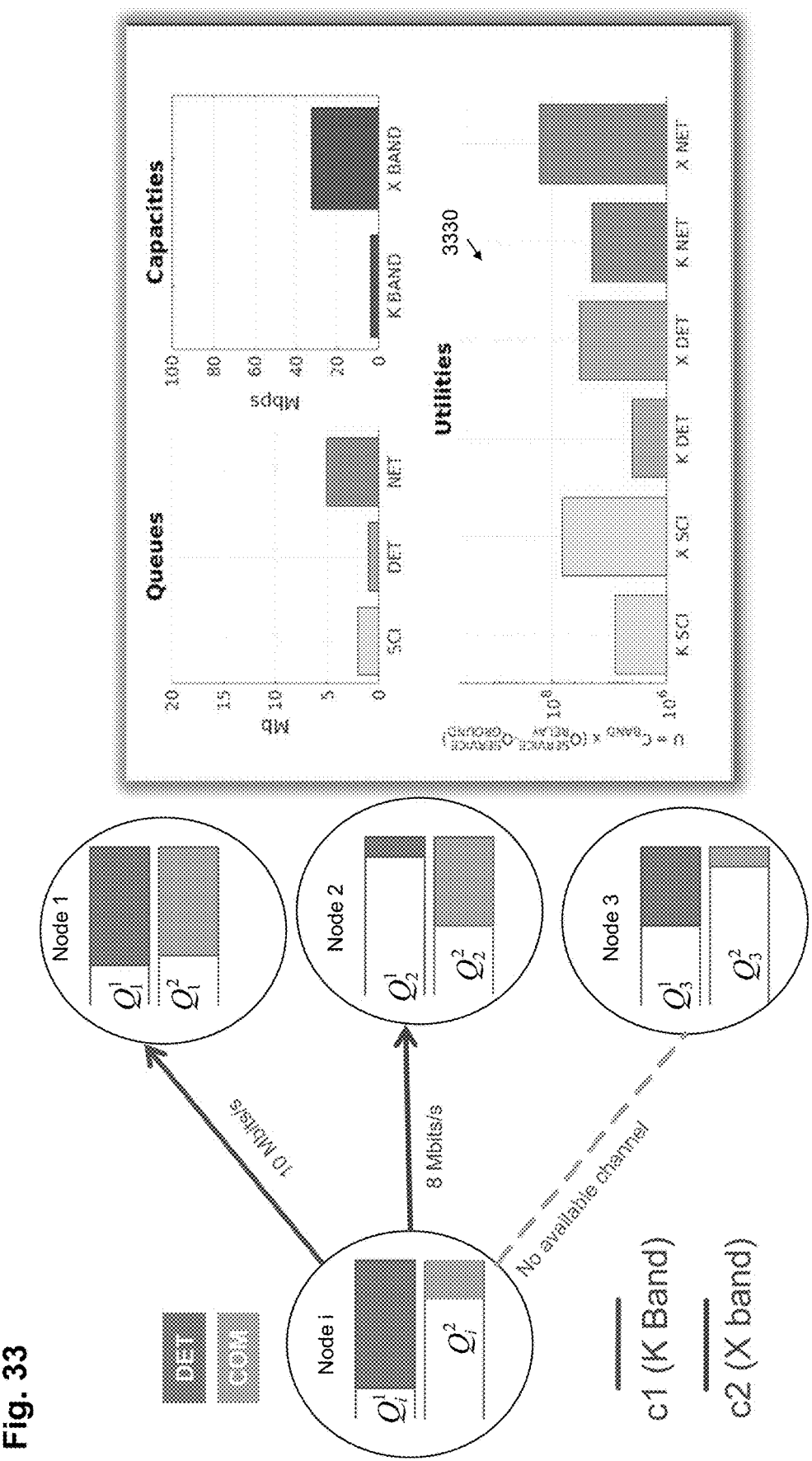
FIG. 33 illustrates an example system, method, and data structures for use in connection with one or more embodiments.

The Packet Forwarding Engine (PFE) 352 implements the TASCOR algorithm. In an embodiment, a CLAIRE App 330 is configured to provide spectrum-aware heterogeneous routing, to facilitate link closures and Self Organizing Networking (SON) operations even in adverse conditions to meet service level agreements (QoS). With this objective in mind, solutions that leverage Optimization and Learning for Joint routing and Channel and Link Parameters (Queue) may satisfy the needs of the Communications as a Service Architecture. This framework may guarantee autonomous configuration, adaptation, and recovery of the network. Algorithms (e.g., as illustrated in the examples of FIGS. 3 and 33) that aim to maximize the Utility, as a function of both Capacity and Differential Buffer Backlog, are well-suited for NASA's CCSDS Bundle Protocol, since the protocol itself does not define what routing algorithms should be used.

One or more embodiments include an algorithmic strategy that extends a framework and specializes it to the unique characteristics of space missions. As compared to previous work which focused on optimal channel and route selection, TASCOR takes into account Traffic, Spectrum, Congestion, and Policies to decide what Packet 316 is to be sent to which Radio 304, in which Band, over which Channel, over what Route, and with what Modulation and Coding Scheme while taking into account any Policy Constraint.

When a bundle 506 is ready to be transmitted, the CLAIRE APP 330 looks at information received from the neighboring nodes 302 through HTBT messages 340. Based on that and on previous information stored in a buffer it calculates an objective function to be maximized, which includes a weighted product of link capacity and differential backlog for the three applications (NET, DET, SCI). The traffic-aware joint selection of transmission interface (which radio 304 to use), band (e.g., S band and K band), channel within the band, modulation and coding within the channel. For each combination (radio 304, band, channel, MCS), we calculate the link capacity taking into account the estimated interference, available bandwidth on radio/channel, and selection of MCS.

In an example embodiment, the TASCOR is an application-layer routing algorithm, that selects 1-hop routing for bundles handled by HDTN services. Unlike traditional routing, operates at Layer 5 on top of the traditional architecture to identify next hops based on a combination of available radio link statistics, RF sensing stats, buffer backlog, traffic stats and policy. Once the routing decision has been taken, it overwrites the routing table in the HDTN code to modify the routing decision with respect to standard non traffic aware and not spectrum-aware routing protocol.

In another example embodiment, the TASCOR operates at Layer 5 on top of the traditional architectures such as TCP/IP or UDP/IP to identify next hops based on a combination of available radio link statistics, RF.sensing stats, buffer backlog, traffic stats, and policy. Once the routing decision has been taken, it overwrites the routing table to modify the routing decision with respect to standard non traffic aware and non-spectrum-aware routing protocol.

In one embodiment, TASCOR and intelligent PFE 352 predict the network topology at a given time based on location, average delay time, windows that allow real-time communication, average link capacity, orbital mechanics, and multiple paths to pre-plan various routes that the packets will take to optimize the QoS and QoE.

TASCOR may be based on deterministic non-linear optimization. The algorithmic framework results in localized, distributed, and real-time decision strategies to jointly select the best next hop, relay node, and transmission interface (frequency and power) while maximizing the link capacity.

In an embodiment, distributed algorithms are executed at each backlogged Node i, which will dynamically and independently 1) Select the best next hopj, and 2) Perform spectrum allocation (which interface w to use, at what power P, and at what Modulation and Coding Scheme) 3) Any Policy Constraints (e. g. during Descent and Docking, prioritize DET and PNT and minimize the SCI Packet transmission) based on local queue and spectrum occupancy information collected on the common control channel. This local optimization problem may include maximizing the spectrum utility $U_{ij}^S$ $$(\omega, P, j) = \arg\max(U_{ij}), U_{ij} = c_{ij}(\omega, P, j)(Q_i^{S*ij} - Q_j^{S*ij})$$

per QS where $C_{ij}(w,P,j)$ represents the capacity of link $(i,j)$ for a given choice of interface w, power P, and next hopj, while $Q_i^{S*ij}$ indicates the queue backlog for session Sij*, i.e., the session with maximum differential backlog. The expression to be maximized represents the product between the achievable data rate (given by the link capacity under spectrum sharing and power budget constraints) and the differential backlog of the session with the highest backlog (i.e., the traffic sessions with maximum difference in the queue backlog between source and destination). By maximizing the expression above based on the current dynamic spectrum, queuing conditions, the Node 302 will choose: 1. Which Packet 316 is allocated to Which Band; 2. Spectrum/Channel Allocation; and 3. Power Boosting and/or changing the Modulation and Coding Scheme to optimize the network performance.

The distributed objective criterion above can lead to solutions with excellent throughput. One or more embodiments may further include one or more of:

Distributed solutions to the original, centralized, and computationally unfeasible resource allocation problem.

Algorithms to maximize the spectrum utility in the node-centric formulation for the cooperative case, based on local information. The impact of protocol and computational overhead of the solution may be assessed to evaluate trade-offs between potential performance improvements and losses caused by increased protocol overhead.

Adaptive strategies to derive optimal time scales for the distributed decisions.

Algorithm behavior to minimize the energy consumption when the traffic load is low.

In an embodiment, a CLAIRE APP 330 routing decision includes a choice of packet (of NET, DET, or SCI service) and a choice of link. The choice of link includes the destination node (Ground Station, Relay, or Lunar Surface Node), the Band of transmission (UHF, X, or K), and the channel within that band. One example includes a routing decision from a Relay 3210 with line-of-sight to a single Earth Ground Station 3212. In this example, the choice of destination node 302 is fixed. The packet type and transmission band may also be fixed. It remains to choose the channel, which may be determined by optimizing the capacity according to the Shannon Capacity Theorem $C(f)=BW \log_2(1+SINR(f))$. In general, the CLAIRE APP 330 may be configured to evaluate all Channels on all Bands and calculate the capacity of each channel, which maps each band to a maximal possible capacity.

As an example, the Band, Channel, Source, i, and Destination, j, may be fixed. It remains to choose the packet type to transmit. This may be done by choosing the maximal Differential Buffer Backlog over all possible packet types S: $B_{i,j}=(Q_i^S-Q_j^S)$. When transmitting to a Ground Station 3212, it is assumed that $Q_j^S=0$, since Earth is expected to have a good high-speed connectivity. So, the service with the largest queue at the Source Node may be chosen. The CLAIRE APP 330 may be configured to combine all factors into its routing decision by jointly considering the Destination, Band and Channel, and Service (SCI, DET, NET, PNT), by computing the utility function $U_{i,j}(f)=C_{i,j}(f)(Q_i^S-Q_j^S)$, and choosing the link with the greatest utility.

FIG. 33 illustrates an example of the decision process for a link from a Relay 3210 to a Ground Station 3212, according to an embodiment, where the destination is chosen but the choice of Band and Service is to be selected. Each Band, (X and K) has a time varying capacity based on Channel and Noise fluctuations. Each service queue will also vary in time. While the K Band has higher Capacity in general, it is potentially less reliable. SCI and DET service traffic is expected to come in bursts while NET traffic is expected to be stable. In the example represented by FIG. 33, the X band has higher Capacity, and the NET service has the highest backlog. From this, the six Utility values 3330 may be computed and the largest one may be selected, which is to transmit a NET packet on the X band. The remaining band, the K band, may be used to transmit a different service packet with the highest utility on that band. The routing decision process may be decided locally by using information about other nodes passed through HTBT Messages 340.

In an embodiment, a Utility Function approach as described herein may be modified to account for other needs in the network. For instance, the feasible link network topology varies in accordance with the celestial mechanics governing the nodes of the network, which means there will sometimes be a substantial delay in the routing process. The Utility Function could contain a factor based on Geometries that takes this into account.

Cross-Layer and UHF to Ka Multi-Band RF Sensing—Algorithms

Figure 34A:
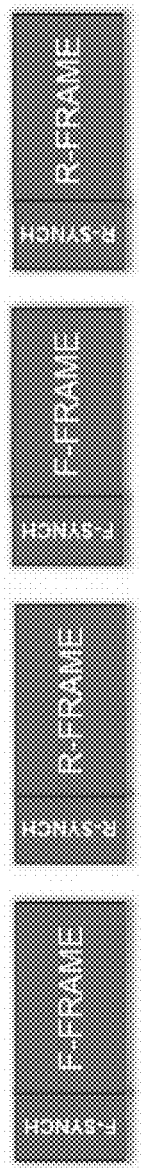
FIGS. 34A-B illustrate example data and data structures for use in connection with one or more embodiments.
Figure 34A:
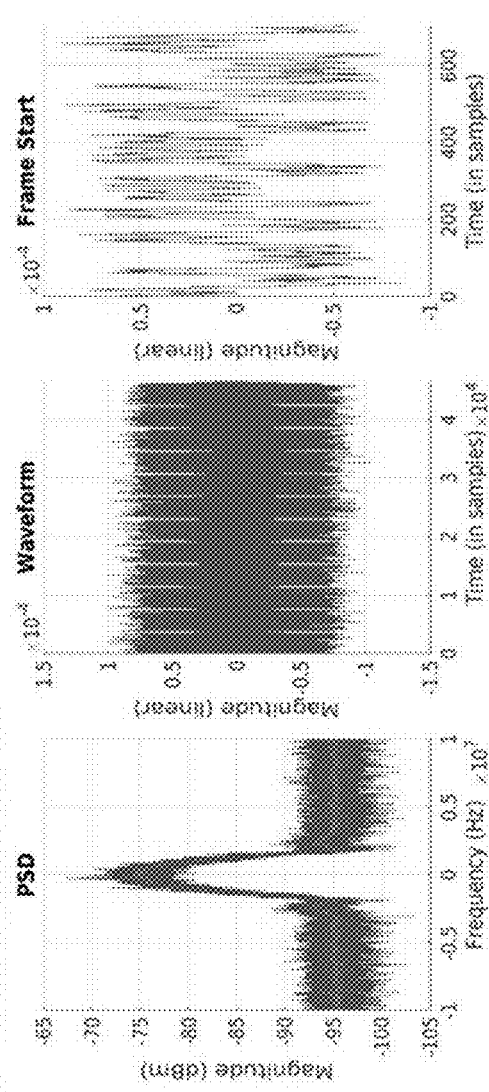
Figure 34B:
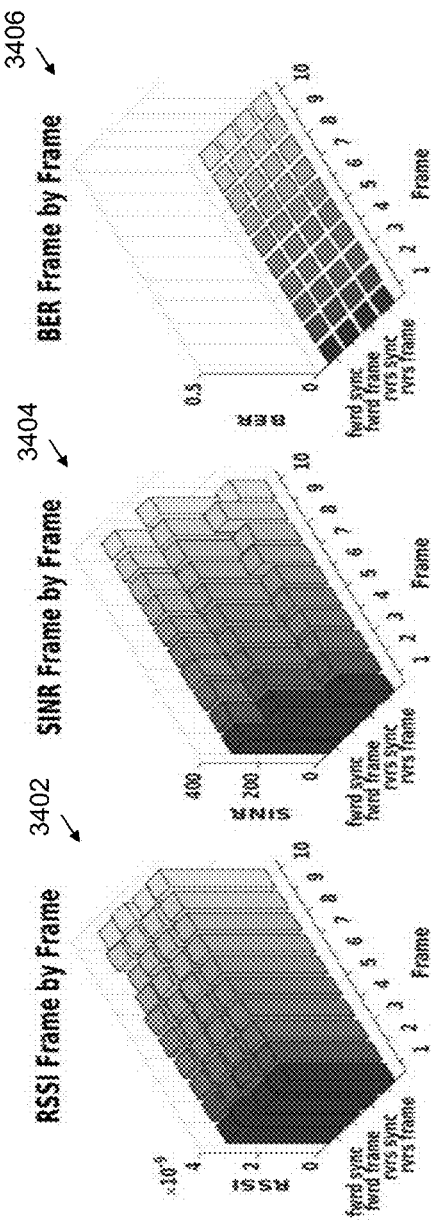
Figure 35A:
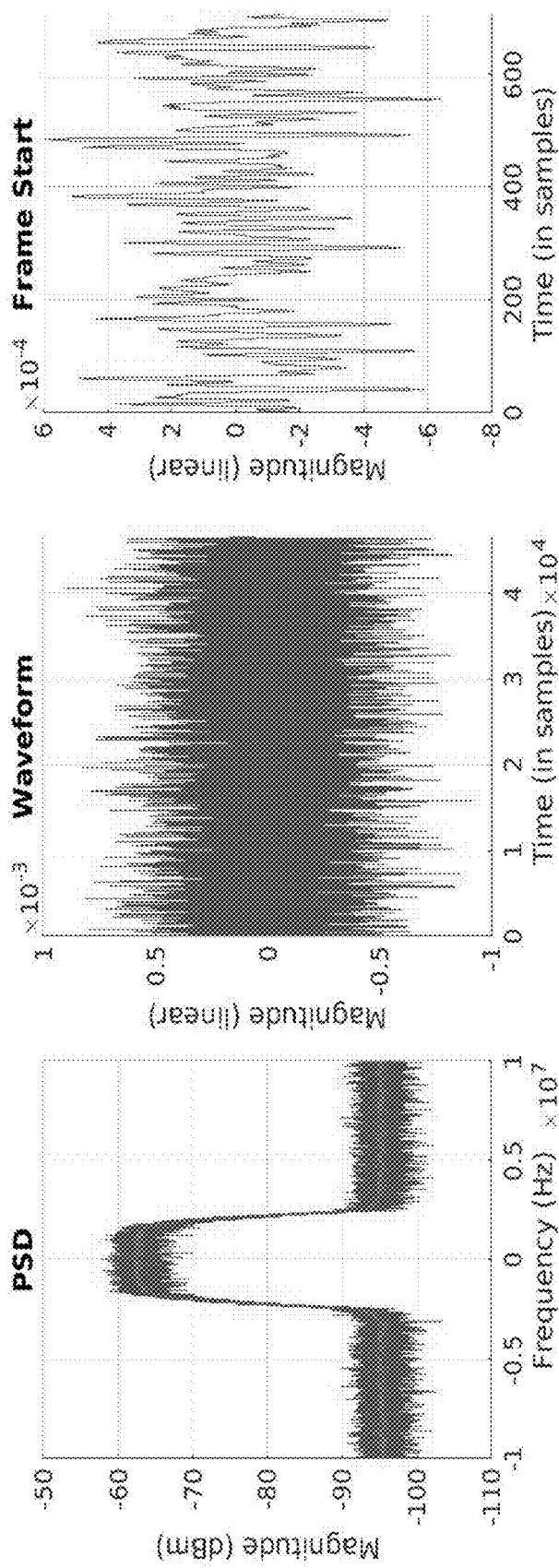
FIGS. 35A-B illustrate example data and data structures for use in connection with one or more embodiments.
Figure 35B:
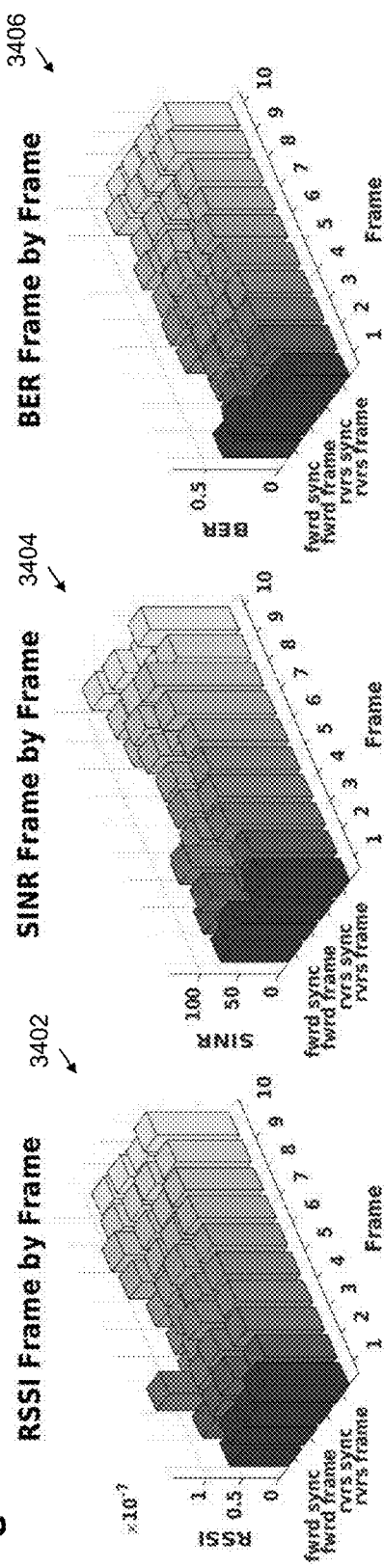

Cross-layer spectrum-aware routing generally requires adequate understanding of the current spectral situations on relevant RF links. The involved NASA ARTEMIS Radios—themselves provide the first level of spectrum awareness—the first layer—by potentially providing internal radio-state indicators such as RSSI, Channel Quality Indicator (CQI), Packet Error Rates (PER), and SINR estimates. These may be collectively referred to as the Cross Layer Sensing (CLS) Features. FIGS. 35A-B illustrate an example of simulations according to an embodiment, in which a GMSK Data Link was created using TDMA Frame Structure for simplicity, including Synchronization Packets and Sub-frames. FIG. 34B shows non-normalized RSSI 3402, SINR 3404, and BER 3406 for a healthy Link. The Cross Layer Features may computed for every Sub-frame, which includes the SYNC and the DATA Sub-frames.

Figure 36A:
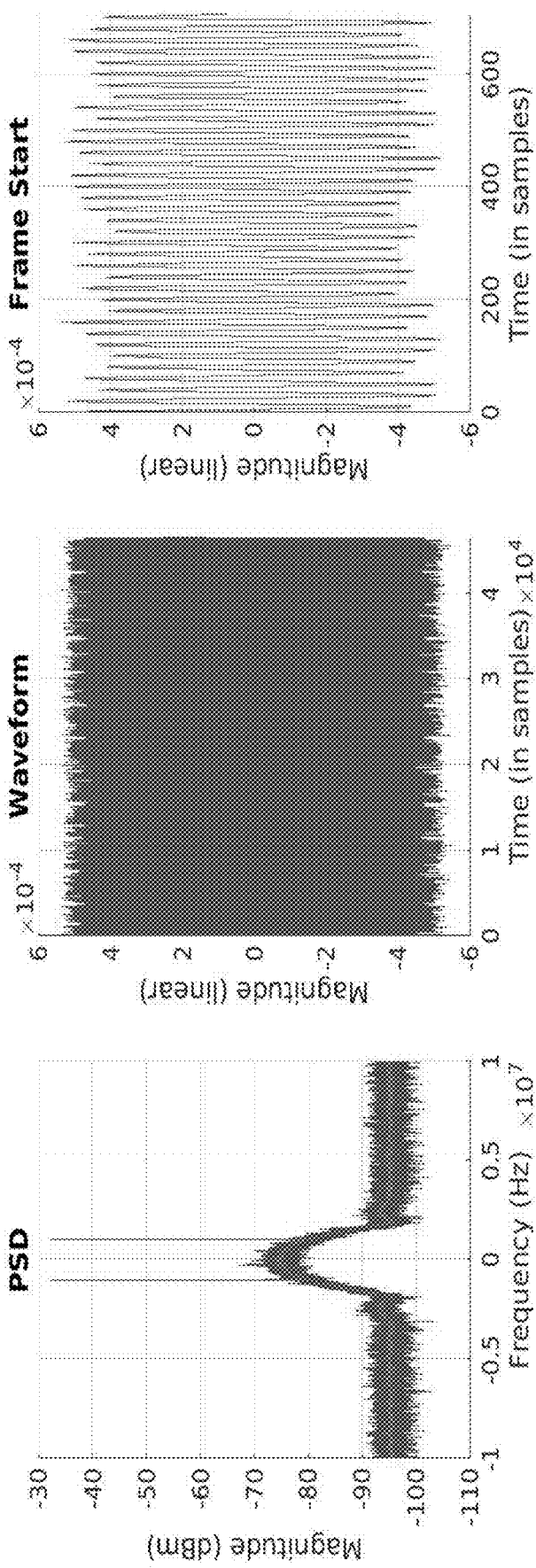
FIGS. 36A-B illustrate example data and data structures for use in connection with one or more embodiments.
Figure 36B:
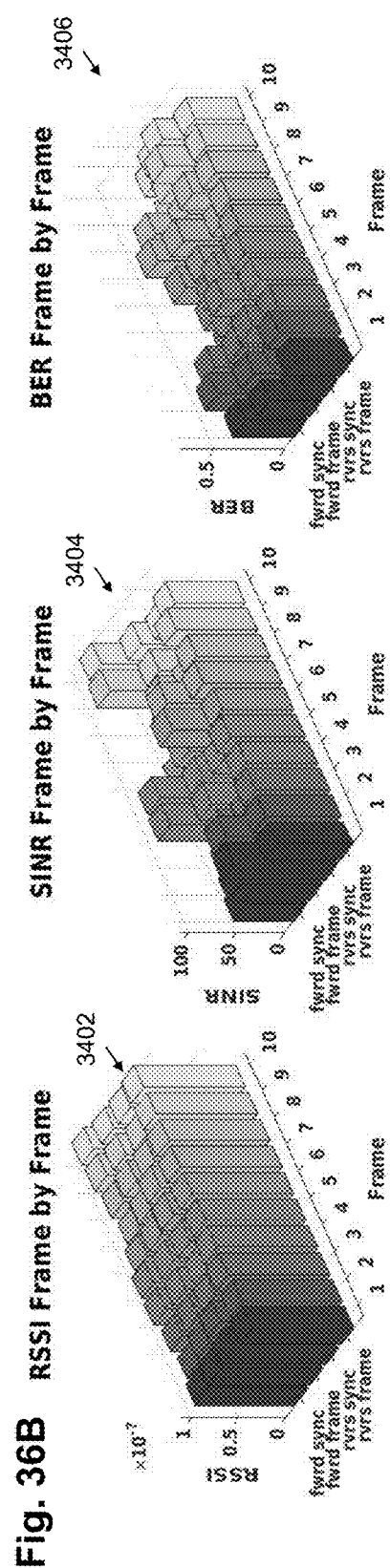

FIG. 35A shows an example of simulations according to an embodiment, in which the GMSK Data Link is subjected to Additive White Gaussian Noise (AWGN) Interference which may be reminiscent of Solar Flares. In FIG. 35B, it can be seen that RSSI 3402 has gone up, SINR 3404 has gone down and BER 3406 has gone to 0.5 for most Sub-frames as compared to the statistics shown in FIG. 34B. FIG. 36A shows an example of simulations according to an embodiment, in which the GMSK Data Link is subjected to a Case of Tone Interference. In FIG. 35B, it can be seen that Cross-Layer: RSSI 3402, SINR 3404, and BER 3406 statistics due to the Tone interference.

These radio internals provide only coarse-grained information regarding the possible source of a performance shortfall because many different kinds of interference, noise, channel conditions, and radio conditions can map to the same set of basic internal parameters. In addition, interfaces to the Radio Management Information Base (MIBs) are sometimes unreliable. Also, different manufacturers compute their internal radio statistics in different ways. The kinds of actions that the spectrum management subsystem might take will depend on more fine-grained information, which can be addressed with sensing that is external to the radio itself—RF sensing is the second layer. For example, a sudden dramatic increase in the noise floor might be due to a radio malfunction, a change to the physical situation (increase in temperature), an astronomical event (solar flare), or interference from a broadband radio.

In addition, Solar Flares can cause significant interference on Relays 3210 and at the Moon-base, with wide-band AWGN interference lasting from minutes to hours. The sensing resources are highly constrained for the space-borne receivers, less constrained on a Moon-base, and relatively unconstrained on the Earth, where SWAP is less important. A single wideband Analog-to-Digital (ADC) board using DDTRX may be well-suited for all the disparate link operating bands, which span UHF to Ka frequencies.

Figure 37A:
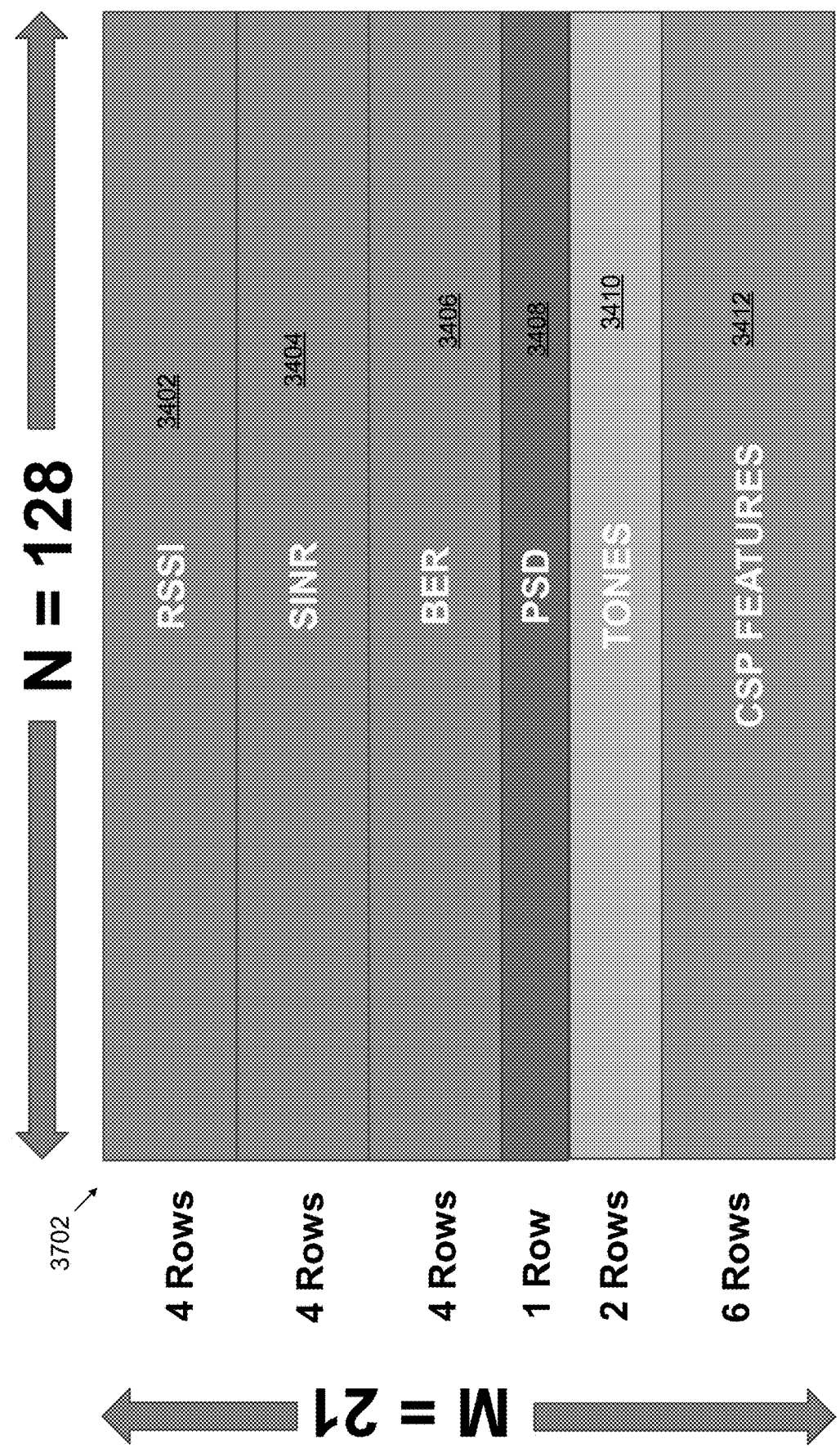
FIGS. 37A-B illustrate example data and data structures for use in connection with one or more embodiments.
Figure 37B:
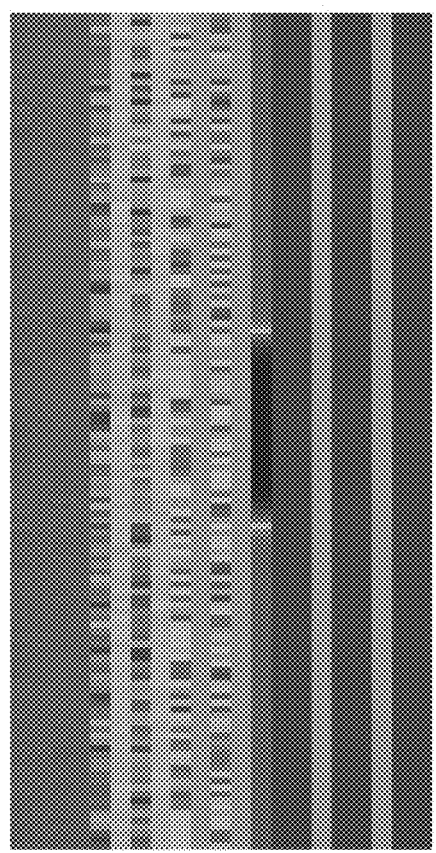
Figure 37B:
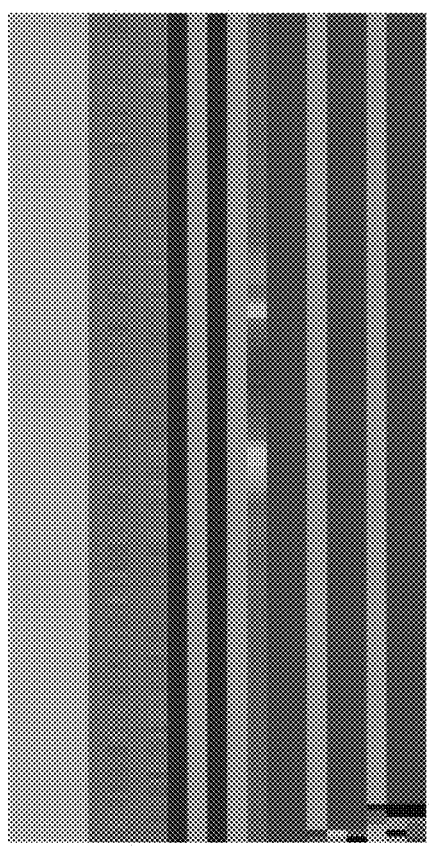
Figure 37B:
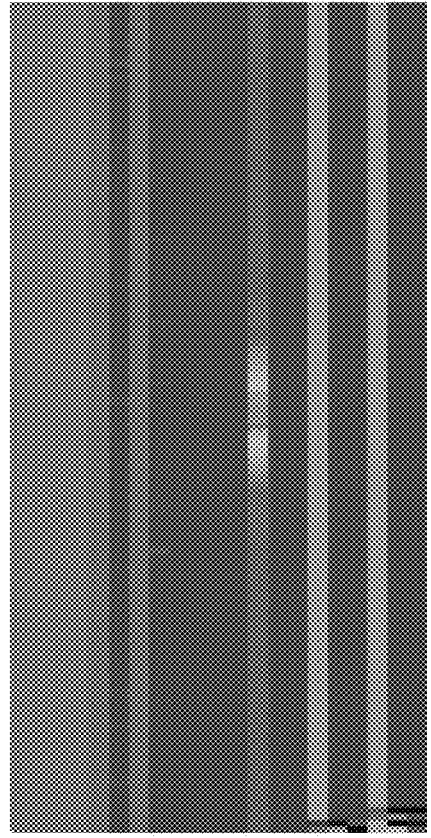
Figure 37B:
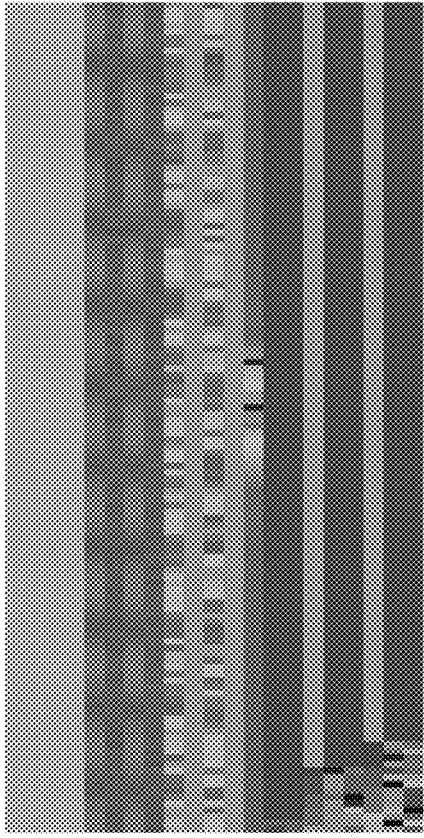

FIGS. 37A-B illustrate an example of forming a Feature Matrix according to an embodiment, based on Cross-Layer Statistics and RF Sensing information from the Cyclostationary Signal Processing (CSP) Features. Specifically, FIG. 37A shows Cross-Layer Statistics of the Radio Links 3402, 3404, 3406, combined with Radio RF parameters such as Power Spectral Density (PSD) 3708, Tones 3710, and CSP Features 3712, stacked together to form a Feature Matrix 3702. FIG. 37B shows a Feature Matrix 3704 seen as an Image for the case of No Interference 3704(1), AWGN Noise Interference 3704(2), Tone Interference 3704(3), and Co-channel Interference 3704(4). The Feature Matrices may then be applied to the Deep Convolutional Neural Network (DCNN) to Detect and Characterize the interference type.

Figure 38A:
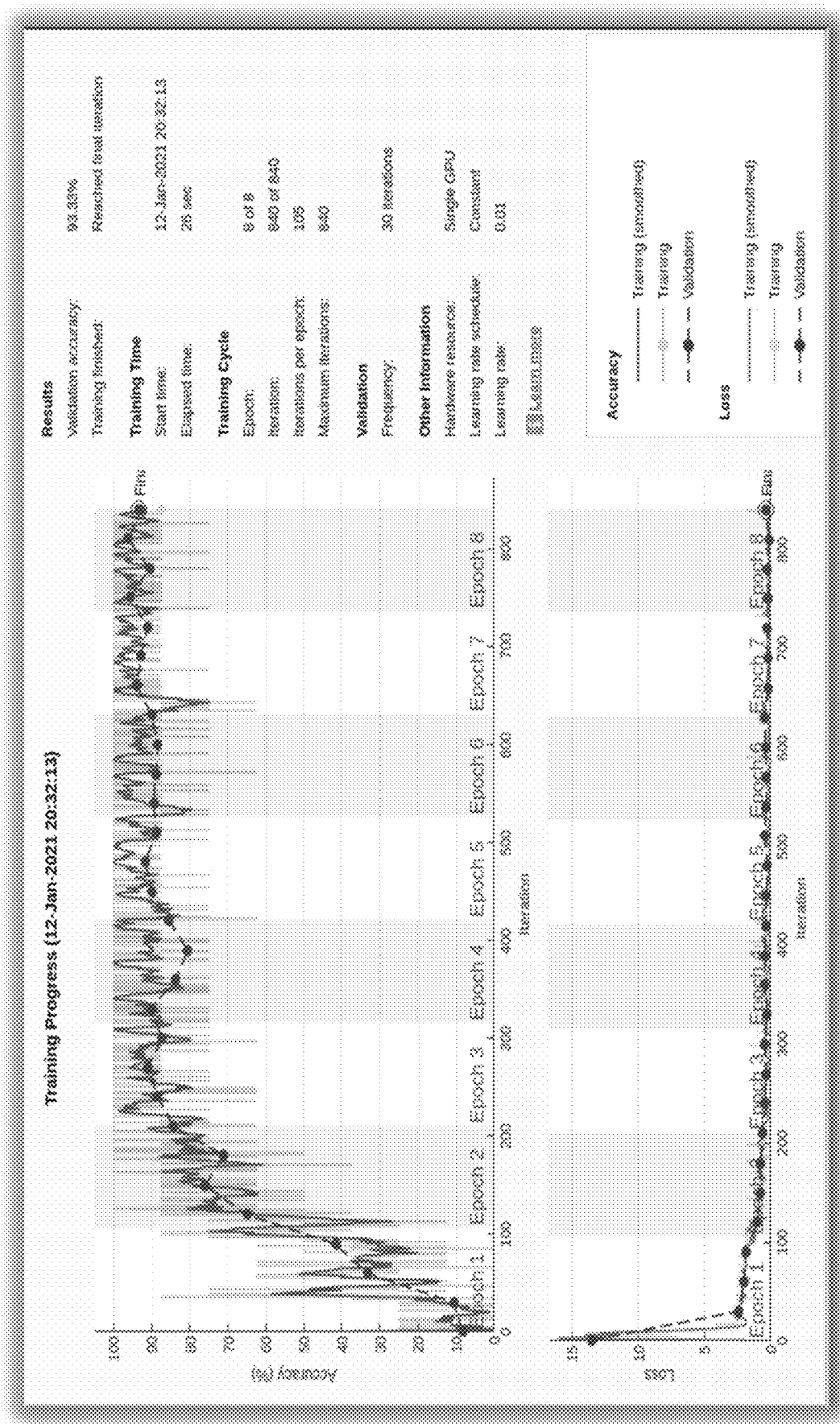
Figure 38C:
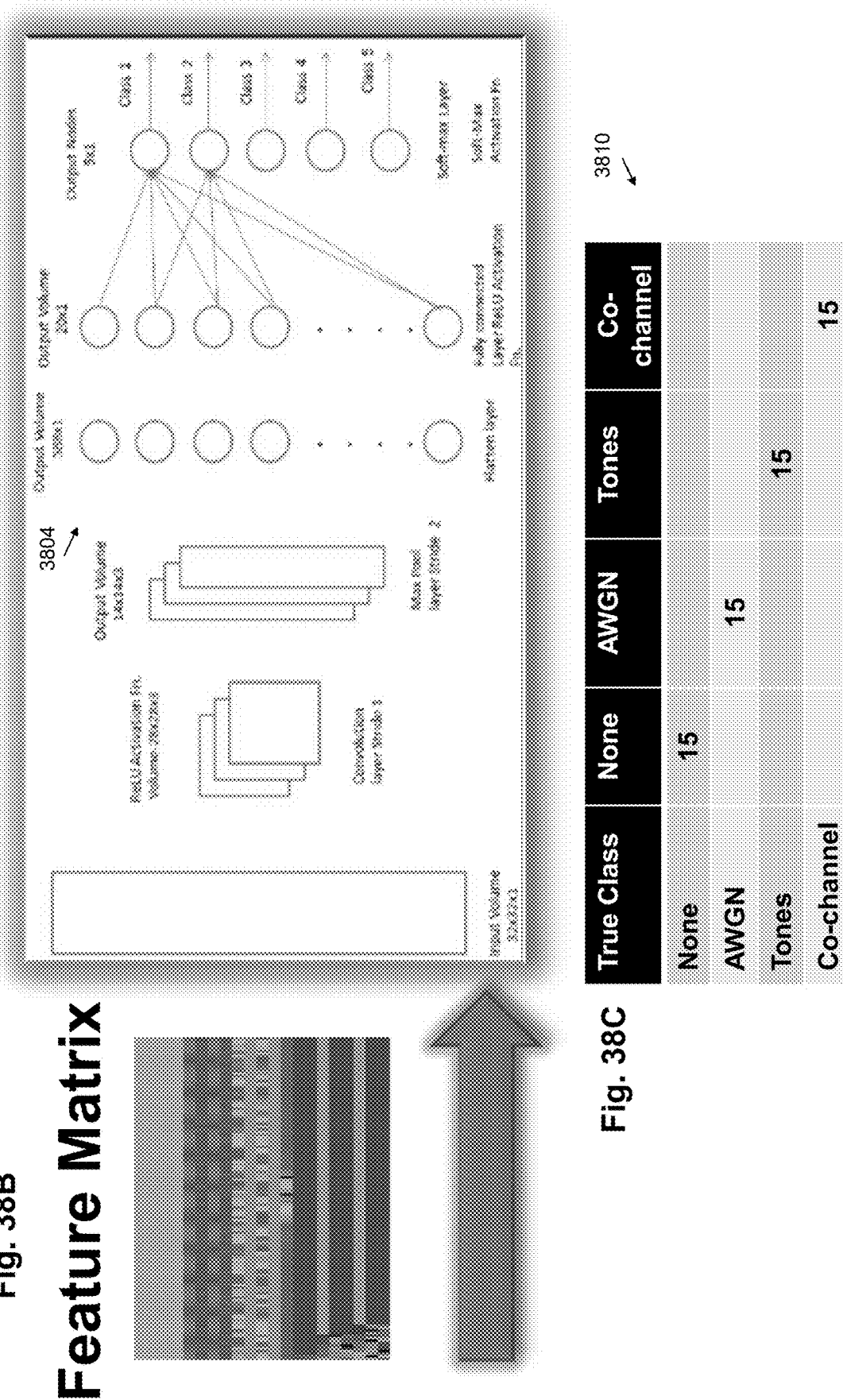

FIGS. 38A-B illustrate an example according to an embodiment. Specifically, FIG. 38A, shows Matlab generated training of the DCNN, followed by Validation and then Testing. FIG. 38B shows a feature Matrix 3802 presented to the DCNN 3804. FIG. 38C shows a Confusion Matrix 3810 showing that the presence of various types of interference can be detected and characterized with very good accuracy. In an embodiment, simpler techniques based on Cross-Layer Features and CSP may be used to determine what the interference is, without involving ML. This approach may help avoid complex ML algorithms and the processing power that they might need.

Wideband Sensing

FIG. 39 shows an example Wideband RF Sensing Module 3902 according to an embodiment. The Module 3902 includes Wideband Receiver hardware 3904 in communication with processing circuitry 3906 having memory 3908. Processing circuitry 3906 may include any kind of processor or set of processors configured to perform operations, such as, for example, a microprocessor, a multi-core microprocessor, a central processing unit (CPU), a digital signal processor, a system on a chip (SoC), a Graphical Processing Unit (GPU), a collection of electronic circuits, a similar kind of controller, or any combination of the above. Memory 3908 may be any kind of computer memory, such as, for example, random access memory (RAM).

Executing on processing circuitry 3906 are RF Sensing Algorithms 3910, Machine Learning and Decision Making module 3912, and Sensor Command and Control 3914. The Wideband Sensing Module 3902 is interfaced to the CLAIRE APP 330. Furthermore, Wideband RF Sensing module 3902 may be implemented using a Direct Digital Transceiver, Cyclostationary Signal Processing, and Machine Learning to enable:

Detection and Characterization of Interference type,
Selection of Optimal Backup Channels
Detection of Mis-configured Radios
Forensics on causes of interference In an example embodiment, Sensor Command and Control 3914 tasks the Wideband Receiver 3904 to fetch I/Q Data for each NASA defined Channel—UHF/S/X/Ka Bands. IQ Samples are provided to the RF Sensing Algorithms 3910. A Vector of Instantaneous and Average Noise Floors for each channel is created. A Vector of Occupied Signals for each Channel is created and CSP Statistics and ML are used to detect and characterize the signals in the Band. The RF Sensing Module 3902 may also provide the SINRs of the signals present in each of the Bands. Sensor Command and Control 3914 provides (publishes) the RF Sensing results which are consumed by the CLAIRE APP 330.

Figure 40:
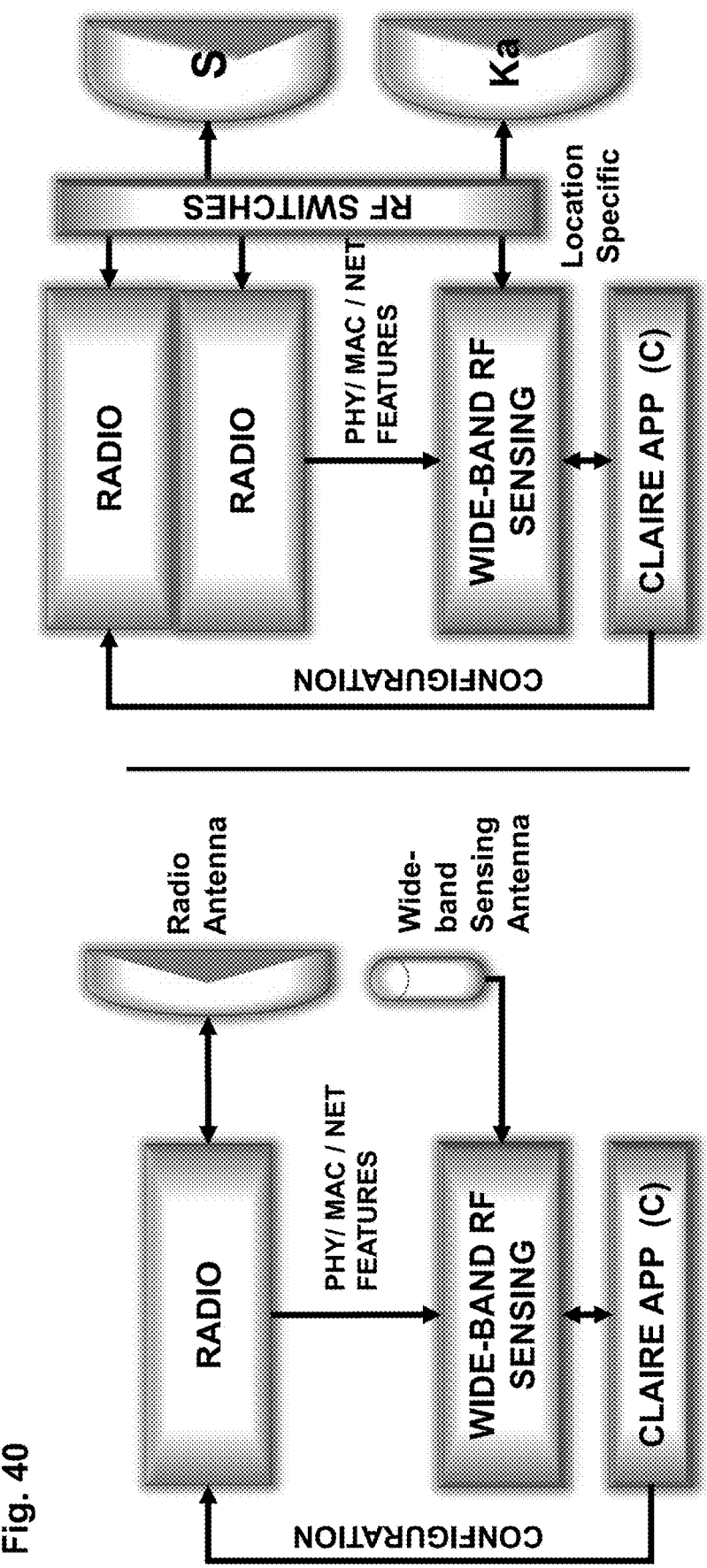
FIG. 40 illustrates an example apparatus, method. and computer program products for use in connection with one or more embodiments.

FIG. 40 shows an example according to an embodiment of the RF Sensing interface with the Radios and Antennas. The figure shows Architecture trade-offs for RF Sensing deployment in Space.

Modeling and Simulations Results

Figure 41A:
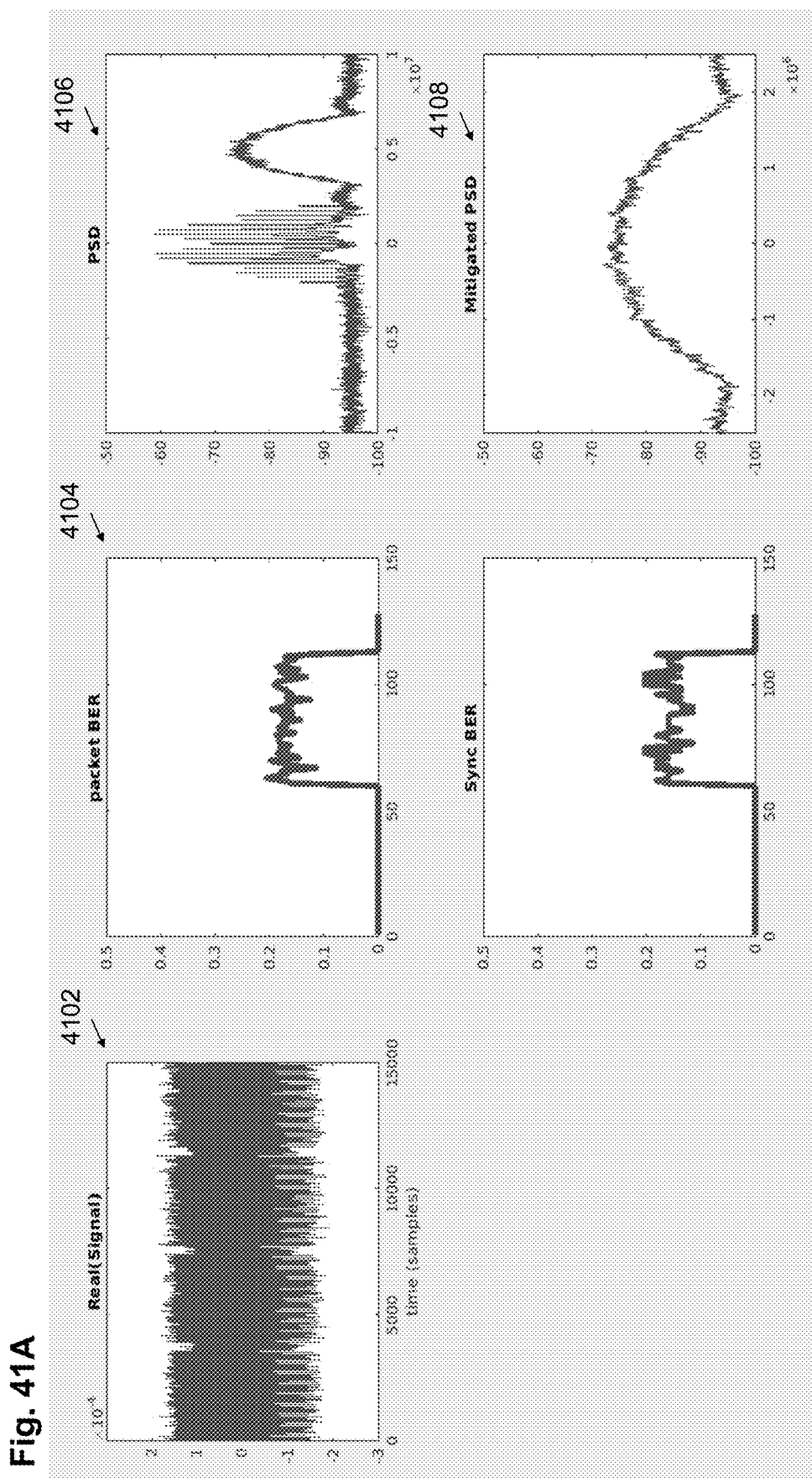

FIG. 41A shows an example of an instance of DSA Orchestration according to an embodiment, through simulations. Specifically, FIG. 41A depicts a GMSK Waveform 4102 with Frames subjected to multi-tone interference; BER statistics 4104 go up. CLS 344 detects the presence of interference. Also depicted is DSA Orchestration 4106 where GMSK is shifted to a different Channel to avoid interference and a Zoomed GMSK Waveform 4108 shows normal PSD.

Figure 41C:
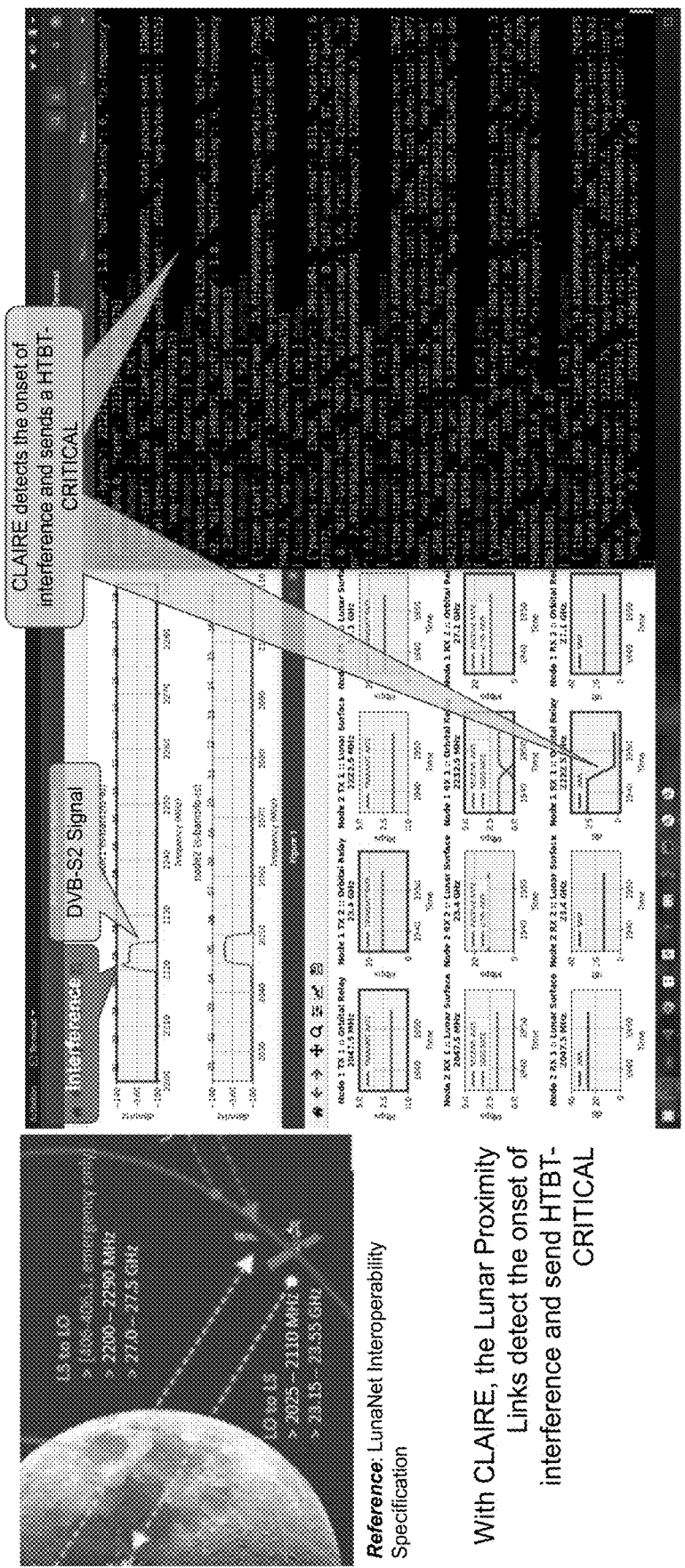
Figure 41D:
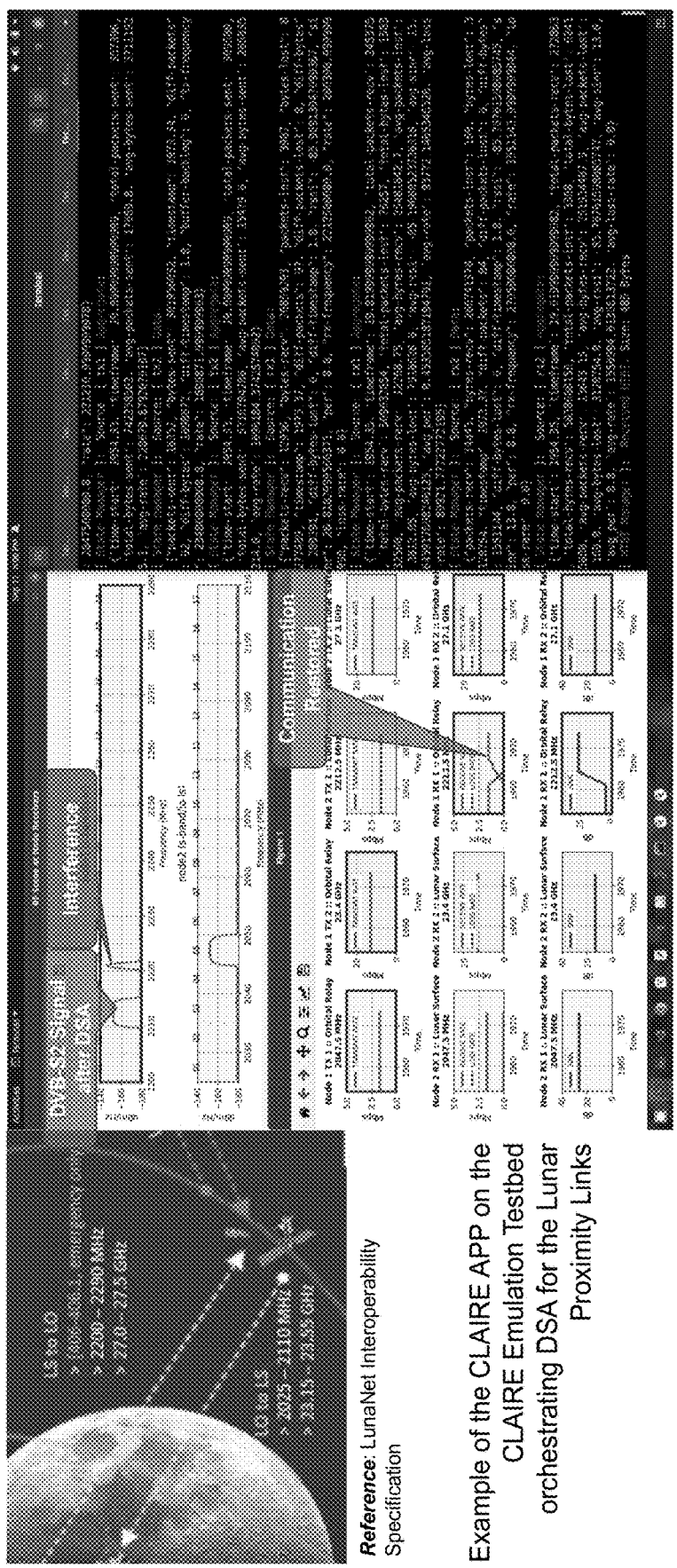
Figure 41E:
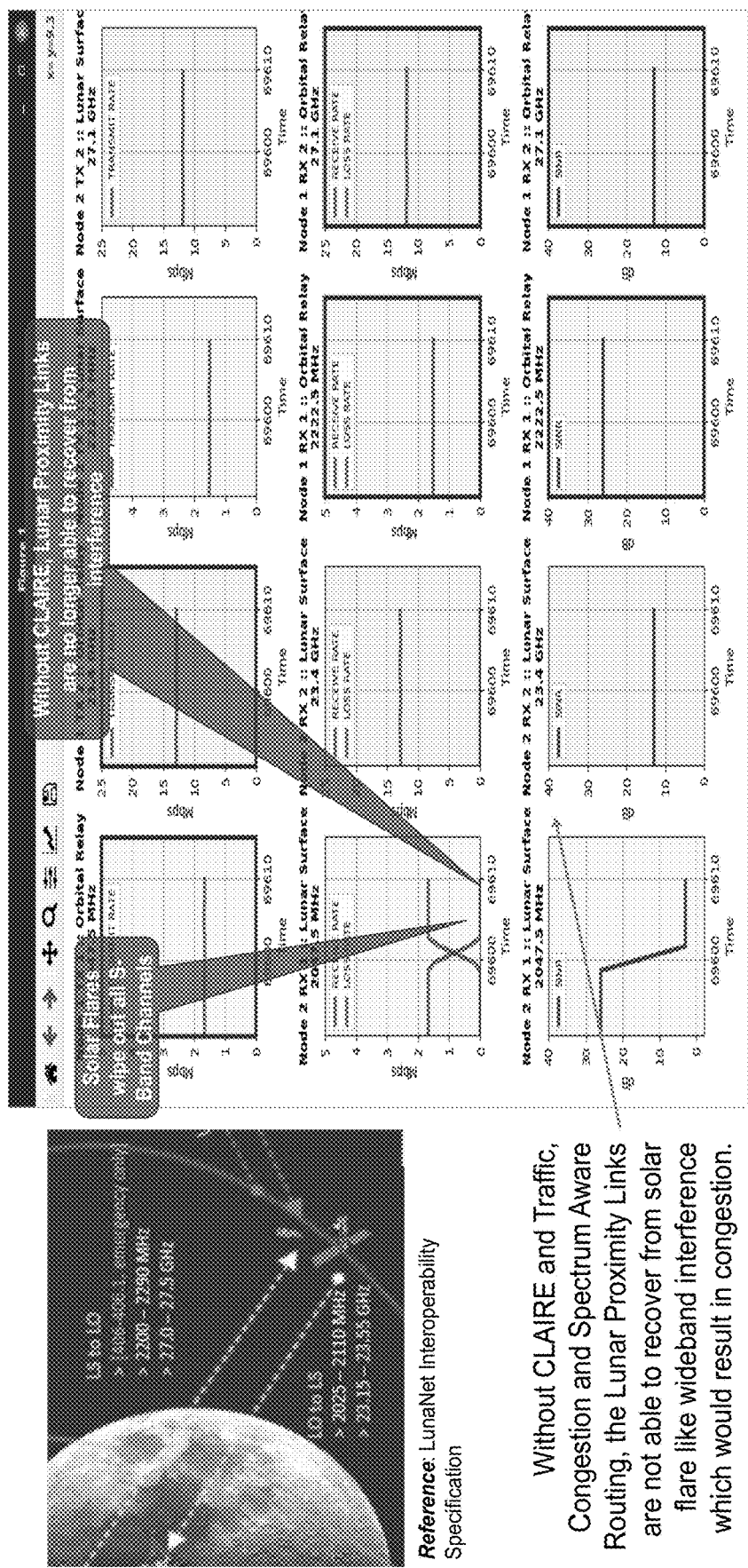
Figure 41F:
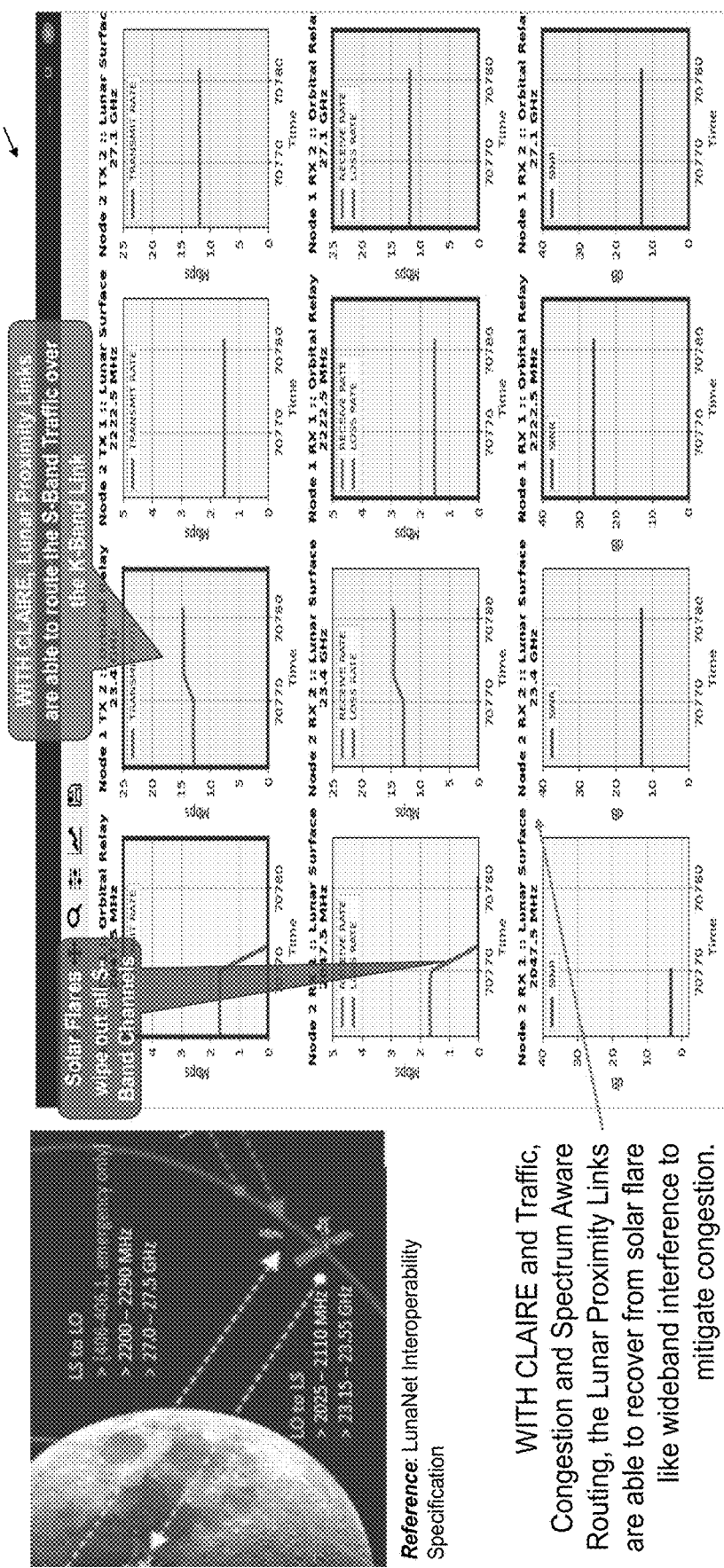

FIG. 41B-D show an example according to an embodiment of an instance of DSA through emulations for the Lunar Proximity Links. The figures demonstrate the Proximity Links from the Orbital Relay 3210 to the Lunar Surface and from the Lunar Surface to the Orbital Relay 3210. Two bands are being used—The S-Band and the Ka-Band as shown in the Figure to the left. The panel in the middle shows Throughputs for various links (Top Two Rows) and SINR at the receivers (Bottom Row). In this instance, interference is introduced for the Lunar Surface to the Orbital Relay that is operating in the 2200-2290 MHz Band. As shown in the figures, the SINR of the links goes down due to the onset of interference at Channel 1 in that Band where the Radio was operating. FIG. 41B shows an example 4120 according to the embodiment of what happens WITHOUT CLAIRE 330. Without CLAIRE 330, the Lunar Proximity Links are not able to recover from interference. The Panel on the right shows that there is no Cognitive Control Plane that carries HTBT messages 340. When interference occurs at the Receiver of the DVB-S2 link on Channel 5 in the 2200-2290 MHz Band, its throughput degrades because there is no interference mitigation mechanism enabled. FIG. 41C shows an example 4130 according to the embodiment of what happens WITH CLAIRE 330—Onset of Interference. With CLAIRE 330, the Lunar Proximity Links are able to detect the presence of interference and act on it. The Panel on the right shows that there is a Cognitive Control Plane that carries HTBT-CRITICAL messages. When interference occurs at the Receiver of the DVB-S2 link on Channel 5 in the 2200-2290 MHz Band, its degrading features (SINR, PER) provide awareness that there is an onset of interference. This information is conveyed to the Transmitter via HTBT-CRITICAL and they decide to engage in DSA. FIG. 41D provides an example 4140 according to the embodiment of what happens WITH CLAIRE 330—After DSA. With CLAIRE 330, the Lunar Proximity Links are able to detect the presence of interference and act on it to restore the Communications Link Throughput. The Panel on the right shows that there is a Cognitive Control Plane that carries HTBT-CRITICAL messages. When interference occurs at the Receiver of the DVB-S2 link on Channel 5 in the 2200-2290 MHz Band, its degrading features (SINR, PER) provide awareness that there is an onset of interference. This information is conveyed to the Transmitter via HTBT-CRITICAL and they decide to engage in DSA. The Transmitter and Receiver move to the Channel 3 and the Link is restored. FIG. 41E shows an example 4150 according to the embodiment of NO CLAIRE 330. Without CLAIRE 330, the Lunar Proximity Links are not able to recover from the congestion caused by a solar flare like wide-band interference which renders the entire S-Band inoperable. However, the K-Band links are still operational and have excess capacity. FIG. 41F shows an example 4160 according to the embodiment of TASCOR and CLAIRE 330—With CLAIRE 330, the Lunar Proximity Links are able to recover from congestion caused by a solar flare like wide-band interference which renders the entire S-Band inoperable. CLAIRE 330 enables the excess S-Band Traffic to be re-routed to the K-Band Links to help maintain the QoS/QoE.

Claire App Dashboard

The CLAIRE APP Dashboard is a user interface designed to provide an easy-to-use and visually intuitive way of interacting with CLAIRE nodes. The dashboard is designed to accurately visualize the data flowing between CLAIRE nodes 302. It accomplishes this by charting out the statistics and instantaneous internal state of each CLAIRE node, allowing an operator to immediately understand what is happening within the CLAIRE system. The purpose of the dashboard is to serve as a demonstration of the CLAIRE App's various abilities. FIG. 42 shows an example according to an embodiment of the CLAIRE APP Dashboard 4200 or the User Interface. The UI may be implemented on a Desktop, Notebook, Laptop or even a Smart Phone device using Android or iOS Operating Systems.

It can be difficult to understand what CLAIRE is doing internally without extensive study of the underlying design. Since each CLAIRE node relies on its own internal state and communications with other CLAIRE nodes to modify its own behavior, it is important for an operator to understand what is going on within a CLAIRE node to understand why it made the decisions it made. Traditionally, understanding the internal state of a CLAIRE node is a nontrivial task which requires either combing through various past logged events or interfacing with the CLAIRE node through a text-based endpoint (such as the command line). These tasks make understanding what's going on within a CLAIRE node quite a challenge. This is especially cumbersome if something goes wrong with the node 302 and maintenance needs to be performed on it in a timely manner. It is beneficial for an operator to have a visually intuitive way of seeing the inner workings of each CLAIRE node to make the presentation and diagnostics of CLAIRE 330 much more approachable.

To align the dashboard with the goals of making CLAIRE 330 more approachable to work with, it features a variety of monitoring and control tools designed to help an operator understand the state of the network at first glance. It contains 3 distinct regions: a network graph 4202, a console 4204, and a list of node panels 4206. The network graph 4202 intends to be an abstracted representation of the physical positioning of each CLAIRE node. In this visualization, the links between each CLAIRE nodes are visualized and colored in an intuitive way such that the state of the node 302 is immediately recognizable. For example, nodes that are experiencing issues are colored red and their previous link is dashed to indicate that it is broken. This allows an operator to immediately recognize where things are going right and wrong and whether the CLAIRE App 330 can react to the issues on a link level.

Directly below the node graph section 4202 is an integrated terminal 4204 for monitoring the logs of and directly controlling the CLAIRE nodes. If manual and verbose configuration is necessary during runtime, this feature will prove especially useful by allowing an operator to bypass the limitations of the controls provided by the graphical user interface.

Alongside those two high-level features is a third section named the node panel 4206 which contains nuanced sensing and statistical information gathered from a single CLAIRE node. This panel is where the majority of diagnostic data will be displayed. It is a live feed of the current status of the CLAIRE node which contains node-specific information on the right such as the current registration state of the node 302, the throughput capacities of each band, the queues for each message type, routing information and such. Alongside the node-specific information is the RF sensing information on the left which contains the state of each channel within an operating band (such as whether it is available for DSA, acting as a backup channel, prohibited or is the current operating channel) as well as the instantaneous RF statistics for each channel (such as Noise floor, SINR, RSSI). Because these statistics are reported live, an operator can take a glance at them and understand the underlying cause for any behavior a CLAIRE node choses to perform. This panel also contains context menus for an operator to control a CLAIRE node graphically. It is useful to have this two-way control between the GUI and a CLAIRE node for future-proofing purposes.

Reaching a broad audience is one of the secondary goals of this dashboard and thus the tech stack that has been selected for the development of this project was selected with that goal in mind. The dashboard 4200 is developed as a progressive web app (PWA) which allows the developers to write a uniform codebase that can be delivered to any platform (desktop, mobile, browser) with only minor modifications to the code to meet platform compatibility. This powerful new approach to application development allows maximum reuse of code and user reach, ultimately reducing the development costs and increasing the number of potential clients.

An example tech stack includes the following:
- Node.JS—A native runtime for javascript with an extensive set of toolchains for building the dashboard
- Typescript—A statically typed language for building web applications
- React—A powerful front-end library for creating web pages
- ZMQ—A cross language socket library with an extensive set of IPC protocols
- Express.JS—Middleware that enables creating web APIs which will allow the development of an adapter for the browser distribution of the dashboard
- D3.js—A powerful library for creating rich and complex visualizations This tech stack will meet the requirements of the dashboard to serve its purpose as a visualization tool for CLAIRE 330 as well as providing a framework for creating a two-way channel for monitoring and controlling each CLAIRE node.

Figure 43:
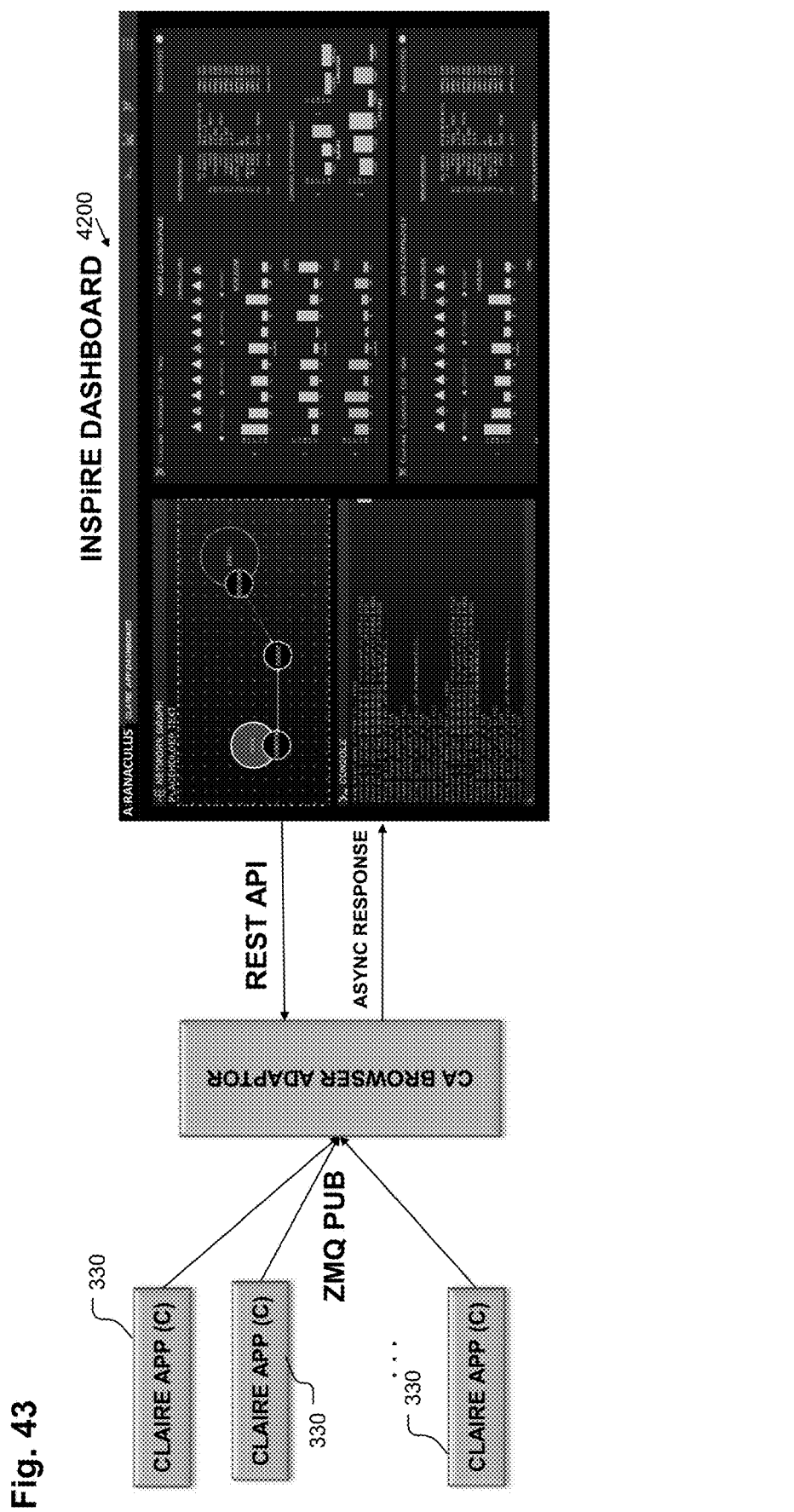
FIG. 43 illustrates an example graphical user interfaces and computer program products for use in connection with one or more embodiments.

The dashboard will piggyback off existing ZMQ infrastructure to gather the data it needs to display. This approach allows the development of CLAIRE 330 to be independent of the dashboard 4200 and vice versa. Integration with CLAIRE 330 therefore will be a process of producing a set of adapters for the dashboard 4200 to interact with CLAIRE 330 for each delivery method. FIG. 43 shows an example according to an embodiment of the CLAIRE APP 330 interface which allows aggregation of data from multiple CLAIRE APPs 330.

EXAMPLES OF USES

The following discussion provides non-limiting examples of potential uses of CLAIRE 330 and associated technology as described herein.

Figure 44:
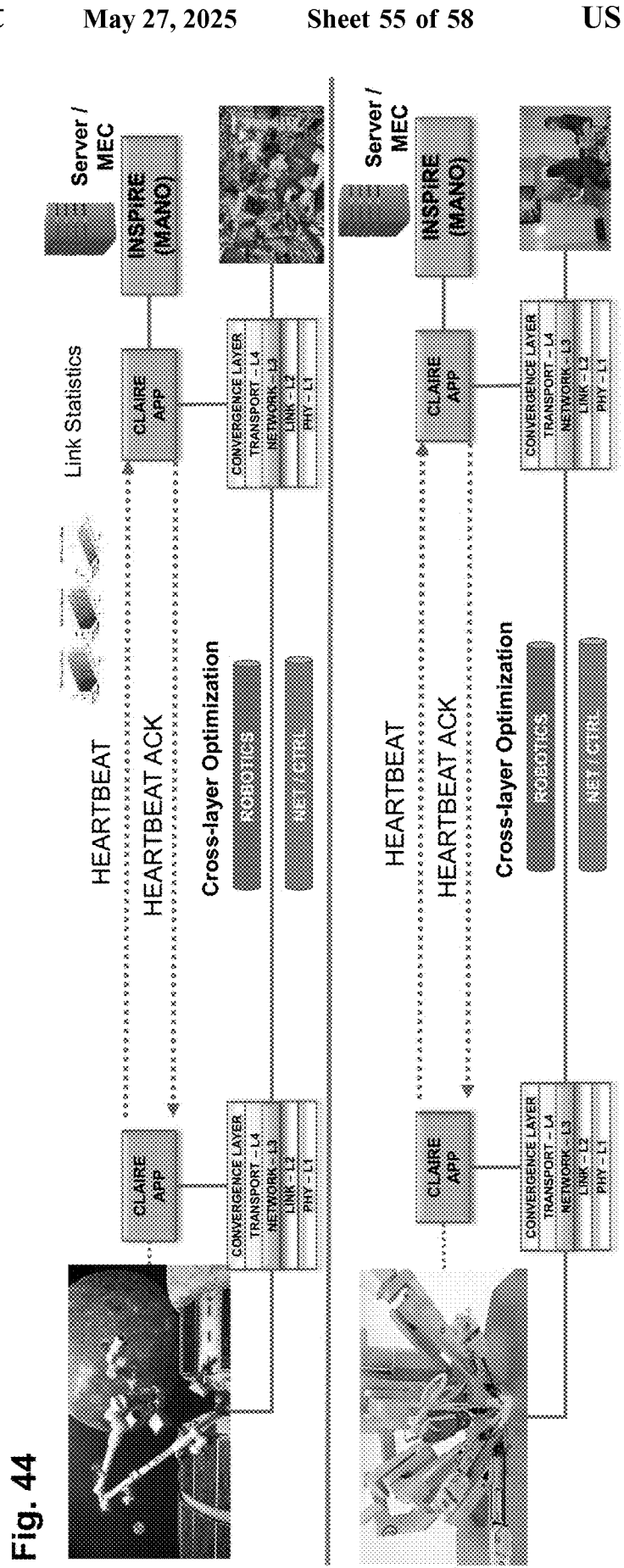
FIG. 44 illustrates an example system, method, computer program products, and data structures for use in connection with one or more embodiments.

According to Ericsson, global wireless traffic is expected to reach 53 Exabytes by 2025, of which 5G will represent 25%. This means there will be considerable switching between 4G and 5G systems as well as WiFi6. Additionally, when new space-based networks such as Space-X Starlink, Oneweb, and Iridium are fully deployed, this may result in a very complex RF environment. CLAIRE intelligent RF agents may be deployed in the Smart City market to help automate the configuration of wireless systems. Alternatively or additionally, CLAIRE 330 may be used in the Telemedicine Industry as shown in the example of FIG. 44. According to the Research and Markets, Global AIoT market will reach $81.5B by 2026, growing at 37.2% CAGR. Global market for IoT data as service solutions will reach $9.3B USD by 2026. 5G New Radio market for private wireless in industrial automation will reach $5.2B by 2026. Embedded AI software and systems in support of IoT will surpass $9B globally by 2026. Machine learning in edge computing will be key to realize the full potential of IoT analytics. Successful smart cities will be dependent on intelligent integration of 5G, AI, edge computing, and IoT.

Currently, most "SMART" wireless systems require human support. For example, when buying something as simple as a home Wi-Fi security system, the consumers may need to spend many hours configuring it. However, by embedding CLAIRE agents in Smart Appliances, the devices may become truly Plug & Play. With CLAIRE 330, a Smart Appliance may scan the environment for all RF signals including the consumer's mobile phone and automatically establish connectivity—in this case connecting the mobile phone to the appliance to facilitate activation, which may allow the new owner to set preferences. Looking outside the home, the RF challenges are further amplified, for example, in Smart Transportation systems where autonomous and human vehicles must connect via 4G/5G/Satellite to traffic management systems. Moreover, unlike the home appliance situation where non-functional webcam or toaster may be an inconvenience, when an autonomous vehicle loses connectivity, the results can be fatal. Thus, CLAIRE agents may greatly improve the connectivity of Smart Vehicles by continuously scanning the RF environment and detecting potential interference and switching with the best available channel.

One or more CLAIRE agents may be provided to manufacturers of Smart Appliances (toasters, fridges, webcams, etc.) to facilitate Plug & Play functionality for consumers. Alternatively or additionally, CLAIRE 330 may also be utilized by Autonomous Vehicles to continuously scan the RF environment to identify problems and solutions before they occur.

One or more embodiments include a "Smart Radio" that uses a CLAIRE agent and DDTRX chips to create a radio capable of supporting multiple bands and protocols simultaneously. A deployment roadmap may start with intelligent RF nodes communicating with existing RF infrastructure, and proceed to intelligent nodes talk intelligent infrastructure. Markets supporting CLAIRE agents may include one or more of:

1. Smart Transportation systems are highly reliant on always-on, secure communications between autonomous vehicles and traffic management systems. Given that autonomous vehicles are moving, maintaining continuous connectivity is very challenging. With the autonomous vehicle market to reach $54 Billion by the year 2026, connectivity is important. CLAIRE 330 may be used to improve the RF connectivity of Autonomous Vehicles, for example under a license.
2. Smart Manufacturing includes an array of systems from energy management, sensor based warehouse systems, robotics, and production lines. While these systems may be within a building and protected from weather, RF interference due to multiple transmitters can be a big problem. With the global Smart Manufacturing market to grow to $514 Billion by 2027, solving in-building interference due to the growing number of wireless systems will be a major opportunity.
3. Digital Agriculture (Precision Farming) is focused on optimizing crop yields while minimizing environmental damage. The primary challenge in "Dig Ag" is self-configuration, as sending out people to maintain water and crop sensors is very labor intensive. In addition to networking sensors, robots are an interesting growth opportunity within Dig Ag.
4. Telemedicine is another very important application that may be supported using the new 5G and Wi-Fi Technologies. FIGS. 6-7 illustrate an example according to an embodiment, in which a CLAIRE Intelligent Agent can optimize the network using the Cognitive Control Plane technology as described herein.

In general, potential commercial applications of CLAIRE 330 may include robust resilient communications for one or more of: private security industry; air traffic control; first responders; counterterrorism; utility industry which is subjected to nation-state attacks; and bands that require spectrum sharing (e.g., CBRS, 1.7 GHz and others) where intelligent decision making is desired. Interference against private sector targets may also likely counter non-malevolent events in congested RF environments. Other applications may include, for example, homeland security, border protection, health and human services, and Department of Defense missions where they are concerned that their radios (in space) may face substantial interference from thousands of new payloads that are being deployed by various nation states and private entities.

Example Embodiments

Figure 45:
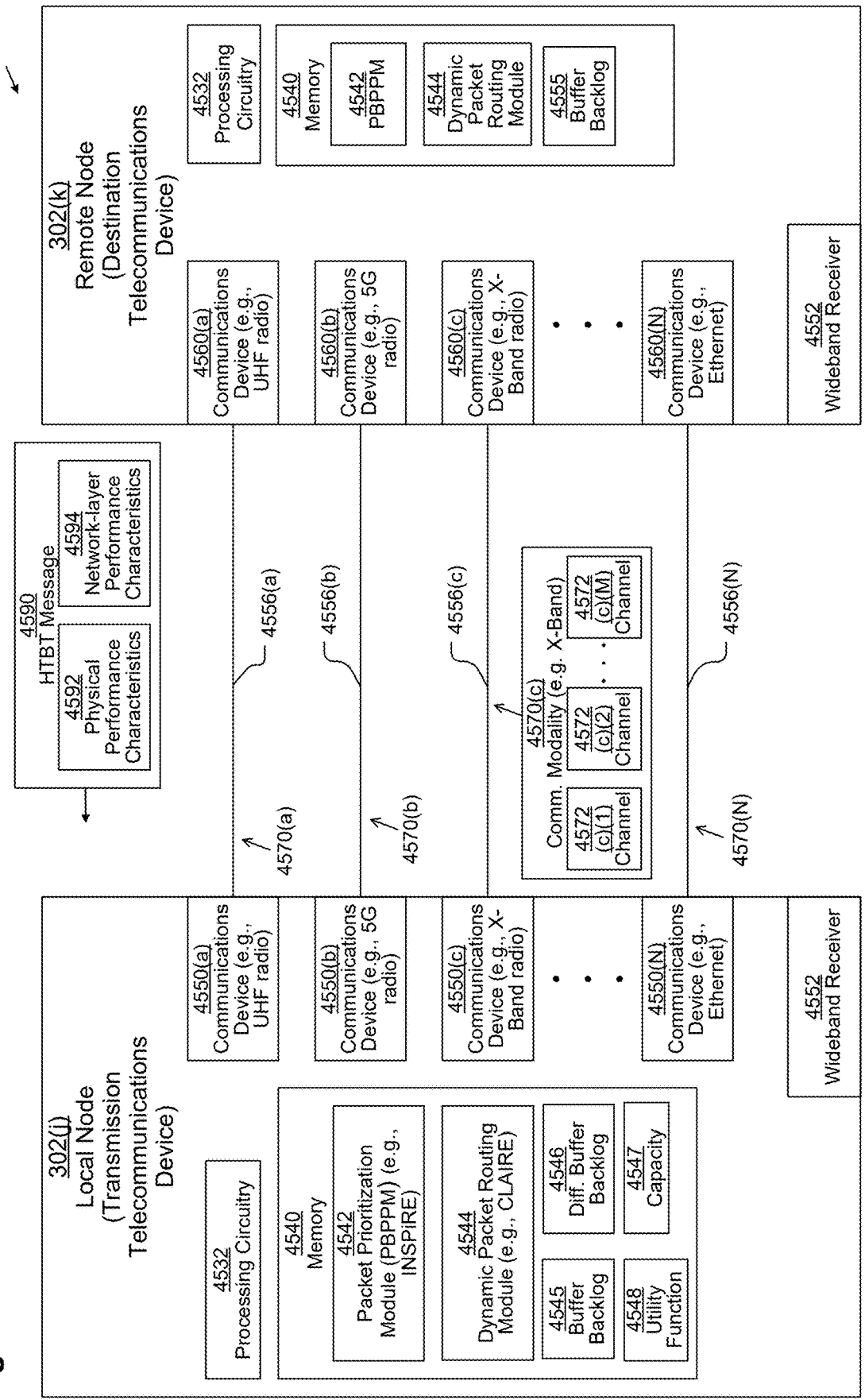
FIG. 45 illustrates an example system, apparatuses, and data structures for use in connection with one or more embodiments.

FIG. 45 depicts an example system 4500 for use in connection with various embodiments. System 4500 includes a local node 302(*j*) (also referred to as a "Transmission Telecommunications Device") and a remote node 302(*k*) (also referred to as a "Destination Telecommunications Device" or a "Destination Node"). Local node 302(*j*) connects to remote node 302(*k*) via a set of links 4556.

Both nodes 302(*j*), 302(*k*) may be any kind of computing device, such as, for example, a personal computer, laptop, workstation, server, enterprise server, tablet, smartphone, etc. Both nodes 302(*j*), 302(*k*) include processing circuitry 4532 and memory 4540.

Processing circuitry 4532 may include any kind of processor or set of processors configured to perform operations, such as, for example, a microprocessor, a multi-core microprocessor, a digital signal processor, a GPU, a system on a chip (SoC), a collection of electronic circuits, a similar kind of controller, or any combination of the above.

Memory 4540 may include any kind of digital system memory, such as, for example, random access memory (RAM). Memory 4540 may store an operating system (OS, not depicted, e.g., a Linux, UNIX, Windows, MacOS, or similar operating system) and various drivers and other applications and software modules configured to execute on processing circuitry 4532.

Local node 302(*j*) includes a set of communications devices 4550 (depicted as communications devices 4550(*a*), 4550(*b*), 4550(*c*), . . . , 4550(N)). A communications device 4550 may be any kind of circuitry that is functional to provide a communications link 4556 using a communications modality to remote node 302(*k*), such as, for example, a radio, a receiver, a transmitter, a transceiver, a wired communications port, etc. As depicted, communications device 4550(*a*) is a UHF radio that communicates using a UHF communications modality 4570(*a*) over RF link 4556(*a*); communications device 4550(*b*) is a 5G cellular radio that communicates using a 5G communications modality 4570(*b*) over RF link 4556 (*b*); communications device 4550(*c*) is an X-band radio that communicates using an X-Band RF communications modality 4570(*c*) over RF link 4556 (*c*); and communications device 4550(N) is a wired Ethernet port that communicates using a wired Ethernet communications modality 4570(N) over wired link 4556 (N).

Each communications devices 4550(X) may communicate via a respective link 4550(X) with a respective communications devices 4560(X) at the remote node 302(*k*). It should be understood that although both nodes 302(*j*), 302(*k*) are depicted as having N communications devices 4550, 4560, that is by way of example only. It is possible for the number of communications devices 4550 at local node 302(*j*) to differ from the number of communications devices 4560 at remote node 302(*k*).

Each communications modality 4570 may include a plurality of channels 4572. For example, a channel might be 20 MHz in width, and a communications modality 4570 might have 20 such channels. As depicted, X-band RF communications modality 4570(*c*) includes M channels 4572(*c*)(1), 4572(*c*)(2), . . . , 4572(*c*)(M). In operation, one or more of the channels 4572 of a communications modality 4570 may be deemed operational channels 3102 or backup operation channels 3104. It is possible for several operational channels 3102 (or backup operational channels 3104) to be bonded together. It is also possible for several operational channels 3102 (or backup operational channels 3104) to be used as separate channels.

In some embodiments, nodes 302(*j*), 302(*k*) may also a wideband receiver 4552.

Nodes 302(*j*), 302(*k*) may also include various additional features as is well-known in the art, such as, for example, user interface (UI) circuitry, interconnection buses, etc.

Memory 4540 of nodes 302(*j*), 302(*k*) stores a policy-based packet prioritization module (PBPPM) 4542 (e.g., INSPiRE 332) which is configured to execute on processing circuitry 4532, a dynamic packet routing module (DPRM) 4544 (e.g., CLAIRE 330) which is also configured to execute on processing circuitry 4532, and a measure of a local buffer backlog 4545, 4555 (e.g., a measure of a backlog of a buffer 308, 318, or 358). In an embodiment, a separate local buffer backlog 4555 may be stored for a buffer 358 associated with each communications modality 4570 used by a node 302.

As depicted, memory 4540 of local node 302(*j*) also stores a differential buffer backlog 4546 representing a difference between the local buffer backlog 4545 of local node 302(*j*)

and a remote buffer backlog 4555 of remote node 302(k). In an embodiment, a separate differential buffer backlog 4546 may be stored for each buffer 358 associated with a corresponding communications modality 4570 used by node 302(k). As depicted, memory 4540 of local node 302(j) also stores a utility function 4548 (and a calculated utility) and a calculated capacity 4547 for each link 4556. Although not shown, memory 4540 of remote node 302(k) may also store these values or structures.

In operation, remote node 302(k) may send a set of physical performance characteristics (PPCs) 4592 and/or a set of network-layer performance characteristics 4594 to local node 302(j). In some embodiments, these characteristics 4592, 4594 may be sent periodically as part of periodic heartbeat messages 340 (depicted as part of heartbeat message 4590).

Memory 4540 may also store various other data structures used by the OS, modules 4542, 4544 and various other applications, modules, and drivers. In some embodiments, memory 4540 may also include a persistent storage portion. Persistent storage portion of memory 4540 may be made up of one or more persistent storage devices, such as, for example, magnetic disks, flash drives, solid-state storage drives, or other types of storage drives. Persistent storage portion of memory 4540 is configured to store programs and data even while the node 302 is powered off. The OS, modules 4542, 4544 and various other applications, modules, and drivers are typically stored in this persistent storage portion of memory 4540 so that they may be loaded into a system portion of memory 4540 upon a system restart or as needed. The OS, modules 4542, 4544 and various other applications, modules, and drivers, when stored in non-transitory form either in the volatile or persistent portion of memory 4540, each form a computer program product. The processing circuitry 4532 running one or more applications thus forms a specialized circuit constructed and arranged to carry out the various processes described herein.

Figure 46A:
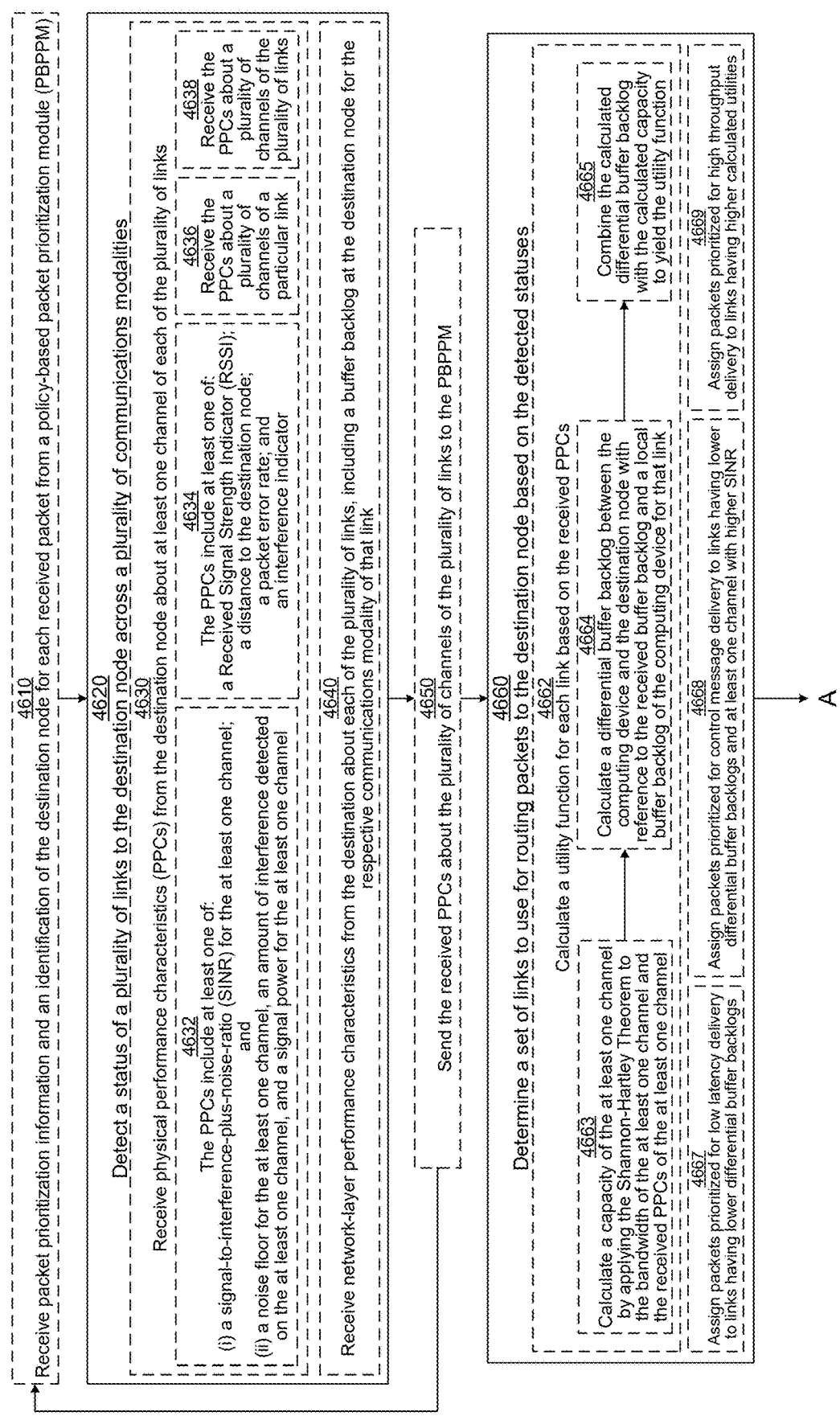
FIGS. 46A-B illustrate an example method for use in connection with one or more embodiments.
Figure 46B:
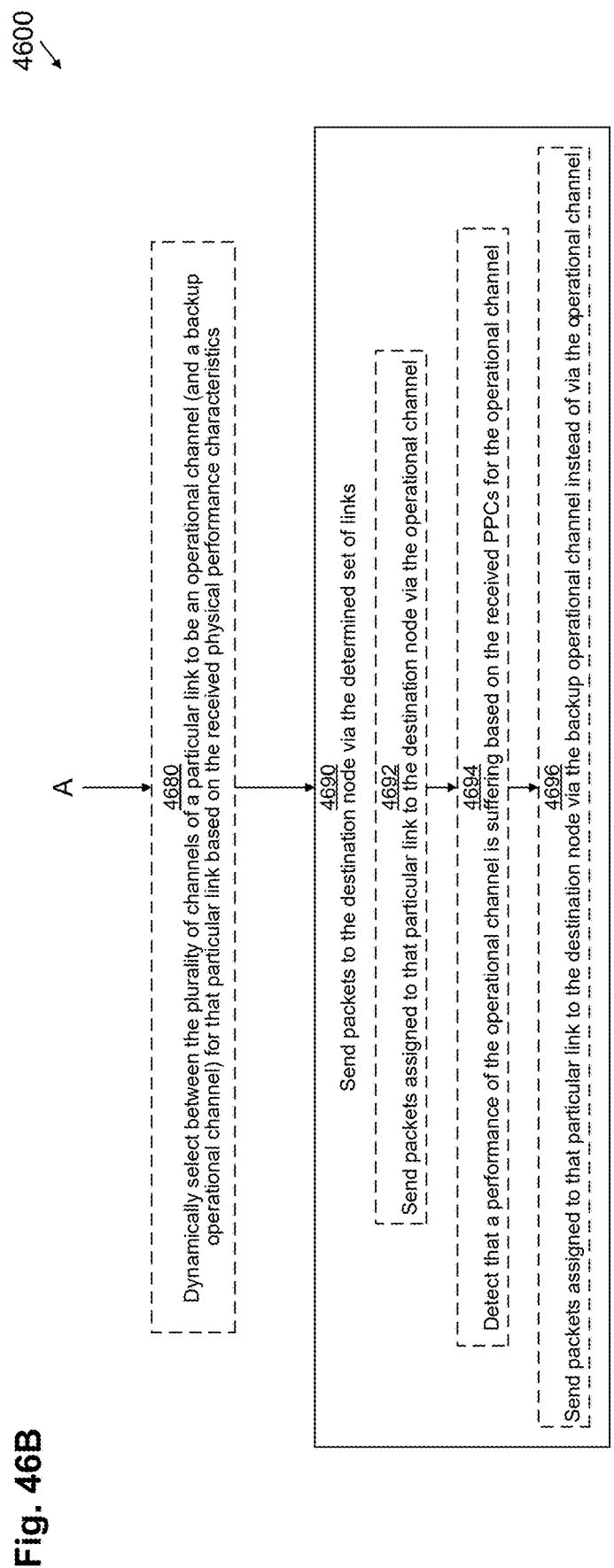

FIGS. 46A-B illustrate an example method 4600 performed by DPRM 4544 running on a local node 302(j) (in cooperation with a remote node 302(k) and in cooperation with PBPPM 4542 running on local node 302(j)) for dynamically routing packets 316 to a destination node 302(k). It should be understood that any time a piece of software (e.g., OS, modules 4542, 4544 and various other applications, modules, and drivers, etc.) is described as performing a method, process, step, or function, what is meant is that a computing device (e.g., node 302(j), 302(k)) on which that piece of software is running performs the method, process, step, or function when executing that piece of software on its processing circuitry 4532. It should be understood that one or more of the steps or sub-steps of method 4600 may be omitted in some embodiments. Similarly, in some embodiments, one or more steps or sub-steps may be combined together or performed in a different order. Dashed lines indicate that a step or sub-step is either optional or representative of alternate embodiments or use cases.

In optional step 4610, DPRM 4544 running on local node 302(j) receives packet prioritization information and/or an identification of the destination node 302(k) (since there are several nodes 302 that could be chosen from) from the PBPPM 4542 also running on local node 302(j).

In step 4620, DPRM 4544 detects a status of a plurality of links 4556 to the destination node 302(k) across a plurality of communications modalities 4570. In some embodiments, step 4620 may include (sub-step 4630) receiving PPCs 4592 (e.g., as part of a heartbeat message 4590) from the destination node 302(k) about at least one channel 4572 (e.g., an operational channel 3102) for each of the plurality of communications modalities 4570. The PPCs 4592 may include various specific pieces of data as described in sub-steps 4632, 4634. Either one or both of sub-steps 4632, 4634 may be performed. In some embodiments, sub-step 4630 may include sub-step 4636, and in other embodiments, sub-step 4630 may include sub-step 4638.

In some embodiments, step 4620 may include (sub-step 4640) receiving network-layer performance characteristics 4594 (e.g., as part of a heartbeat message 4590) from the destination node 302(k) about each of the plurality of links 4556, including a buffer backlog 4555 at the destination node 302(k) for the respective communications modality 4570 of that link 4556.

In embodiments in which sub-step 4636 was performed, in step 4650, DPRM 4544 sends the received PPCs 4592 for all channels 4572 across all links 4556 to PBPPM 4542. In response, PBPPM 4542 uses that information to make next-hop routing decisions in order to select the destination node 302(k) which is identified in step 4610.

In step 4660, DPRM 4544 determines a set of links 4556 to use for routing packets 316 to the destination node 302(k) based on the statuses as detected in step 4640. In some embodiments, step 4660 includes sub-step 4662, which calculates utility function 4548 for each link 4556 based at least on the received PPCs 4592. In some embodiments, sub-step 4662 includes sub-steps 4663-4665 as depicted. In some embodiments (sub-steps 4667-4669 as depicted), DPRM 4544 assigns packets 316 to particular links 4556 based on their assigned prioritizations (e.g., as assigned in step 4610) and the calculated utilities.

In some embodiments, in step 4680, DPRM 4544 performs DSA by dynamically selecting between the plurality of channels 4572(X)(1-M) of a particular link 4556(X) to be an operational channel or channels 3102 (and a backup operational channel or channels 3104) based on the received PPCs 4592.

In step 4690, DPRM 4544 sends the packets 316 to the destination node 302(k) via the set of links 4556 that were determined in step 4660. In some embodiments, the particular channel(s) 4572 used to send the packets 316 in step 4690 may be dynamically adjusted as depicted in sub-steps 4692-4696 by using the operational channel(s) 3102 or backup operational channel(s) 3104 determined in step 4680.

While various embodiments of the invention have been particularly shown and described, it will be understood by those skilled in the art that various changes in form and details may be made therein without departing from the spirit and scope of the invention as defined by the appended claims. It should be understood that the term "set" as used throughout this document refers to a mathematical set having at least one element.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "background" or as "conventional," Applicant makes no admission that such technique, method, apparatus, or other concept is actually prior art under 35 U.S.C. § 102 or 103, such determination being a legal determination that depends upon many factors, not all of which are known to Applicant at this time.

What is claimed is:

1. A method of dynamically routing packets to a destination node, the method comprising:
    detecting, at a network node, a status of a plurality of links to the destination node across a plurality of communications modalities, wherein
        the network node is one of a plurality of network nodes via which the packets are routed from a source node and the destination node using one or more of the plurality of communications modalities, and
        each of plurality of communications modalities represent a different communication protocol enabling the source node to communicate with the destination node;
    determining, at the network node, a set of links to use for routing packets to the destination node based on the detected statuses, wherein each of the set of links operate according to one of the plurality of communications modalities; and
    sending, by the network node, the packets to the destination node via the determined set of links.

2. The method of claim 1 wherein:
    each link of the plurality of links includes a respective communications modality configured to be operable across at least one channel of that communications modality;
    detecting the status of the plurality of links includes receiving physical performance characteristics from the destination node about at least one channel of each of the plurality of links; and
    determining the set of links to use for routing packets to the destination node includes calculating a utility function for each link based on the received performance characteristics.

3. The method of claim 2 wherein:
    the at least one channel for each link has a respective bandwidth;
    the physical performance characteristics include at least one of:
        (i) a signal-to-interference-plus-noise-ratio (SINR) for the at least one channel; and
        (ii) a noise floor for the at least one channel, an amount of interference detected on the at least one channel, and a signal power for the at least one channel; and
    calculating a utility function for each link based on the received performance characteristics includes calculating a capacity of the at least one channel by applying the Shannon-Hartley Theorem to the respective bandwidth of the at least one channel and the received physical performance characteristics of the at least one channel.

4. The method of claim 3 wherein:
    detecting the status of the plurality of links further includes receiving network-layer performance characteristics from the destination about each of the plurality of links, including a buffer backlog at the destination node for the respective communications modality of that link; and
    calculating the utility function for each link based on the received performance characteristics further includes:
        calculating a differential buffer backlog between the network node and the destination node with reference to the received buffer backlog and a local buffer backlog of the network node for that link; and
        combining the calculated differential buffer backlog with the calculated capacity to yield the utility function.

5. The method of claim 4 wherein determining the set of links to use for routing packets to the destination node further includes assigning packets prioritized for low latency delivery to links having lower differential buffer backlogs.

6. The method of claim 4 wherein determining the set of links to use for routing packets to the destination node further includes assigning packets prioritized for control message delivery to links having lower differential buffer backlogs and at least one channel with higher SINR.

7. The method of claim 3 wherein determining the set of links to use for routing packets to the destination node further includes assigning packets prioritized for high throughput delivery to links having higher calculated utilities.

8. The method of claim 3 wherein:
    receiving physical performance characteristics from the destination about at least one channel of each of the plurality of links includes receiving the physical performance characteristics about a plurality of channels of a particular link;
    the physical performance characteristics further include at least one of:
        a Received Signal Strength Indicator (RSSI),
        a distance to the destination node,
        a packet error rate, and
        an interference indicator;
    the method further comprises dynamically selecting between the plurality of channels of a particular link to be an operational channel for that particular link based on the received physical performance characteristics; and
    sending packets to the destination node via the determined set of links includes sending packets assigned to that particular link to the destination node via the operational channel.

9. The method of claim 8 wherein:
    the method further comprises dynamically selecting between the plurality of channels of the particular link to be a backup operational channel for that particular link based on the received physical performance characteristics; and
    sending packets to the destination node via the determined set of links further includes, in response to detecting that a performance of the operational channel is suffering based on the received physical performance characteristics for the operational channel, sending packets assigned to the particular link to the destination node via the backup operational channel instead of via the operational channel.

10. The method of claim 2 wherein receiving the physical performance characteristics from the destination includes receiving the physical performance characteristics as part of a periodic heartbeat message sent by the destination node.

11. The method of claim 2 wherein:
the method further comprises receiving packet prioritization information for each received packet from a policy-based packet prioritization module (PBPPM); and
determining the set of links to use for routing packets to the destination node further includes assigning packets to links based on their respective received prioritization information and the calculated utility function for each link.

12. The method of claim 11 wherein the method further comprises, receiving an identification of the destination node from the PBPPM.

13. The method of claim 12 wherein:
receiving physical performance characteristics from the destination about at least one channel of each of the plurality of links includes receiving the physical performance characteristics about a plurality of channels of the plurality of links;
the physical performance characteristics include at least one of:
a Received Signal Strength Indicator (RSSI),
a distance to the destination node,
a packet error rate, and
an interference indicator;
the method further comprises sending the received physical performance characteristics about the plurality of channels of the plurality of links to the PBPPM; and
receiving the identification of the destination node from the PBPPM is performed in response to sending the received physical performance characteristics about the plurality of channels of the plurality of links to the packet prioritization module.

14. The method of claim 1 wherein at least one communications modality is a wireless communications modality.

15. The method of claim 1 wherein at least one communications modality is a wired communications modality.

16. The method of claim 1 wherein detecting the status of the plurality of links includes:
receiving link quality information from the destination for each of the plurality of links; and
calculating link performance characteristics with reference to the received link quality information.

17. The method of claim 16 wherein receiving the link quality information includes receiving periodic heartbeat signals from the destination node.

18. The method of claim 17 wherein:
each link includes a respective communications modality configured to be operable across a plurality of channels of that communications modality;
the link quality information in the received heartbeats includes:
channel quality information about physical characteristics of each of the plurality of channels of that communications modality; and
network-layer quality information for that link, including a buffer backlog for that communications modality at the destination node.

19. The method of claim 18 wherein:
the channel quality information about physical characteristics of each of the plurality of channels of that communications modality includes at least one of the spectrum related measurements such as power spectral density, tones and spurs, Cyclostationary features, occupied signals, noise floor (NF), and signal-to-interference-plus-noise-ratio (SINR) for each channel;
calculating link performance characteristics with reference to the received link quality information includes calculating a capacity of each channel by applying the Shannon-Hartley Theorem to the SINR for that channel and a bandwidth of that channel; and
determining the set of links to use for routing packets to the destination node based on the detected statuses includes prioritizing links for inclusion in the set of links based on the calculated capacities of their channels.

20. The method of claim 18 wherein the method further comprises selectively assigning packets to particular links based on priority information associated with each packet and a utility function, including:
computing a differential buffer backlog for each link, and
computing the utility function taking into account the capacity and the differential buffer backlog for each link.

* * * * *